ENVIRONMENTAL SYSTEM

FLEXIBLE REGISTER APPARATUS

Filed Jan. 13, 1967 47 Sheets-Sheet 4

May 21, 1968 A. R. GELLER ETAL 3,384,877

FLEXIBLE REGISTER APPARATUS

Filed Jan. 13, 1967 47 Sheets-Sheet 5

SELECTION CIRCUITS

STORAGE INPUT CIRCUITS

STORAGE OUTPUT CIRCUITS

THRU

CHECK STOP TIMING

FIG. 68 I UNIT SCAN

E UNIT SCAN

FIG. 70

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

FIG. 71

THIS FIGURE IS ILLUSTRATIVE OF A LIKE-NUMBERED FIGURE WHICH IS SHOWN IN DETAIL IN SAID ENVIRONMENTAL SYSTEM, LARGE SCALE DATA PROCESSING SYSTEM, SERIAL NO. 609,238 FILED ON JANUARY 13, 1967

FIG. 73 E UNIT DATA FLOW (2)

May 21, 1968 A. R. GELLER ETAL 3,384,877

FLEXIBLE REGISTER APPARATUS

Filed Jan. 13, 1967 47 Sheets-Sheet 18

SEL A/B

A/B INV KEY

PD-BRANCH DECODE

PD-IOP LOADED

May 21, 1968 A. R. GELLER ETAL 3,384,877

FLEXIBLE REGISTER APPARATUS

Filed Jan. 13, 1967 47 Sheets-Sheet 24

D FLD GATE

IOP ERROR

IOP FORMAT DECODE

IOP INST DECODE

ID 3

ID 4

ID INV OP - 1

ID INV OP - 2

FIG. 92

RR BRANCHING AND STATUS SWITCHING

| OP BITS 0 1 2 3: 0 0 0 0 | COMP BLK LCH | ID BLK IC | ID SMPL ADD ERR | ID FTCH CLASS | ID BR OP | ID GT AA TO SAR | GT GR R1+1 OUT | GT GR R2 OUT | BD BLK T1 | BD BLK T2 | BD GROUT CL | BD COMP REQ | BD I EXEC | BD E EXEC | BD DBL REG COMP | BD PRIV INST | BD MON CALL | BD BR ON COND | BD BR & LINK | BD RR BR ON COND | | | OP BITS 4 5 6 7 |
|---|---|---|---|---|---|---|---|---|---|---|---|---|---|---|---|---|---|---|---|---|---|---|---|
| | | | | | | | | E/F | | | | | | | | | | | | | | | 0 0 0 0 |
| | | | | | | | | E/F | | | | | | X | | | | | | | | | 0 0 0 1 |
| | | | | | | | | E/F | | | | | | | | | | | | | | | 0 0 1 0 |
| | | | | | | | | E/F | | | | | | | | | | | | | | | 0 0 1 1 |
| SPM | | | | | | | | E/F | X | | X | | X | | | | | | | | | | 0 1 0 0 |
| BALR | A | X | C | C | C | C | | E/F | | | | X | | X | | | | | X | | | | 0 1 0 1 |
| BCTR | A | C | C | C | C | C | | E/F | | | | X | | X | | | | | | | | | 0 1 1 0 |
| BCR | A | C | C | C | C | C | | E/F | | | | | X | | | | | X | | X | | | 0 1 1 1 |
| STG | | X | X | | | X | | D/E/F | X | | X | | X | | | X | | | | | | | 1 0 0 0 |
| ITG | | X | X | | | X | | E/F | | X | | X | X | X | | X | | | | | | | 1 0 0 1 |
| SOS | | | | | | | | E/F | | | | | | | | | X | | | | | | 1 0 1 0 |
| | | | | | | | | E/F | | | | | | | | | X | | | | | | 1 0 1 1 |
| | | | | | | | | F | X | X | X | | | | | | | | | | | | 1 1 0 0 |
| | | | | | | | | E/F | X | | X | | | X | | | | | | | | | 1 1 0 1 |
| | | | | | | | | E/F | | | | | | | | | | | | | | | 1 1 1 0 |
| | | | | | | | | E/F | | | | | | | | | | | | | | | 1 1 1 1 |

RR FIXED-POINT FULL WORD AND LOGICAL

| OP BITS 0 1 2 3: 0 0 0 1 | COMP BLK LCH | ID BLK IC | ID SMPL ADD ERR | ID FTCH CLASS | ID BR OP | ID GT AA TO SAR | GT GR R1+1 OUT | GT GR R2 OUT | BD BLK T1 | BD BLK T2 | BD GROUT CL | BD COMP REQ | BD I EXEC | BD E EXEC | BD DBL REG COMP | BD PRIV INST | BD MON CALL | BD BR ON COND | BD BR & LINK | BD RR BR ON COND | | | OP BITS 4 5 6 7 |
|---|---|---|---|---|---|---|---|---|---|---|---|---|---|---|---|---|---|---|---|---|---|---|---|
| LPR | | | | | | | | E/F | | | | X | | X | | | | | | | | | 0 0 0 0 |
| LNR | | | | | | | | E/F | | | | X | | X | | | | | | | | | 0 0 0 1 |
| LTR | | | | | | | | E/F | | | | X | | X | | | | | | | | | 0 0 1 0 |
| LCR | | | | | | | | E/F | | | | X | | X | | | | | | | | | 0 0 1 1 |
| NR | | | | | | | E | E/F | | | | X | | X | | | | | | | | | 0 1 0 0 |
| CLR | | | | | | | D | E/F | | | | | | X | | | | | | | | | 0 1 0 1 |
| OR | | | | | | | | E/F | | | | X | | X | | | | | | | | | 0 1 1 0 |
| XR | | | | | | | | E/F | | | | X | | X | | | | | | | | | 0 1 1 1 |
| LR | | | | | | | | E/F | | | | X | | X | | | | | | | | | 1 0 0 0 |
| CR | | | | | | | | E/F | | | | X | | X | | | | | | | | | 1 0 0 1 |
| AR | | | | | | | | E/F | | | | | | X | | | | | | | | | 1 0 1 0 |
| SR | | | | | | | | E/F | | | | | | X | | | | | | | | | 1 0 1 1 |
| MR | | | | | | | | D/F | X | X | X | X | | X | X | | | | | | | | 1 1 0 0 |
| DR | | | | | | | | E/F | | X | X | X | | X | | | | | | | | | 1 1 0 1 |
| ALR | | | | | | | | E/F | | | | X | | X | | | | | | | | | 1 1 1 0 |
| SLR | | | | | | | | E/F | | | | X | | X | | | | | | | | | 1 1 1 1 |

FIG. 93

RR FLOATING-POINT DOUBLE PRECISION

| OP BITS 0 1 2 3: 0 0 1 0 | GT GR R1+1 OUT | GT GR R2 OUT | BD BLK T2 | BD COMP REQ | BD E EXEC | OP BITS 4 5 6 7 |
|---|---|---|---|---|---|---|
| LPDR | | E/F | | | X | 0 0 0 0 |
| LNDR | | E/F | | | X | 0 0 0 1 |
| LTDR | | E/F | | | X | 0 0 1 0 |
| LCDR | | E/F | | | X | 0 0 1 1 |
| HDR | | E/F | | | X | 0 1 0 0 |
| | | E/F | | X | X | 0 1 0 1 |
| | | E/F | | X | X | 0 1 1 0 |
| | | E/F | | | X | 0 1 1 1 |
| LDR | | E/F | | | X | 1 0 0 0 |
| CDR | | E/F | | | X | 1 0 0 1 |
| ADR | | E/F | | | X | 1 0 1 0 |
| SDR | | E/F | | | X | 1 0 1 1 |
| MDR | E | F | X | | X | 1 1 0 0 |
| DDR | | E/F | X | | X | 1 1 0 1 |
| AWR | | E/F | | | X | 1 1 1 0 |
| SWR | | E/F | | | X | 1 1 1 1 |

RR FLOATING-POINT SINGLE PRECISION

| OP BITS 0 1 2 3: 0 0 1 1 | GT GR R1+1 OUT | GT GR R2 OUT | BD BLK T2 | BD COMP REQ | BD E EXEC | OP BITS 4 5 6 7 |
|---|---|---|---|---|---|---|
| LPER | | E/F | | | X | 0 0 0 0 |
| LNER | | E/F | | | X | 0 0 0 1 |
| LTER | | E/F | | | X | 0 0 1 0 |
| LCER | | E/F | | | X | 0 0 1 1 |
| HER | | E/F | | | X | 0 1 0 0 |
| | | E/F | | | X | 0 1 0 1 |
| | | E/F | | | X | 0 1 1 0 |
| | | E/F | | | X | 0 1 1 1 |
| LER | | E/F | | | X | 1 0 0 0 |
| CER | | E/F | | | X | 1 0 0 1 |
| AER | | E/F | | | X | 1 0 1 0 |
| SER | | E/F | | | X | 1 0 1 1 |
| MER | E | F | X | | X | 1 1 0 0 |
| DER | | E/F | X | | X | 1 1 0 1 |
| AUR | | E/F | | | X | 1 1 1 0 |
| SUR | | E/F | | | X | 1 1 1 1 |

FIG. 94

RX FIXED-POINT HALF WORD AND BRANCHING

| OP BITS 0 1 2 3 / 0 1 0 0 | COMP BLK LCH | I D BLK IC | I D SMPL ADD ERR | I D FTCH CLASS | I D 1 FTCH CL LCH | I D BR OP | I D GT AA TO SAR | GT GR R1+1 OUT | GT GR R2 OUT | B D BLK T1 | B D BLK T2 | B D GROUT CL | B D COMP REQ | B D E EXEC | B D DBL REG COMP | B D STR REQ | B D MARK 0-15 | B D MARK 16-31 | B D MARK 32-47 | B D MARK 48-63 | B D BR ON COND | B D BR & LINK | OP BITS 4 5 6 7 |
|---|---|---|---|---|---|---|---|---|---|---|---|---|---|---|---|---|---|---|---|---|---|---|---|
| S T H | A/B | X | X | | | | X | E | E/F | | X | | | X | | G | J | K | L | N | | | 0 0 0 0 |
| L A | A/B | X | X | | | | X | E | E/F | X | | | X | X | | | | | | | | | 0 0 0 1 |
| S T C | A/B | X | X | | | | X | E | E/F | | X | | | X | | | | | | | | | 0 0 1 0 |
| I C | A/B | X | X | X | X | | X | E | E/F | | | | X | X | | | | | | | | | 0 0 1 1 |
| E X | A/B | X | X | X | | X | X | Q/E | E/F | | | X | | X | | | | | | | | | 0 1 0 0 |
| B A L | A/B | X | X | X | | X | X | E | E/F | | | | X | X | | | | | | | | X | 0 1 0 1 |
| B C T | A/B | X | X | X | | X | X | E | E/F | | | | X | X | | | | | | | | | 0 1 1 0 |
| B C | A/B | X | X | X | | X | X | E | E/F | | | | | X | | | | | | | | | 0 1 1 1 |
| L H | A/B | X | X | X | X | | X | E | E/F | | X | | X | X | | | | | | | | | 1 0 0 0 |
| C H | A/B | X | X | X | X | | X | E | E/F | | X | | | X | | | | | | | | | 1 0 0 1 |
| A H | A/B | X | X | X | X | | X | E | E/F | | X | | X | X | | | | | | | | | 1 0 1 0 |
| S H | A/B | X | X | X | X | | X | E | E/F | | X | | X | X | | | | | | | X | | 1 0 1 1 |
| M H | A/B | X | X | X | X | | X | E | E/F | | X | | X | X | | | | | | | | | 1 1 0 0 |
| | A/B | X | | | X | | X | E | E/F | X | X | X | | X | | | | | | | | | 1 1 0 1 |
| C V D | A/B | X | X | | | | X | E | E/F | | X | | | X | | | | | | | | | 1 1 1 0 |
| C V B | A/B | X | X | X | X | | X | E | E/F | | | | X | X | | | | | | | | | 1 1 1 1 |

RX FIXED-POINT FULL WORD AND LOGICAL

| OP BITS 0 1 2 3 / 0 1 0 1 | COMP BLK LCH | I D BLK IC | I D SMPL ADD ERR | I D FTCH CLASS | I D 1 FTCH CL LCH | I D BR OP | I D GT AA TO SAR | GT GR R1+1 OUT | GT GR R2 OUT | B D BLK T1 | B D BLK T2 | B D GROUT CL | B D COMP REQ | B D E EXEC | B D DBL REG COMP | B D STR REQ | B D MARK 0-15 | B D MARK 16-31 | B D MARK 32-47 | B D MARK 48-63 | B D BR ON COND | B D BR & LINK | OP BITS 4 5 6 7 |
|---|---|---|---|---|---|---|---|---|---|---|---|---|---|---|---|---|---|---|---|---|---|---|---|
| S T | A/B | X | X | | | | X | E | E/F | | X | | | X | | X | H | H | M | M | | | 0 0 0 0 |
| | A/B | X | | | | | X | E | E/F | X | | | X | X | | X | H | H | M | M | | | 0 0 0 1 |
| | A/B | X | | | | | X | E | E/F | | X | | X | X | | X | H | H | M | M | | | 0 0 1 0 |
| | A/B | X | | | X | | X | E | E/F | | | | X | X | | X | H | H | M | M | | | 0 0 1 1 |
| N | A/B | X | X | X | X | | X | E | E/F | | | | X | X | | | | | | | | | 0 1 0 0 |
| C L | A/B | X | X | X | X | | X | E | E/F | | | | | X | | | | | | | | | 0 1 0 1 |
| O | A/B | X | X | X | X | | X | E | E/F | | | | X | X | | | | | | | | | 0 1 1 0 |
| X | A/B | X | X | X | X | | X | E | E/F | | | | X | X | | | | | | | | | 0 1 1 1 |
| L | A/B | X | X | X | X | | X | E | E/F | | | | X | X | | | | | | | | | 1 0 0 0 |
| C | A/B | X | X | X | X | | X | E | E/F | | | | | X | | | | | | | | | 1 0 0 1 |
| A | A/B | X | X | X | X | | X | E | E/F | | | | X | X | | | | | | | | | 1 0 1 0 |
| S | A/B | X | X | X | X | | X | E | E/F | | | | X | X | | | | | | | | | 1 0 1 1 |
| M | A/B | X | X | X | X | | X | E | E/F | | X | | X | X | X | | | | | | | | 1 1 0 0 |
| D | A/B | X | X | X | X | | X | E | E/F | X | X | X | X | X | X | | | | | | | | 1 1 0 1 |
| A L | A/B | X | X | X | X | | X | E | E/F | | | | X | X | | | | | | | | | 1 1 1 0 |
| S L | A/B | X | X | X | X | | X | E | E/F | | | | X | X | | | | | | | | | 1 1 1 1 |

FIG. 95

RX FLOATING – POINT DOUBLE PRECISION

| OP BITS 0 1 2 3 (0 1 1 0) | COMP BLK LCH | I D BLK IC | I D SMPL ADD ERR | I D FTCH CLASS | I D 1 FTCH CL LCH | I D GT AA TO SAR | GT GR R1+1 OUT | GT GR R2 OUT | B D BLK T 1 | B D BLK T 2 | B D COMP REQ | B D E EXEC | B D STR REQ | B D MARK 0-15 | B D MARK 16-31 | B D MARK 32-47 | B D MARK 48-63 | | | | | | OP BITS 4 | 5 | 6 | 7 |
|---|---|---|---|---|---|---|---|---|---|---|---|---|---|---|---|---|---|---|---|---|---|---|---|---|---|---|
| S T D | A/B | X | X | | | X | E | E/F | | X | | X | X | X | X | X | X | | | | | | 0 | 0 | 0 | 0 |
| | A/B | X | | | | X | E | E/F | X | | X | X | X | X | X | X | X | | | | | | 0 | 0 | 0 | 1 |
| | A/B | X | | | | X | E | E/F | | X | | X | X | X | X | X | X | | | | | | 0 | 0 | 1 | 0 |
| | A/B | X | | | X | X | E | E/F | | | X | X | X | X | X | X | X | | | | | | 0 | 0 | 1 | 1 |
| | A/B | X | | | X | X | E | E/F | | | | X | | | | | | | | | | | 0 | 1 | 0 | 0 |
| | A/B | X | | | X | X | E | E/F | | | X | X | | | | | | | | | | | 0 | 1 | 0 | 1 |
| | A/B | X | | | X | X | E | E/F | | | | X | | | | | | | | | | | 0 | 1 | 1 | 0 |
| | A/B | X | | | X | X | E | E/F | | | | X | | | | | | | | | | | 0 | 1 | 1 | 1 |
| L D | A/B | X | X | X | X | X | E | E/F | | | | X | | | | | | | | | | | 1 | 0 | 0 | 0 |
| C D | A/B | X | X | X | X | X | E | E/F | | | | X | | | | | | | | | | | 1 | 0 | 0 | 1 |
| A D | A/B | X | X | X | X | X | E | E/F | | | | X | | | | | | | | | | | 1 | 0 | 1 | 0 |
| S D | A/B | X | X | X | X | X | E | E/F | | | | X | | | | | | | | | | | 1 | 0 | 1 | 1 |
| M D | A/B | X | X | X | X | X | E | E/F | | X | | X | | | | | | | | | | | 1 | 1 | 0 | 0 |
| D D | A/B | X | X | X | X | X | E | E/F | | X | | X | | | | | | | | | | | 1 | 1 | 0 | 1 |
| A W | A/B | X | X | X | X | X | E | E/F | | | | X | | | | | | | | | | | 1 | 1 | 1 | 0 |
| S W | A/B | X | X | X | X | X | E | E/F | | | | X | | | | | | | | | | | 1 | 1 | 1 | 1 |

RX FLOATING – POINT SINGLE PRECISION

| OP BITS 0 1 2 3 (0 1 1 1) | COMP BLK LCH | I D BLK IC | I D SMPL ADD ERR | I D FTCH CLASS | I D 1 FTCH CL LCH | I D GT AA TO SAR | GT GR R1+1 OUT | GT GR R2 OUT | B D BLK T 1 | B D BLK T 2 | B D COMP REQ | B D E EXEC | B D STR REQ | B D MARK 0-15 | B D MARK 16-31 | B D MARK 32-47 | B D MARK 48-63 | | | | | | OP BITS 4 | 5 | 6 | 7 |
|---|---|---|---|---|---|---|---|---|---|---|---|---|---|---|---|---|---|---|---|---|---|---|---|---|---|---|
| S T E | A/B | X | X | | | X | E | E/F | | X | | X | X | H | H | M | M | | | | | | 0 | 0 | 0 | 0 |
| | A/B | X | | | | X | E | E/F | X | | X | X | X | H | H | M | M | | | | | | 0 | 0 | 0 | 1 |
| | A/B | X | | | | X | E | E/F | | X | | X | X | H | H | M | M | | | | | | 0 | 0 | 1 | 0 |
| | A/B | X | | | X | X | E | E/F | | | X | X | X | H | H | M | M | | | | | | 0 | 0 | 1 | 1 |
| | A/B | X | | | X | X | E | E/F | | | | X | | | | | | | | | | | 0 | 1 | 0 | 0 |
| | A/B | X | | | X | X | E | E/F | | | | X | | | | | | | | | | | 0 | 1 | 0 | 1 |
| | A/B | X | | | X | X | E | E/F | | | | X | | | | | | | | | | | 0 | 1 | 1 | 0 |
| | A/B | X | | | X | X | E | E/F | | | | X | | | | | | | | | | | 0 | 1 | 1 | 1 |
| L E | A/B | X | X | X | X | X | E | E/F | | | | X | | | | | | | | | | | 1 | 0 | 0 | 0 |
| C E | A/B | X | X | X | X | X | E | E/F | | | | X | | | | | | | | | | | 1 | 0 | 0 | 1 |
| A E | A/B | X | X | X | X | X | E | E/F | | | | X | | | | | | | | | | | 1 | 0 | 1 | 0 |
| S E | A/B | X | X | X | X | X | E | E/F | | | | X | | | | | | | | | | | 1 | 0 | 1 | 1 |
| M E | A/B | X | X | X | X | X | E | E/F | | X | | X | | | | | | | | | | | 1 | 1 | 0 | 0 |
| D E | A/B | X | X | X | X | X | E | E/F | | X | | X | | | | | | | | | | | 1 | 1 | 0 | 1 |
| A U | A/B | X | X | X | X | X | E | E/F | | | | X | | | | | | | | | | | 1 | 1 | 1 | 0 |
| S U | A/B | X | X | X | X | X | E | E/F | | | | X | | | | | | | | | | | 1 | 1 | 1 | 1 |

FIG. 96

RS-SI BRANCHING, STATUS SWITCHING AND SHIFTING

| OP BITS 0 1 2 3: 1 0 0 0 | COMP BLK LCH | I D BLK IC | I D SMPL ADD ERR | I D FTCH CLASS | I D 1 FTCH CL LCH | I D BR OP | GT GR R1+1 OUT | GT GR R2 OUT | B D BLK T1 | B D BLK T2 | B D GROUT CL | B D COMP REQ | B D I EXEC | B D E EXEC | B D DBL REG COMP | B D PRIV INST | B D LD MPL | SET I O P BIT 15 | OP BITS 4 5 6 7 |
|---|---|---|---|---|---|---|---|---|---|---|---|---|---|---|---|---|---|---|---|
| S S M | B | X | X | X | X | | D | E | | | | | X | X | | X | | | 0 0 0 0 |
| | B | X | X | | | | | E | | | | | X | | | X | | | 0 0 0 1 |
| L P S W | B | X | X | X | | | | E | X | | | | X | | | X | | | 0 0 1 0 |
| D I A G | B | X | X | | | | | E | X | | | | X | | | X | | | 0 0 1 1 |
| W D | B | X | X | X | X | | | E | | | | | | X | | X | | | 0 1 0 0 |
| R D | B | X | X | | | | | E | | X | | | | X | | X | | | 0 1 0 1 |
| B X H | B | X | X | X | | X | | D/E | X | X | X | | | X | | | | D | 0 1 1 0 |
| B X L E | B | X | X | X | | X | | D/E | X | X | X | | | X | | | | D | 0 1 1 1 |
| S R L | B | | X | | | | E | | | | | X | | X | | | | | 1 0 0 0 |
| S L L | B | | X | | | | E | | | | | X | | X | | | | | 1 0 0 1 |
| S R A | B | | X | | | | E | | | | | X | | X | | | | | 1 0 1 0 |
| S L A | B | | X | | | | E | | | | | X | | X | | | | | 1 0 1 1 |
| S R D L | B | | X | | | | E | | | | | X | | X | X | | | | 1 1 0 0 |
| S L D L | B | | X | | | | E | | | | | X | | X | X | | | | 1 1 0 1 |
| S R D A | B | | X | | | | E | | | | | X | | X | X | | | | 1 1 1 0 |
| S L D A | B | | X | | | | E | | | | | X | | X | X | | | | 1 1 1 1 |

RS-SI FIXED - POINT, LOGICAL AND I/O

| OP BITS 0 1 2 3: 1 0 0 1 | COMP BLK LCH | I D BLK IC | I D SMPL ADD ERR | I D FTCH CLASS | I D 1 FTCH CL LCH | I D BR OP | GT GR R1+1 OUT | GT GR R2 OUT | B D BLK T1 | B D BLK T2 | B D GROUT CL | B D COMP REQ | B D I EXEC | B D E EXEC | B D DBL REG COMP | B D PRIV INST | B D LD MPL | SET I O P BIT 15 | OP BITS 4 5 6 7 |
|---|---|---|---|---|---|---|---|---|---|---|---|---|---|---|---|---|---|---|---|
| S T M | B | X | X | | | | | E | X | X | X | | X | X | | | | | 0 0 0 0 |
| T M | B | X | X | X | X | | | E | | | | | | X | | | | | 0 0 0 1 |
| M V I | B | X | X | | | | | E | | X | | | | X | | | | | 0 0 1 0 |
| | B | X | | | | | | E | | | | | | X | | | | | 0 0 1 1 |
| N I | B | X | X | X | | | | E | | X | | | | X | | | | | 0 1 0 0 |
| C L I | B | X | X | X | X | | | E | | | | | | X | | | | | 0 1 0 1 |
| O I | B | X | X | X | | | | E | | X | | | | X | | | | | 0 1 1 0 |
| X I | B | X | X | X | | | | E | | X | | | | X | | | | | 0 1 1 1 |
| L M | B | X | X | X | | E | | | X | | | | X | X | | | X | | 1 0 0 0 |
| | B | X | | | | E | | | X | | | | | | | | | | 1 0 0 1 |
| | B | X | | | | E | | | X | | | | | | | | | | 1 0 1 0 |
| | B | X | | | | E | | | X | | | | | | | | | | 1 0 1 1 |
| S I O | B | | X | | | E | | | X | | | | X | | | X | | | 1 1 0 0 |
| T I O | B | | X | | | E | | | X | | | | X | | | X | | | 1 1 0 1 |
| H I O | B | | X | | | E | | | X | | | | X | | | X | | | 1 1 1 0 |
| T C H | B | | X | | | E | | | X | | | | X | | | X | | | 1 1 1 1 |

FIG. 97

SS LOGICAL

| OP BITS 0 1 2 3: 1 1 0 1 | ID BLK IC | BD BLK T1 | BD BLK T2 | BD E EXEC | OP BITS 4 5 6 7 |
|---|---|---|---|---|---|
| | X | X | X | X | 0 0 0 0 |
| M V N | X | X | X | X | 0 0 0 1 |
| M V C | X | X | X | X | 0 0 1 0 |
| M V Z | X | X | X | X | 0 0 1 1 |
| N C | X | X | X | X | 0 1 0 0 |
| C L C | X | X | X | X | 0 1 0 1 |
| O C | X | X | X | X | 0 1 1 0 |
| X C | X | X | X | X | 0 1 1 1 |
| | X | X | X | X | 1 0 0 0 |
| | X | X | X | X | 1 0 0 1 |
| | X | X | X | X | 1 0 1 0 |
| | X | X | X | X | 1 0 1 1 |
| T R | X | X | X | X | 1 1 0 0 |
| T R T | X | X | X | X | 1 1 0 1 |
| E D | X | X | X | X | 1 1 1 0 |
| E D M K | X | X | X | X | 1 1 1 1 |

SS DECIMAL

| OP BITS 0 1 2 3: 1 1 1 1 | | | | | |
|---|---|---|---|---|---|
| | X | X | X | X | 0 0 0 0 |
| M V O | X | X | X | X | 0 0 0 1 |
| P A C K | X | X | X | X | 0 0 1 0 |
| U N P K | X | X | X | X | 0 0 1 1 |
| | X | X | X | X | 0 1 0 0 |
| | X | X | X | X | 0 1 0 1 |
| | X | X | X | X | 0 1 1 0 |
| | X | X | X | X | 0 1 1 1 |
| Z A P | X | X | X | X | 1 0 0 0 |
| C P | X | X | X | X | 1 0 0 1 |
| A P | X | X | X | X | 1 0 1 0 |
| S P | X | X | X | X | 1 0 1 1 |
| M P | X | X | X | X | 1 1 0 0 |
| D P | X | X | X | X | 1 1 0 1 |
| | X | X | X | X | 1 1 1 0 |
| | X | X | X | X | 1 1 1 1 |

IOP LINE DECODE

ER1 GATING

SET BOP

RELEASE BOP

BR1 INCR

BOP PAR ERROR

ER1 INCR

B SEL GR

R2-X SEL GR

BR1 SEL GR

GEN REG OUT GATES

GEN REG IN GATES

United States Patent Office 3,384,877

Patented May 21, 1968

3,384,877

FLEXIBLE REGISTER APPARATUS

Alan R. Geller and Leo J. Hasbrouck, Poughkeepsie, Olin L. MacSorley, Lake Katrine, and Wesley C. Stetler, Poughkeepsie, N.Y., assignors to International Business Machines Corporation, Armonk, N.Y., a corporation of New York Continuation-in-part of application Ser. No. 445,314, Apr. 5, 1965. This application Jan. 13, 1967, Ser. No. 609,247

12 Claims. (Cl. 340—172.5)

ABSTRACT OF THE DISCLOSURE

The specification discloses an illustrative embodiment for the invention comprising a large scale data processing system of the type which is composed of a plurality of quasi-independent units. The environmental data processing system includes a central processing unit or portion, which is herein referred to as a CPU, a plurality of storage units, a plurality of input/output control devices referred to herein as channels, as well as control and maintenance facilities which are found in a power distribution unit, herein referred to as a PDU. The CPU of the environmental system includes a control or instruction unit hereinafter referred to as an I unit, and an arithmetic and logic or execution unit, hereinafter referred to as an E unit. The I unit includes controls for instruction fetching, branching, interruption handling, communication with the input/output channels, and other related functions. The E unit of the environmental system can perform algebraic and logical operations, moving, shifting, and other functions. A particular data register may be connected with a data bus in dependence upon the condition which has selected the register for transmission of data, rather than being dependent upon the register selected, or the destination of the data manifestations within the register.

This application is a continuation-in-part of application Ser. No. 445,314, filed Apr. 5, 1965, now abandoned, entitled "Flexible Register Apparatus."

TABLE OF CONTENTS

Figure 2:
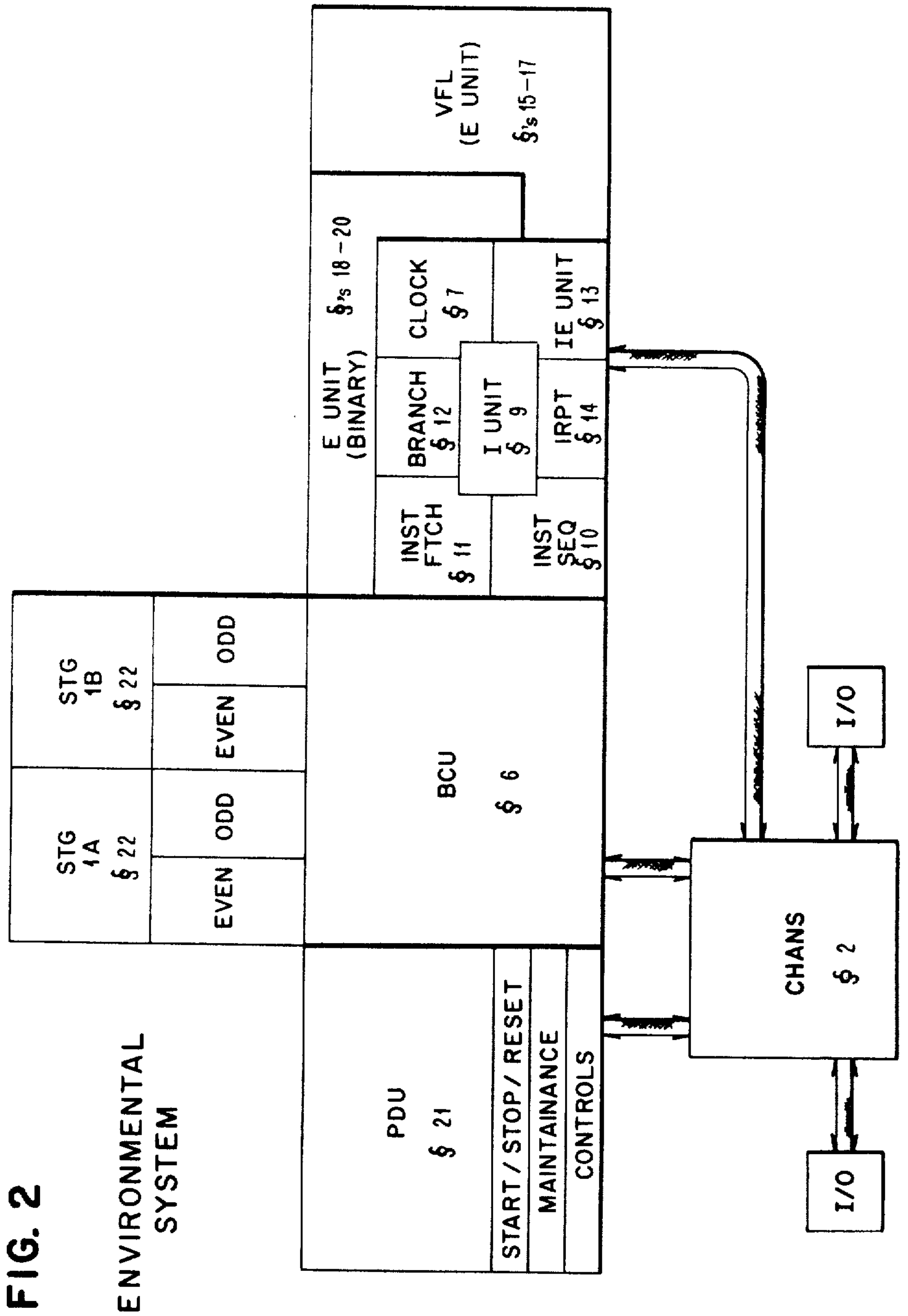

| | Col. |
|---|---|
| 1.0 Background of the invention | 2 |
| 2.0 References | 4 |
| 3.0 Nomenclature | 5 |
| 4.0 Brief Description of EnvironmentalSystem FIG. 2 | 6 |
| 5.0 Component Circuits, FIG. 3 Through FIG. 8 | 7 |
| 6.0 Basic Bus Control Unit | 9 |
| 7.0 Clock Circuit | 9 |
| 7.4 Clock Circuit | 9 |
| 8.0 Scan | 10 |
| 8.1. Scanning Into the I Unit, FIG. 68 | 10 |
| 8.2. Scanning Into the E Unit, FIG. 69 | 11 |
| 9.0. Instruction Unit Data flow | 11 |
| 9.1 General Introducton to I Unit Data Flow | 12 |
| 9.1.1. Instruction Selection, FIG. 72 | 12 |
| 9.1.2. Instruction Input Paths, FIG. 73 | 12 |
| 9.1.3. Instruction Decoding, FIG. 74 | 13 |
| 9.1.4. Instruction Utilization, FIG. 75 | 14 |
| 9.2. Instruction Decode Data Flow | 14 |
| 9.2.1. A B Registers | 15 |
| 9.2.1.1. A/B Selection Circuit, FIG. 77 | 15 |
| 9.2.1.2. A/B Invalid Key Circuit, FIG. 78 | 16 |
| 9.2.1.3 AB Register And Gating Circuits Therefor, FIG. 79 | 16 |
| 9.2.1.4. AB Gate Select Circuit, FIG. 80 | 17 |
| 9.2.2. Predecode | 17 |
| 9.2.2.1. Predecode Circuit, FIG. 76 | 17 |
| 9.2.2.2. Predecode IOP Loaded Circuit, FIG. 82 | 18 |
| 9.2.3. IOP Circuits | 19 |
| 9.2.3.1. IOP Register FIG. 83 | 19 |
| 9.2.3.2. D Field Gate FIG. 84 | 20 |
| 9.2.3.3. IOP Error Circuit FIG. 85 | 20 |
| 9.2.4. IOP Instruction Decode FIG. 86 Through FIG. 98 | 20 |
| 9.2.4.1 Chart Of Instructions By Class | 22 |
| 9.2.4.2. Alphabetical List Of Instructions | 23 |
| 9.2.4.3. IOP Format Decode, FIG. 86 | 27 |
| 9.2.4.4. IOP Exemplary Instruction Decode, FIG. 87 Through FIG. 89 | 27 |
| 9.2.4.5. IOP Invalid Operand Decode FIG. 90 and FIG. 91 | 27 |

TABLE OF CONTENTS—Continued

| | Col. |
|---|---|
| 9.2.4.6. IOP Line Decode, FIG. 98 | 28 |
| 9.2.5. BOP Circuits, FIG. 76 | 28 |
| 9.2.5.1. BOP Setting And Release, FIG. 100 and FIG. 101 | 28 |
| 9.2.5.2. BOP Register, FIG. 102 and FIG. 103 | 29 |
| 9.2.5.3. BOP R1 Incrementer, FIG. 105 | 30 |
| 9.2.5.4. BOP Parity Error Circuit, FIG. 106 | 30 |
| 9.2.6. ER 1 Circuits | 30 |
| 9.2.6.1. ER 1 Gating, FIG. 99 | 30 |
| 9.2.6.2. ER 1 Register, FIG. 104 | 31 |
| 9.2.6.3. ER 1 Incrementer, FIG. 107 | 31 |
| 9.2.7. General Register Circuits, FIG. 72 | 31 |
| 9.2.7.1. General Register Output Selection Circuits, FIG. 108 Through FIG. 111 | 31 |
| 9.2.7.1.1. B Field Selection Of General Registers, FIG. 108 | 31 |
| 9.2.7.1.2. R2-X Field Selection of General Registers, FIG. 109 | 31 |
| 9.2.7.1.3. BR 1 Field Selection of Registers, FIG. 110 | 32 |
| 9.2.7.1.4. General Register Outgating Control, FIG. 111 | 32 |

1.0. BACKGROUND OF THE INVENTION

This invention relates to data processing, and more particularly to a flexible register apparatus for providing the contents of a register at a variety of points within a system.

In the data processing art, use of a multiplicity of registers for the handling of data is well known. Furthermore, the provision of high speed storage, scratch-pad storage, local storage, addressing registers, indexing registers, and other stable data manifesting facility for ready access to a CPU has also been provided. In the prior art, handling of the outputs of any of these data manifesting means is generally done on the basis of providing a bus over which the contents of one of the registers may be transmitted whenever the register is selected for connection with the bus. Additionally, selection of one-half of a register at a time for application on a bus, or two halves of a register for application to a bus has been known. In certain instances, the reversing position of halves of a register (exchanging the position of the low order half with the high order half) with respect to the position of the data on the bus has also been known. In all of these cases, complex gating circuitry, decoding circuitry, and a necessarily expansive amount of data flow has been involved.

Therefore, a primary object of the present invention is to provide an improved flexible register apparatus.

Another object of the present invention is provision of a flexible register busing means.

Other objects of the invention include:

Provision of a flexible register output bus apparatus;

Provision of a data transmitting means which may be selected for use by a plurality of independent registers;

Provision of improved data transmitting means wherein the selection of a register for application of data manifestations to said transmitting means is independent of the destination of said data manifestations;

Provision of a data transmission means for interconnection with data registers, the connection of a data register with a particular data transmission means being independent of the register which is selected therefor.

In accordance with the present invention, means are provided to connect a particular data register with a data register transmitting means, or bus, in dependence upon the condition which has selected the register for transmission of data; means are provided to connect a selected transmitting means to a particular register, the particular transmitting means selected being dependent upon the condition which has selected the register, rather than being dependent upon the register selected, or the destination of the data manifestations within the register.

The present invention permits gating a single register onto a pair of buses simultaneously, gating pairs of registers onto either of a pair of buses, without regard to the order in which said registers may be addressed, or without regard to the ordinal value of bit positions within the buses as they are applied to a destination connected to said transmission means. The invention further permits the utilization of a minimal amount of hardware, with the attendant cost and time savings resulting therefrom.

The foregoing and other objects, features and advantages of the present invention will become more apparent in the light of a detailed description of a preferred embodiment thereof, as shown in the accompaning drawings.

The drawings are illustrative block diagrams, schematic block diagrams, timing diagrams, charts and illustrations of an embodiment of the present improvement, as set forth in a Large Scale Data Processing System which is referred to as "said environmental system," as set forth in the following list:

TABLE OF FIGURES

Figure 1:
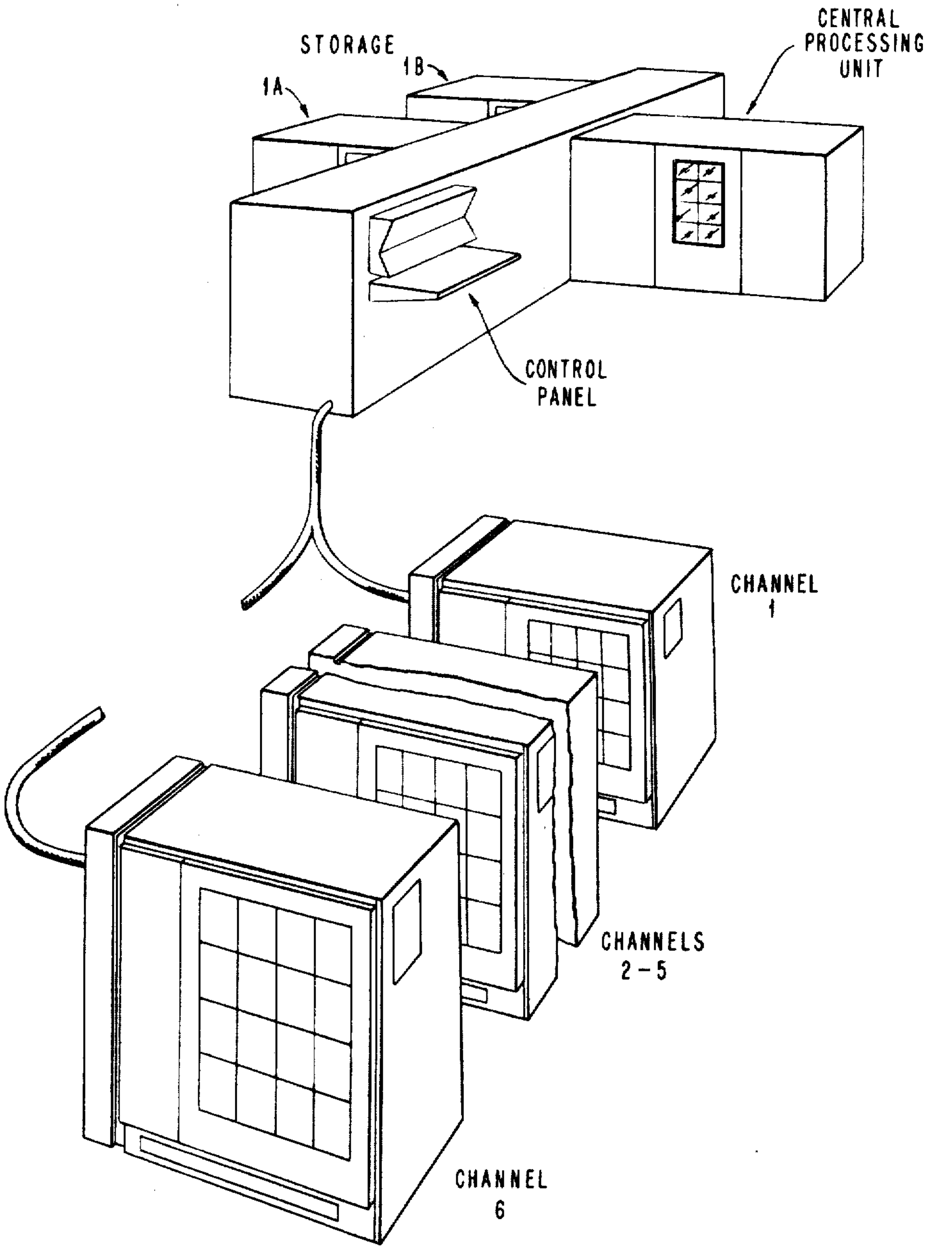
Figure 9:
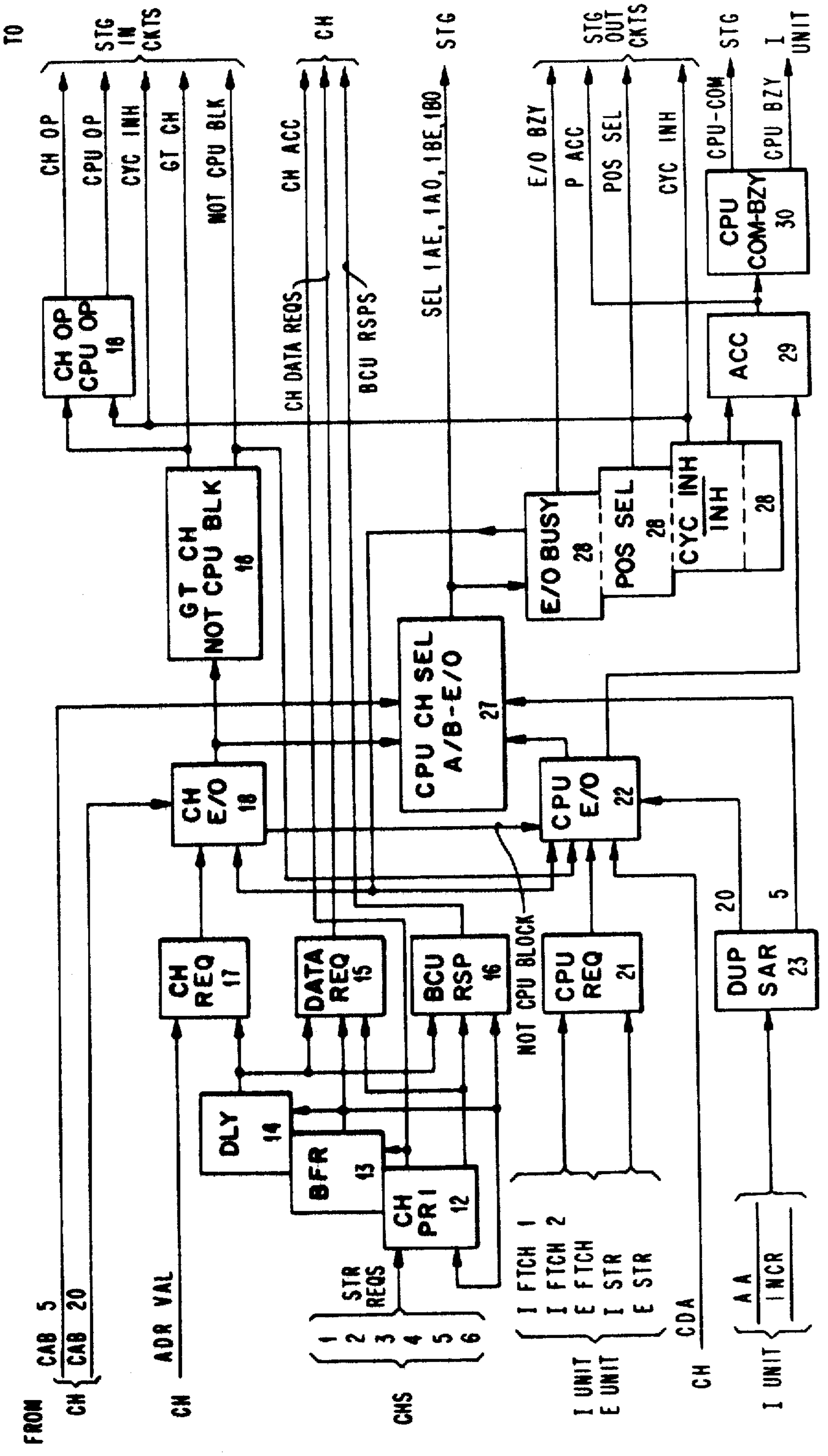
Figure 10:
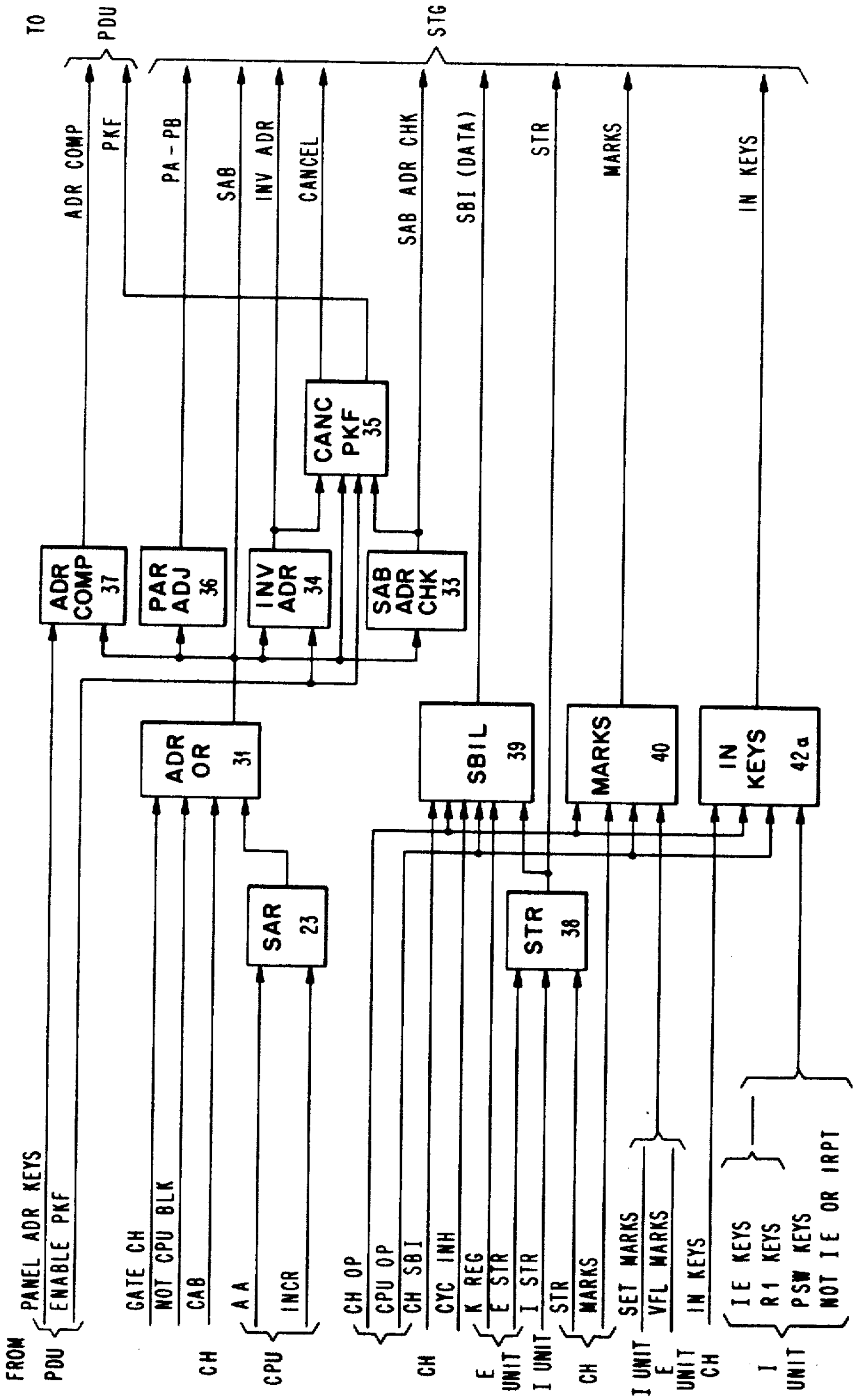
Figure 11:
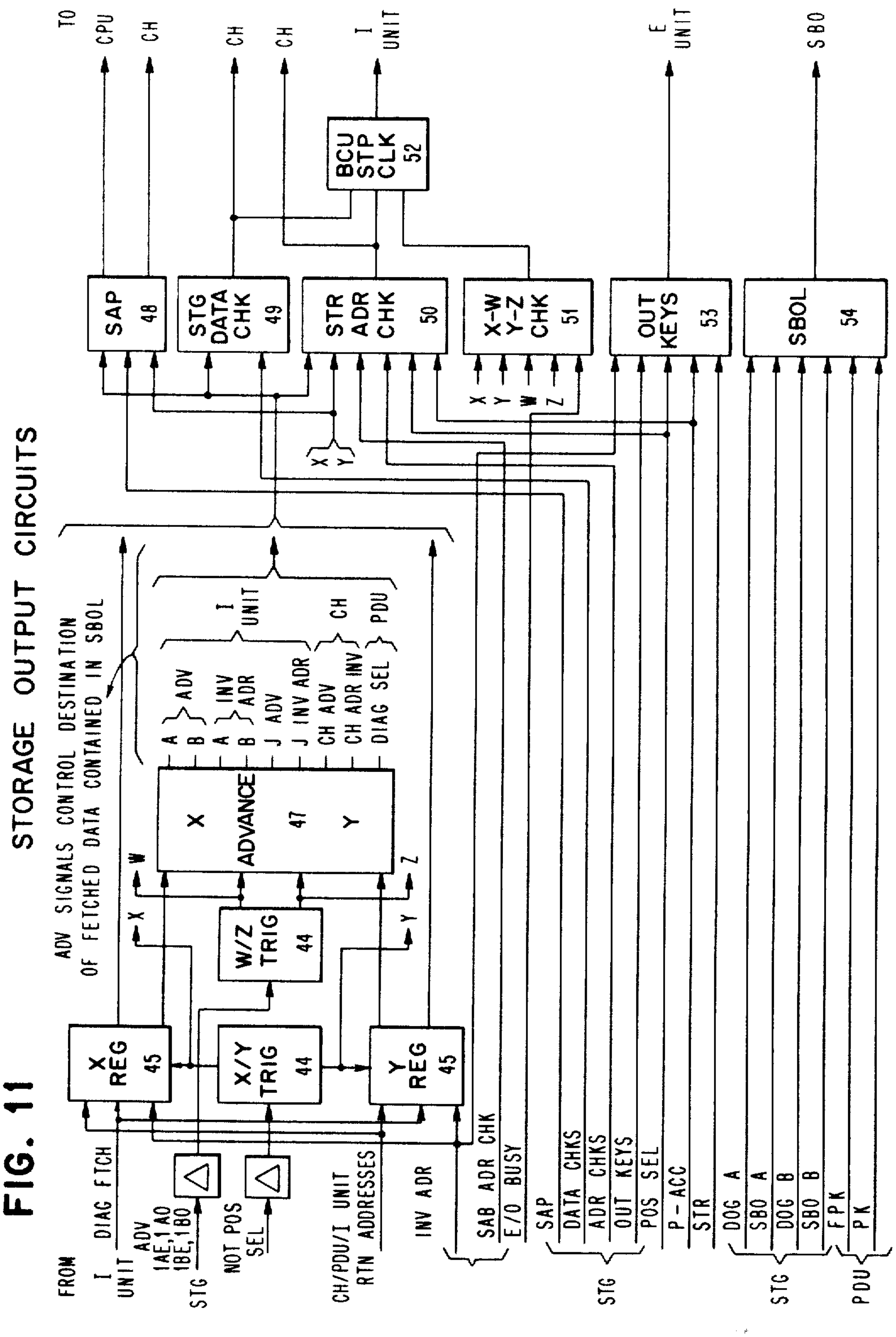
Figure 60:
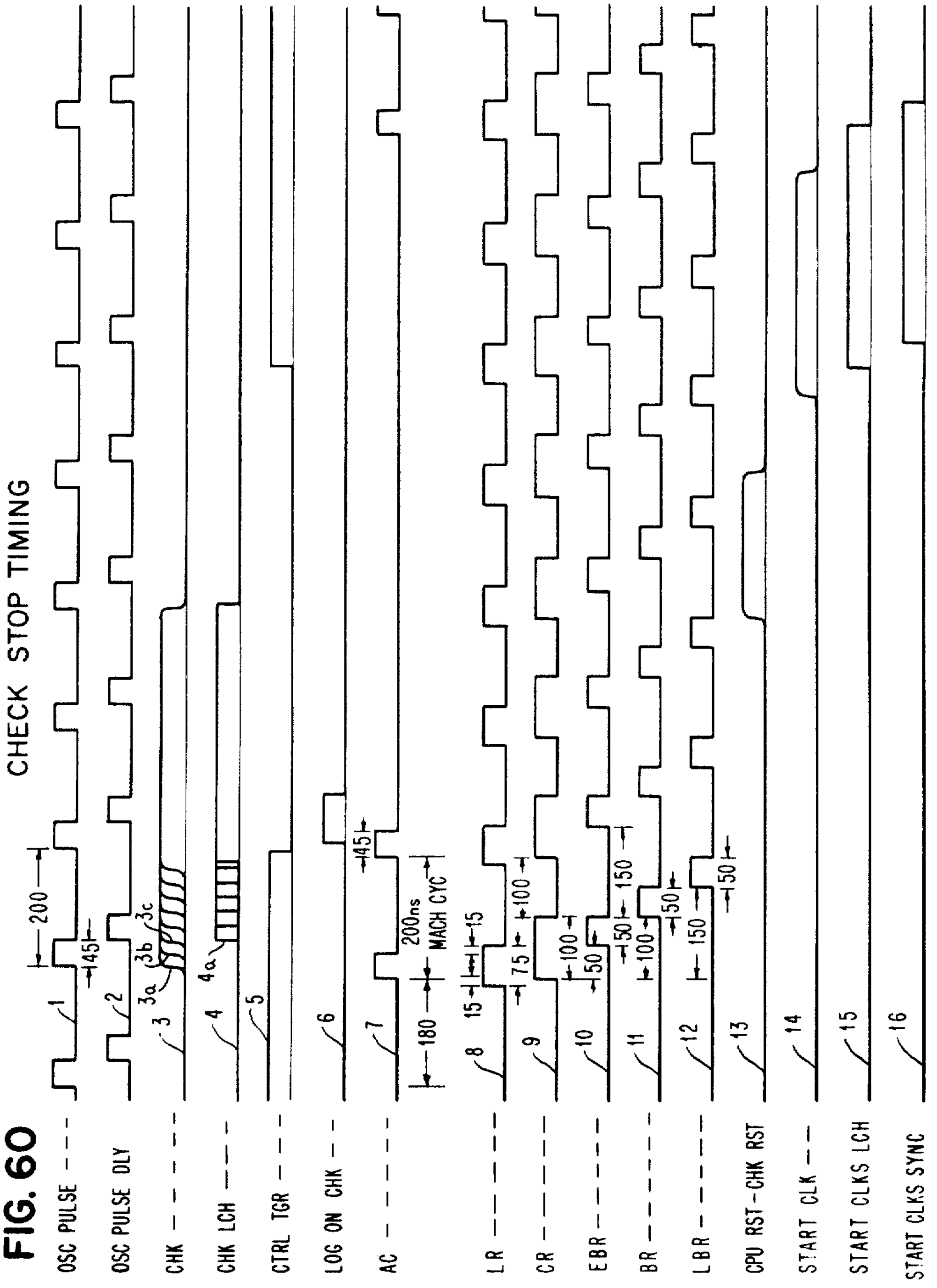
Figure 68:
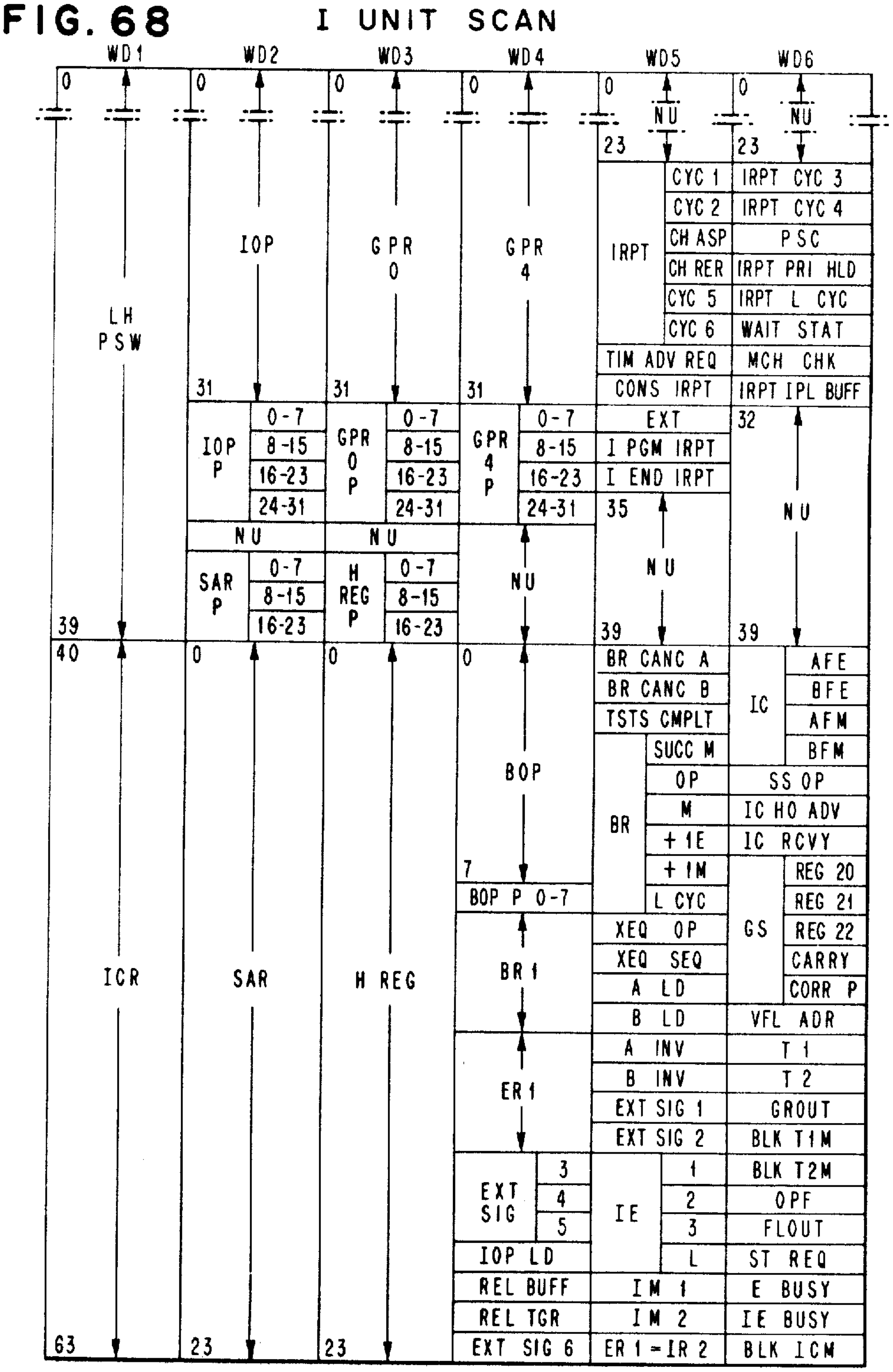
Figure 69:
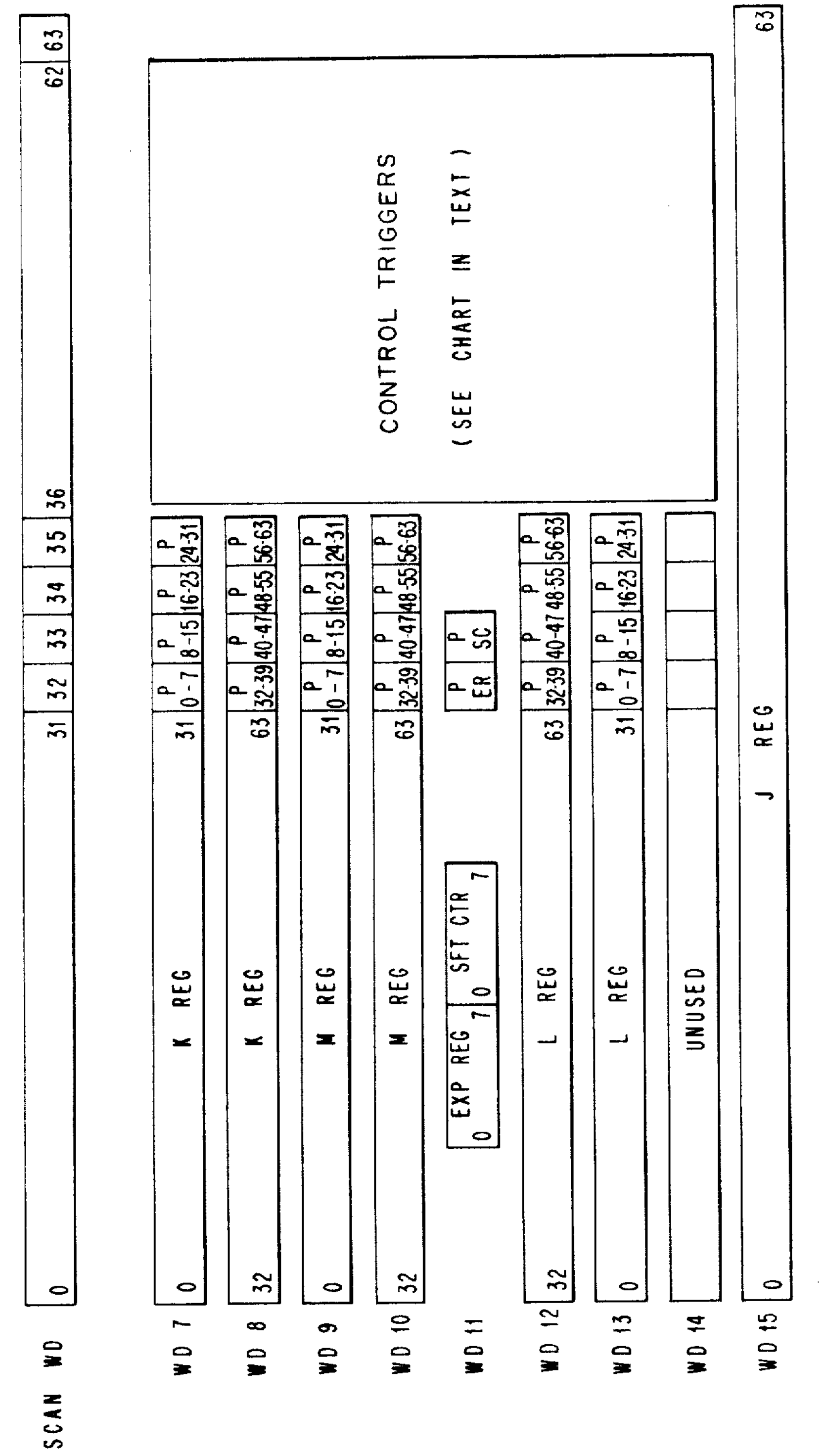
Figure 72:
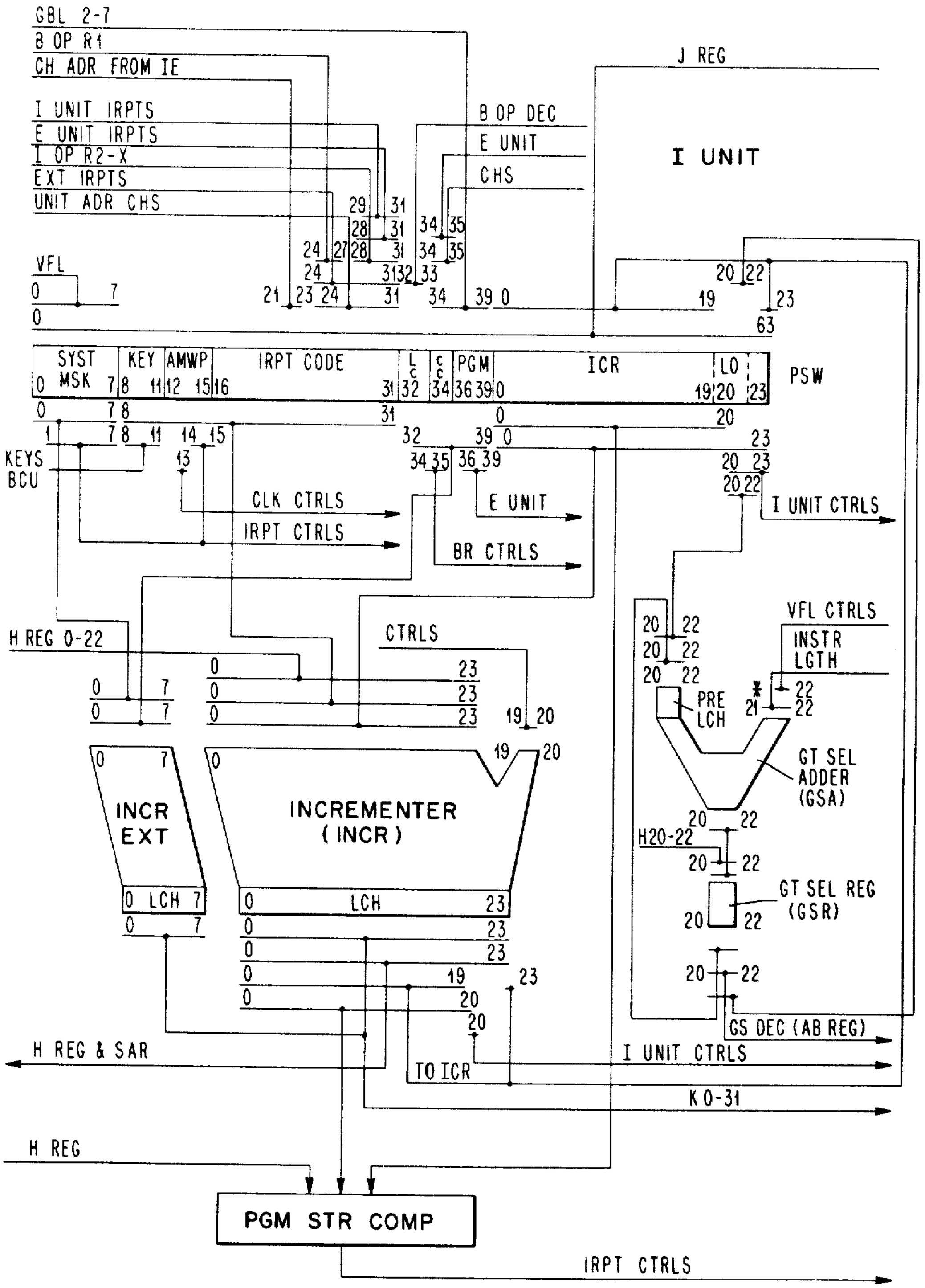
Figure 73:
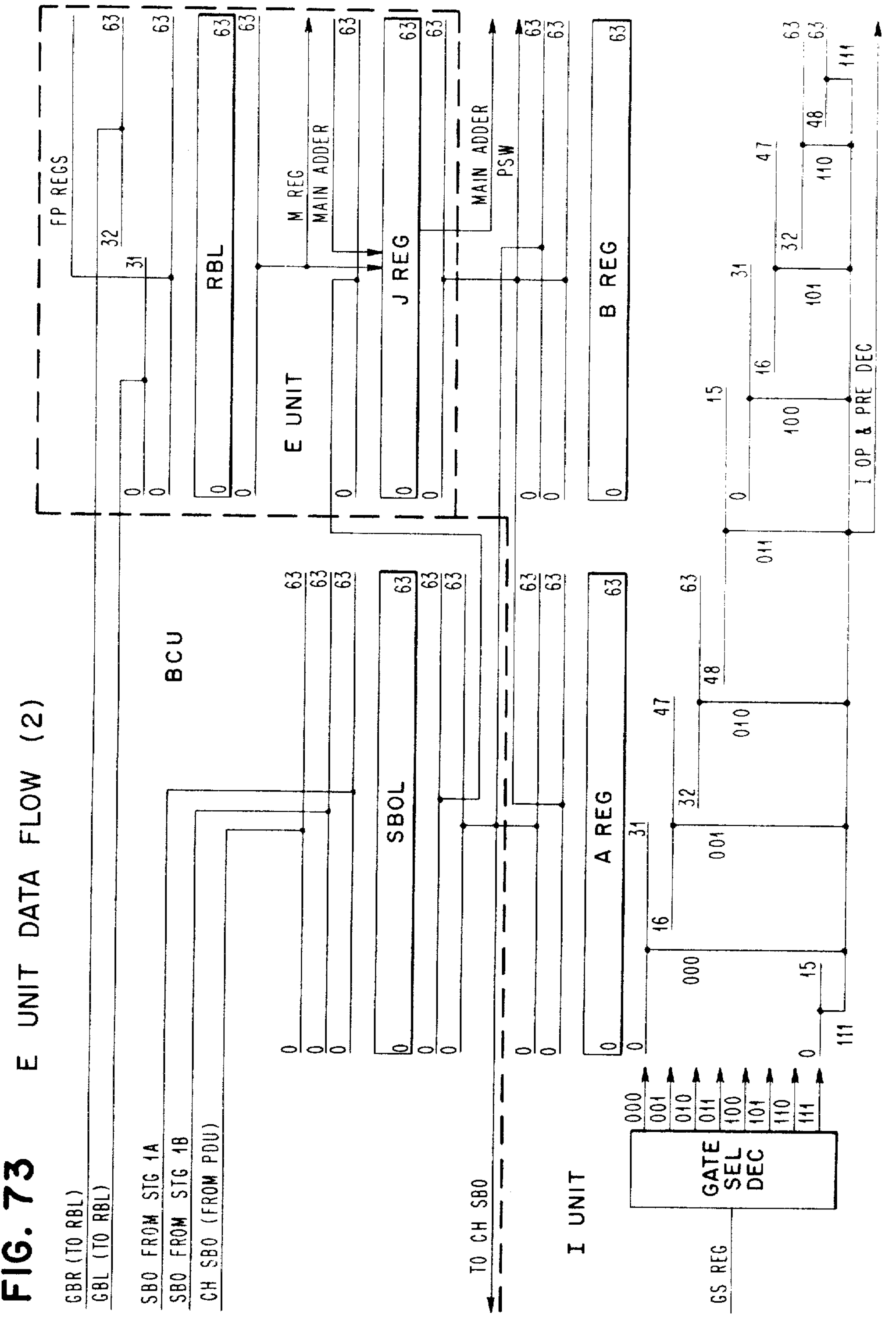
Figure 74:
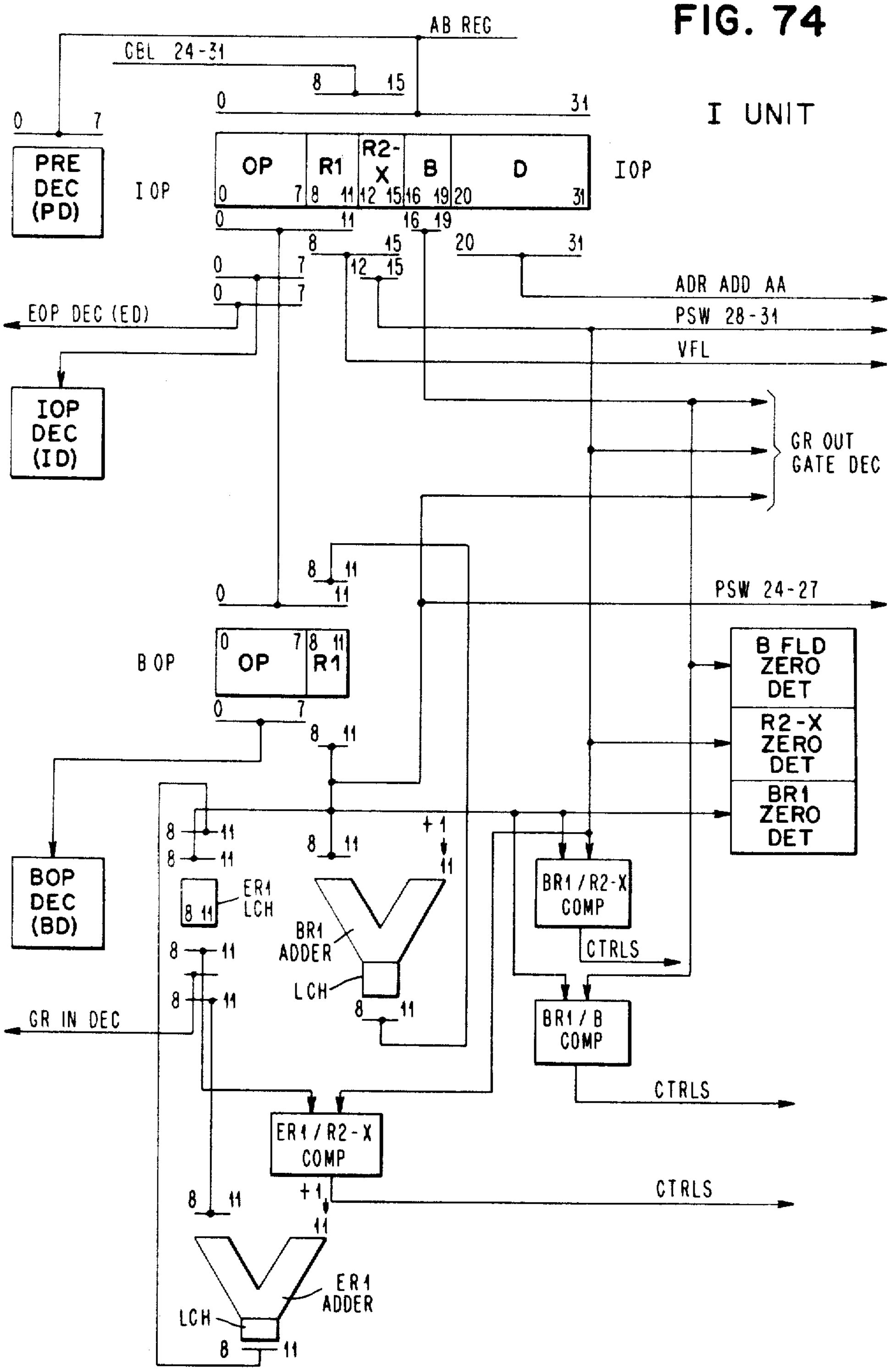
Figure 75:
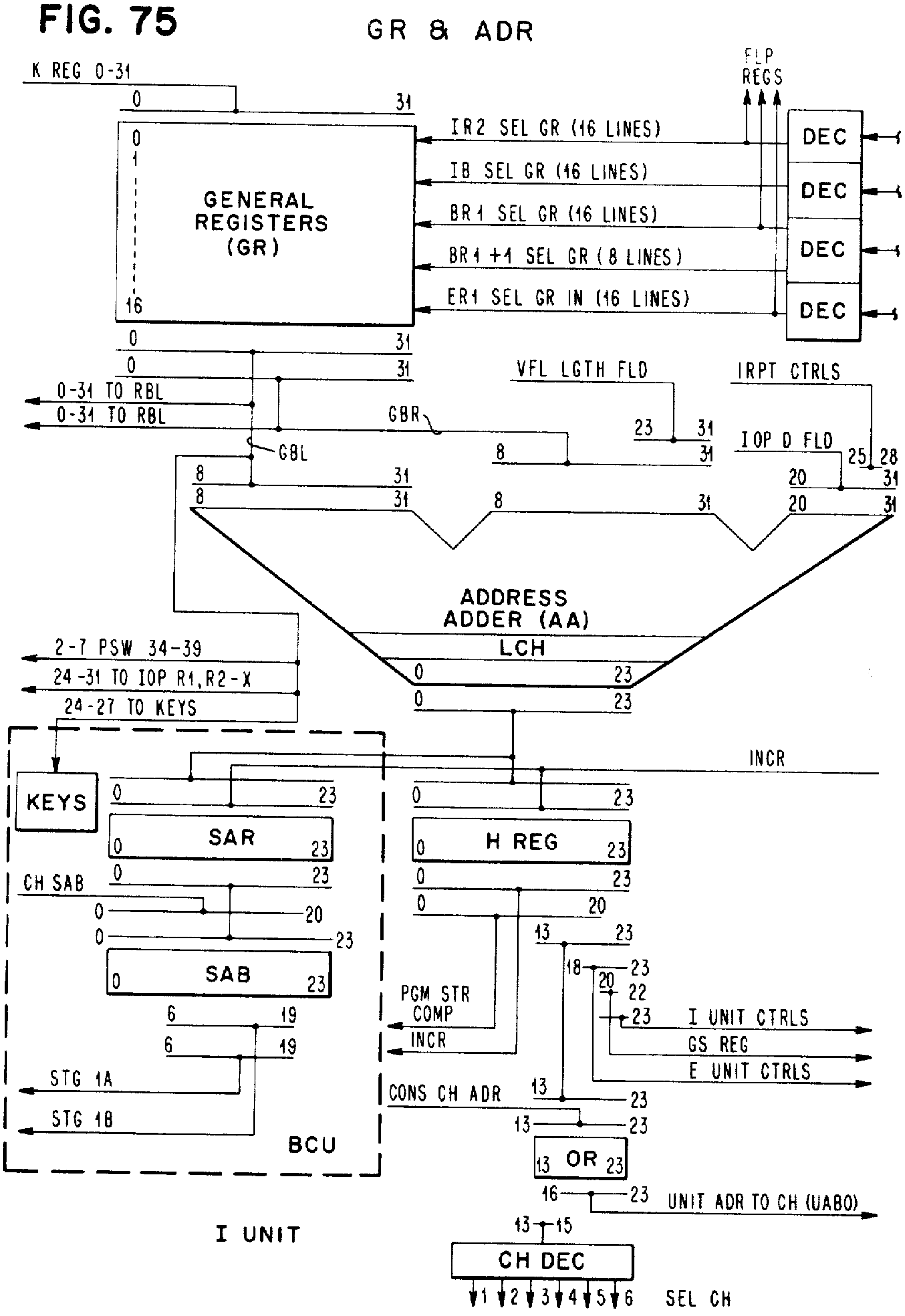
Figure 76:
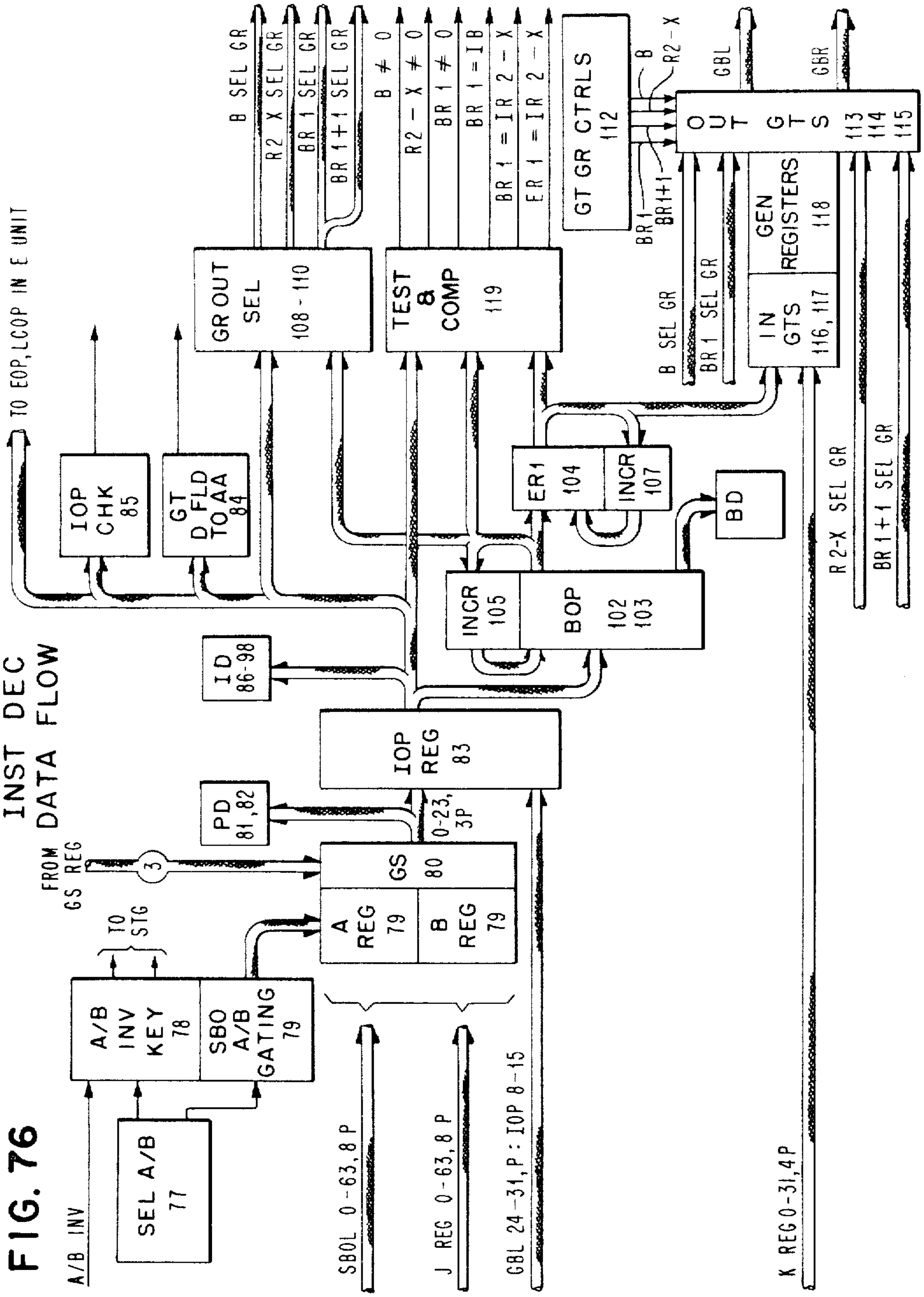
Figure 77:
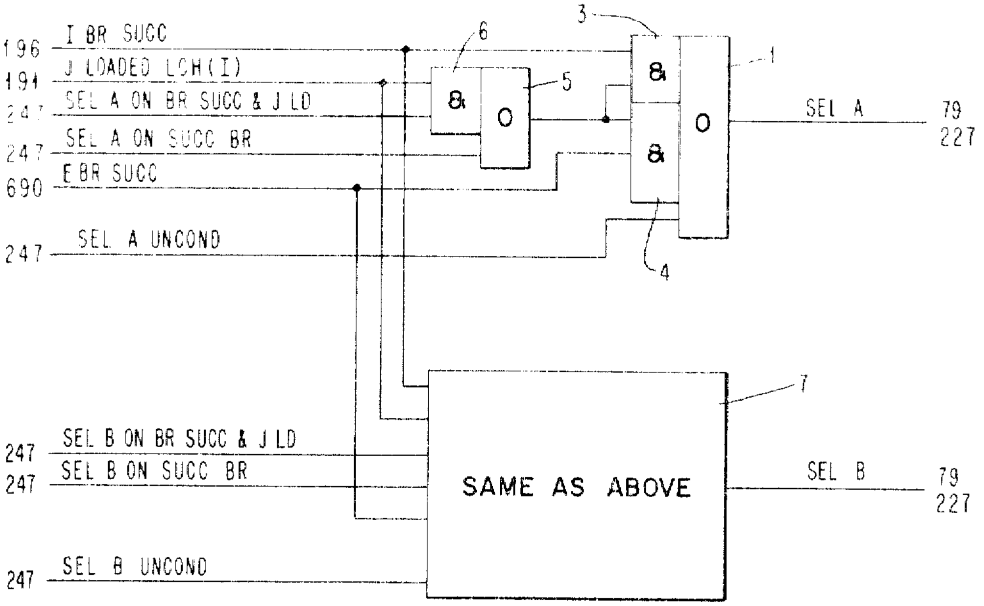
Figure 78:
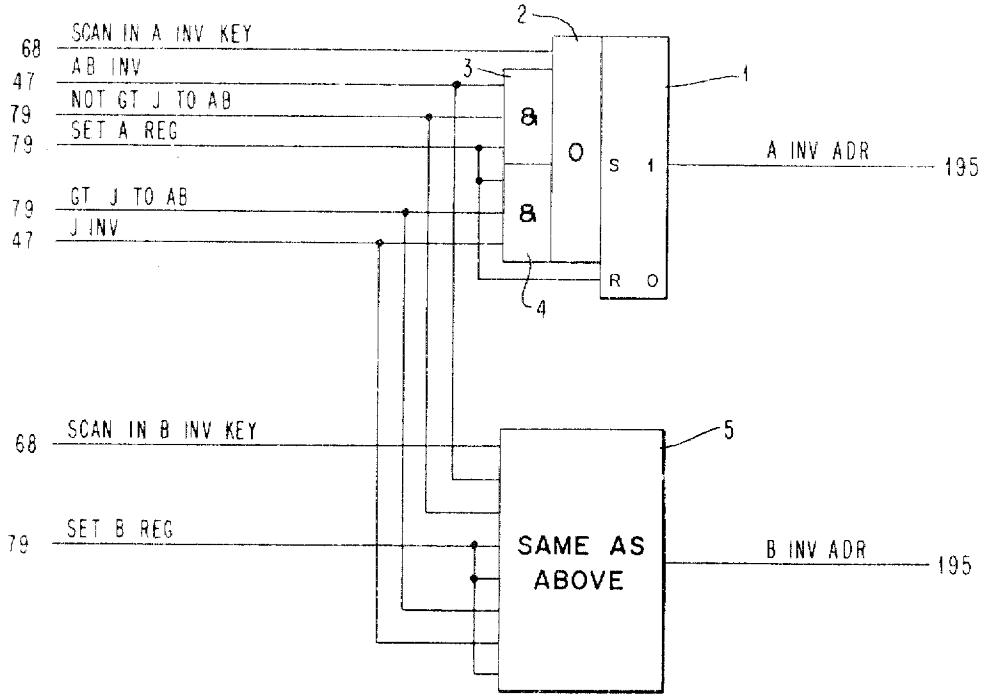
Figure 79:
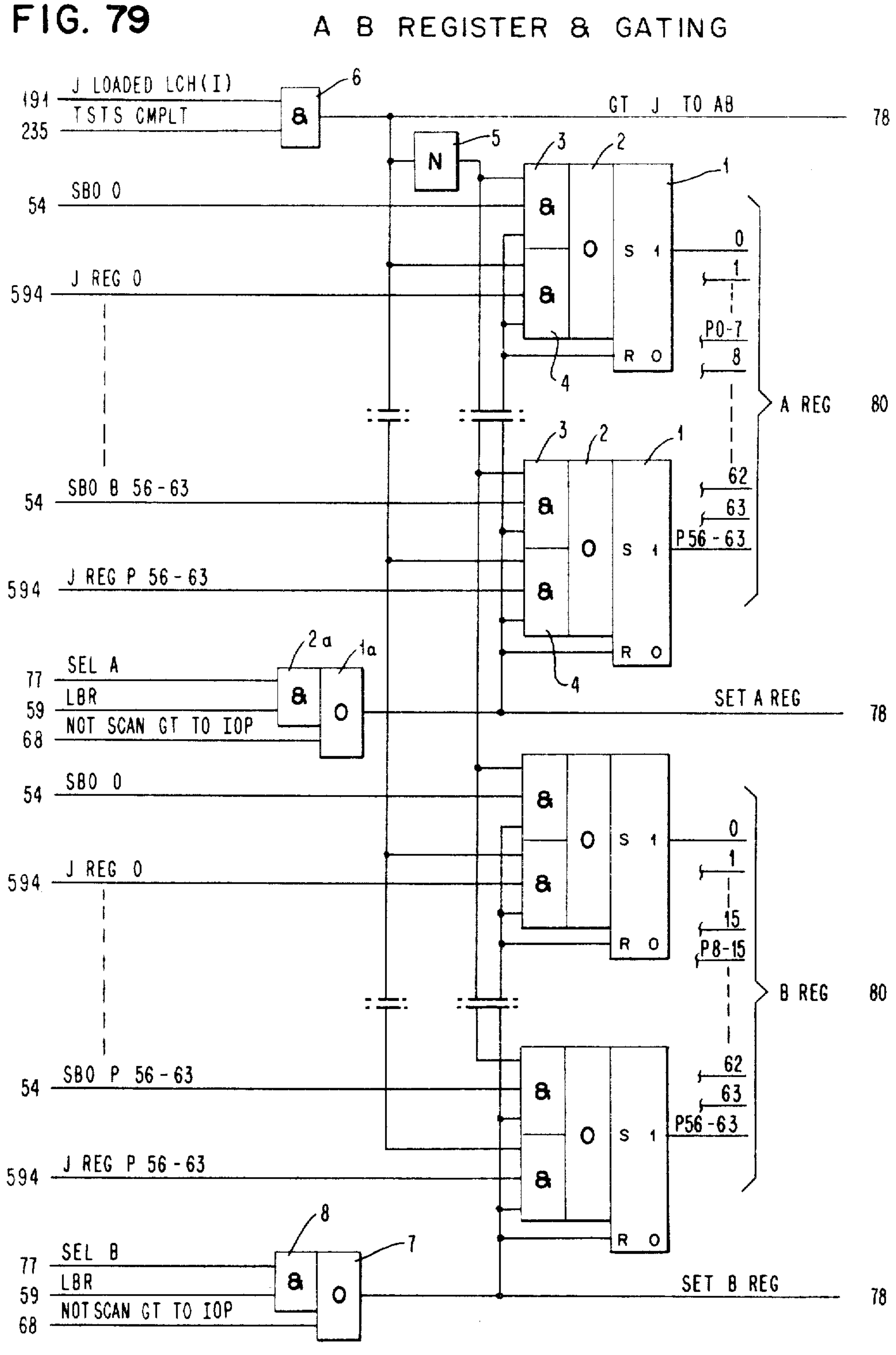
Figure 80:
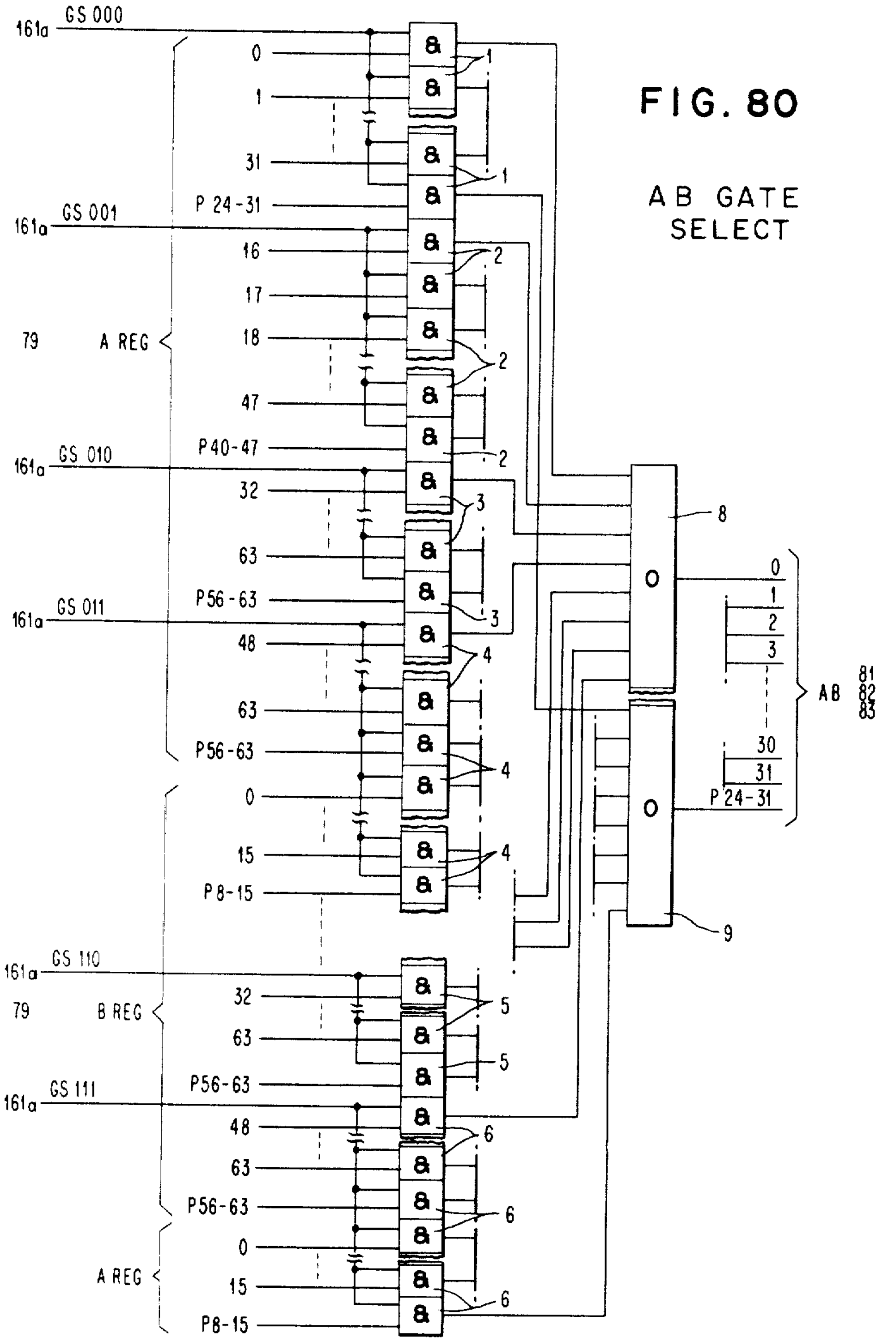
Figure 81:
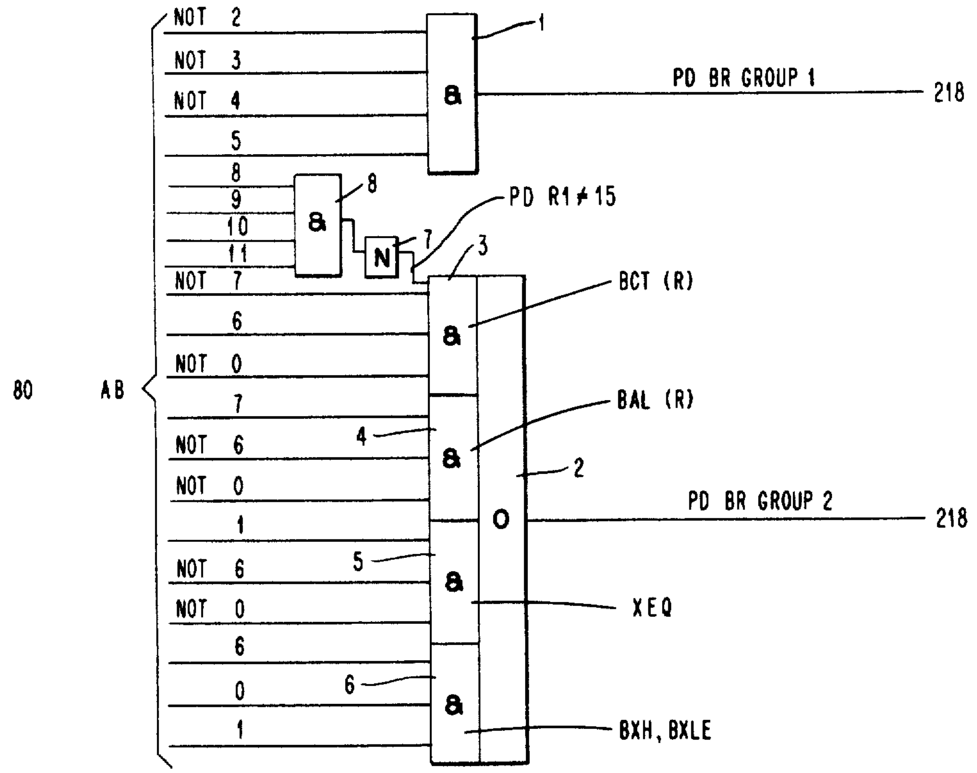
Figure 82:
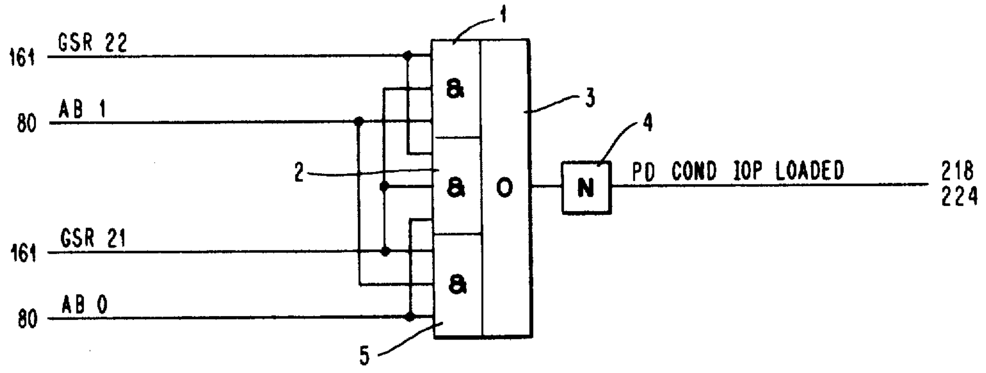
Figure 83:
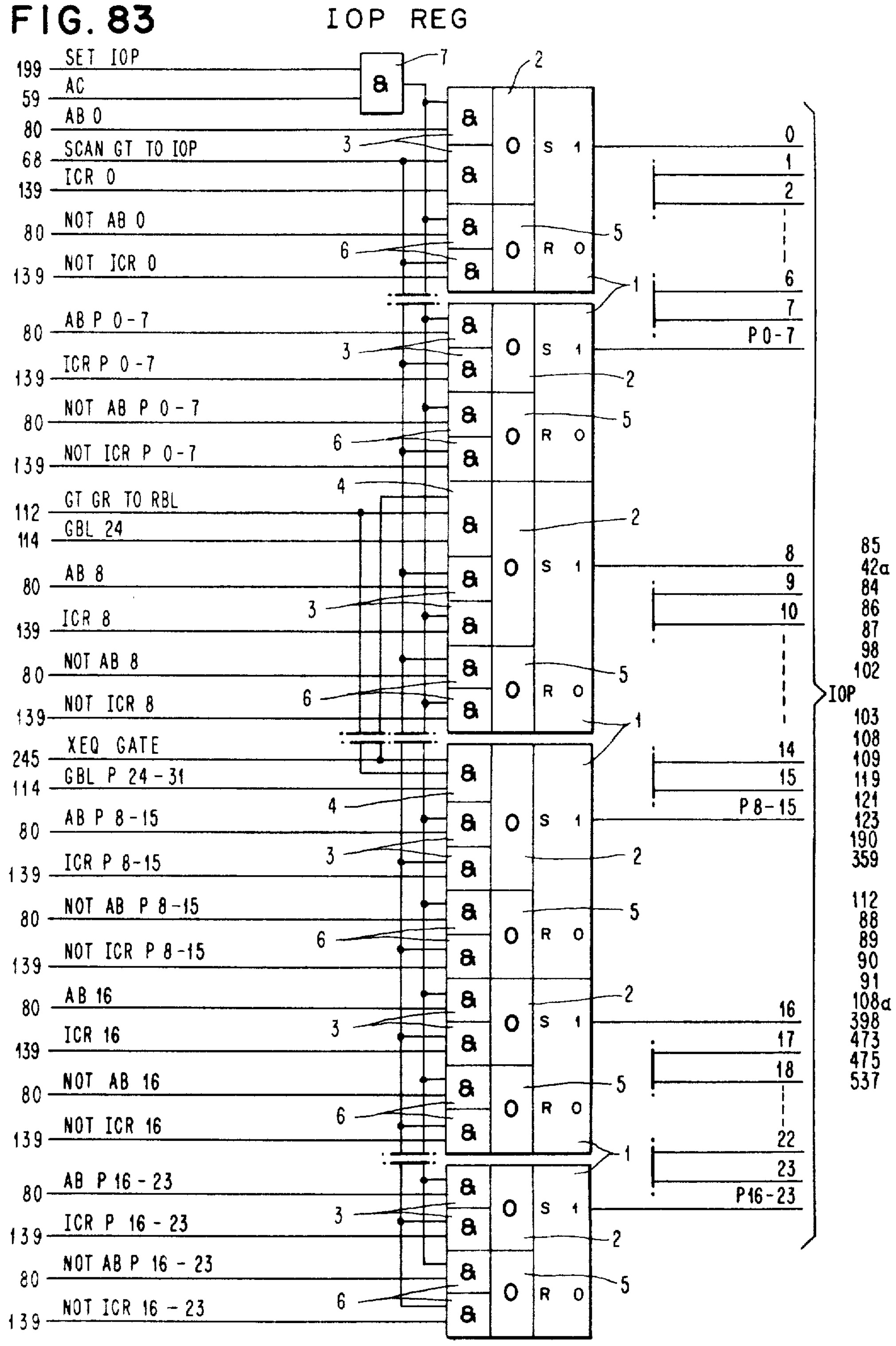
Figure 84:
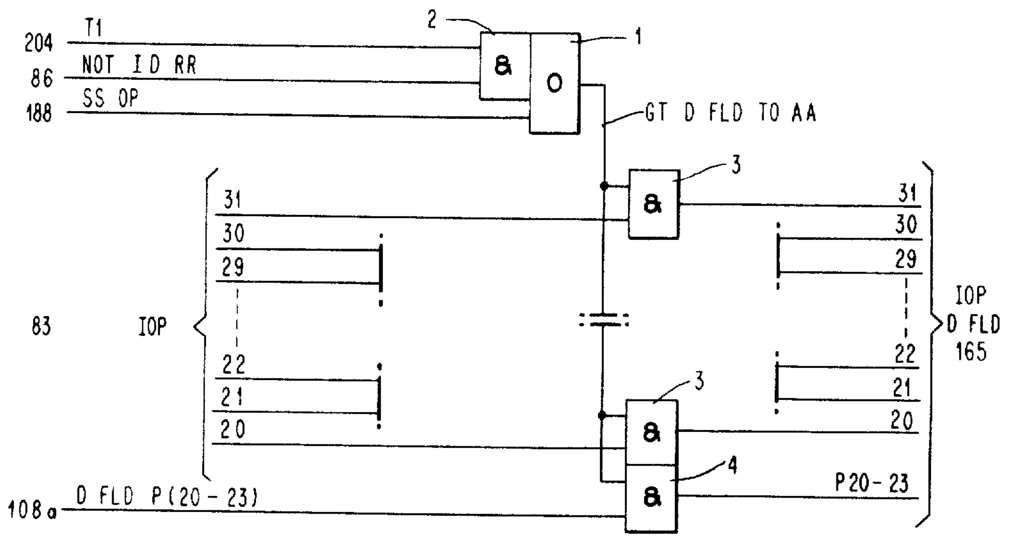
Figure 85:
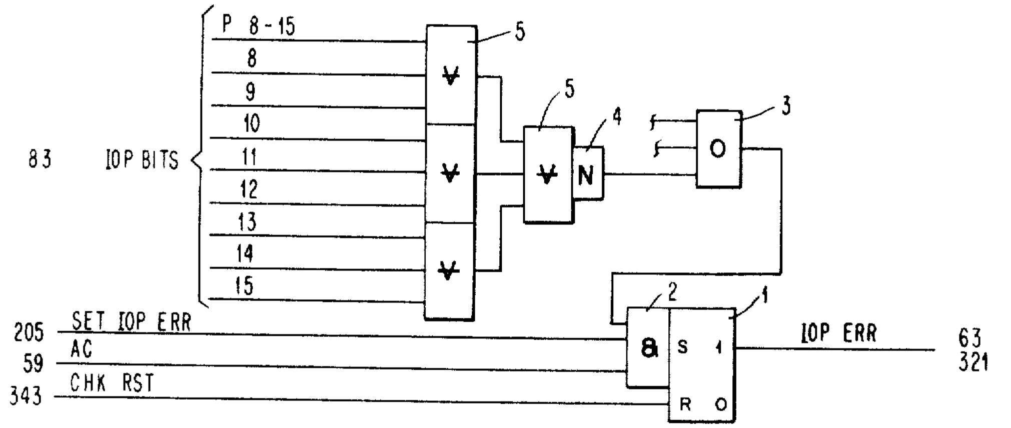
Figure 86:
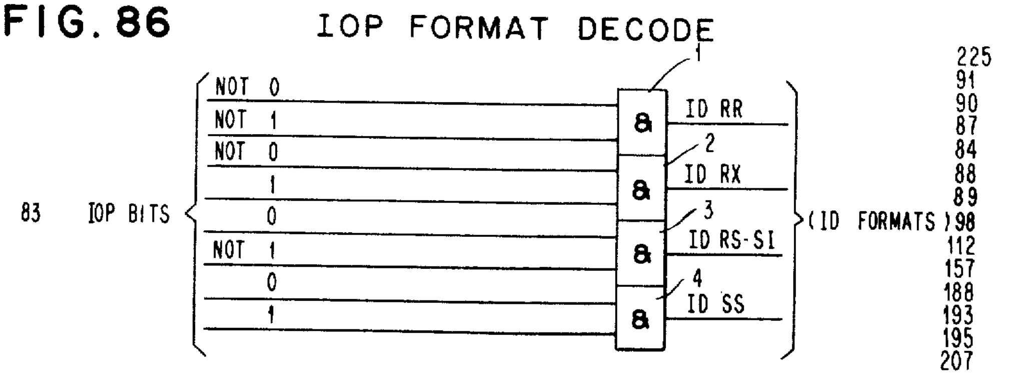
Figure 87:
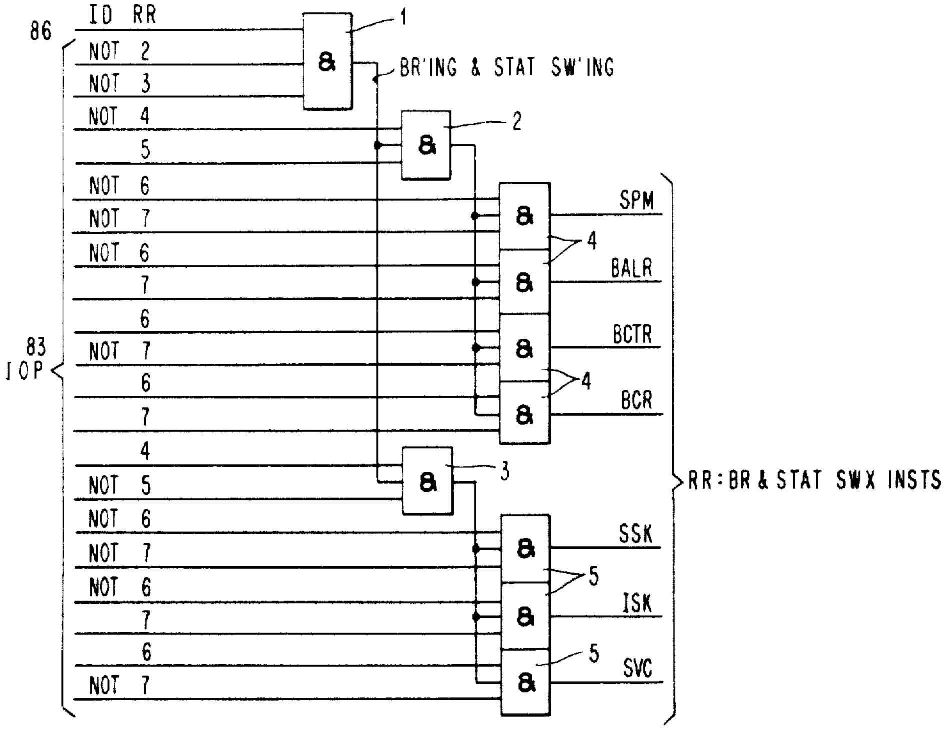
Figure 88:
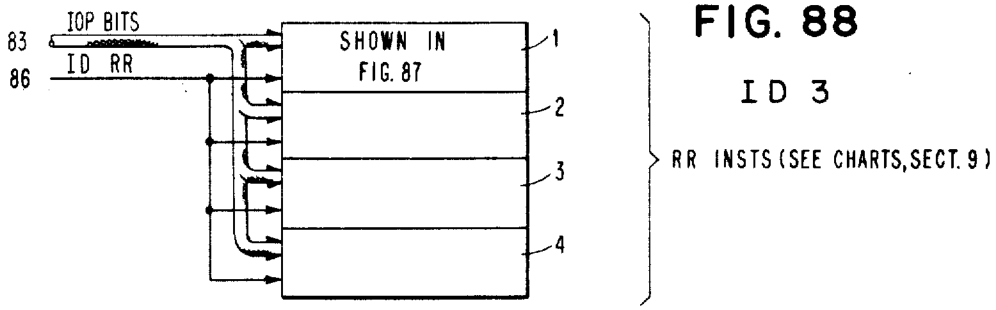
Figure 89:
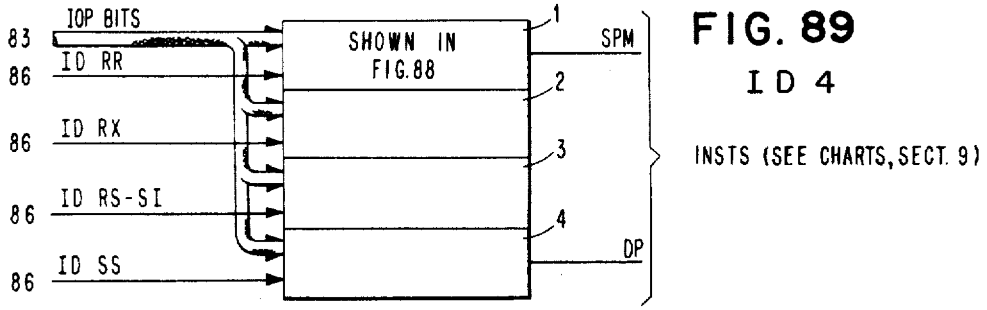
Figure 90:
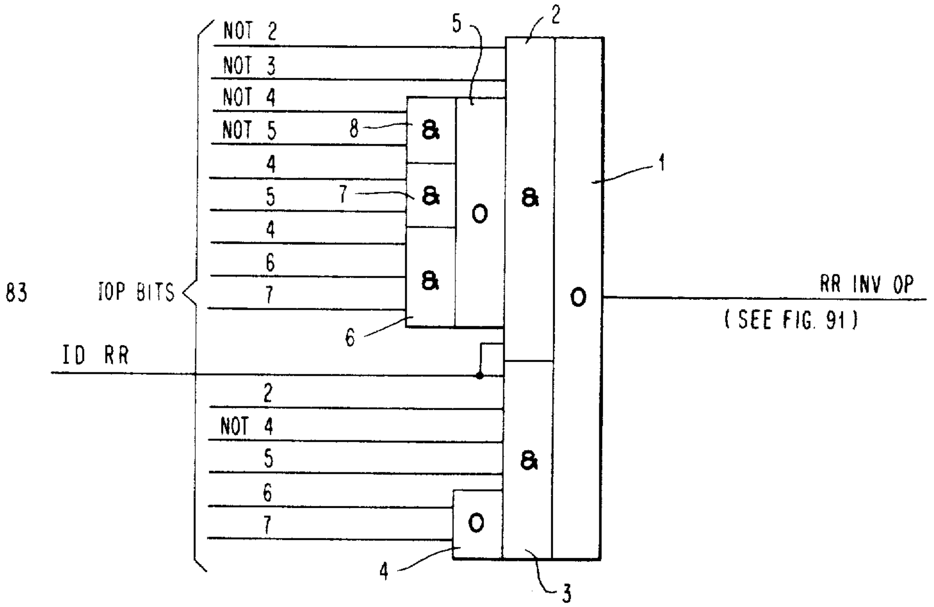
Figure 91:
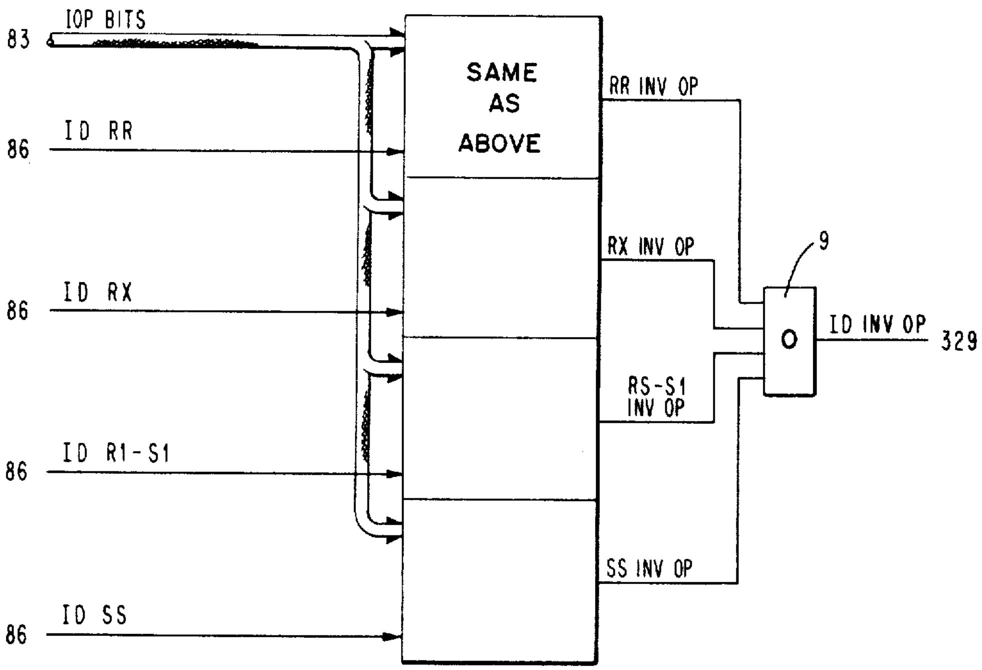
Figure 100:
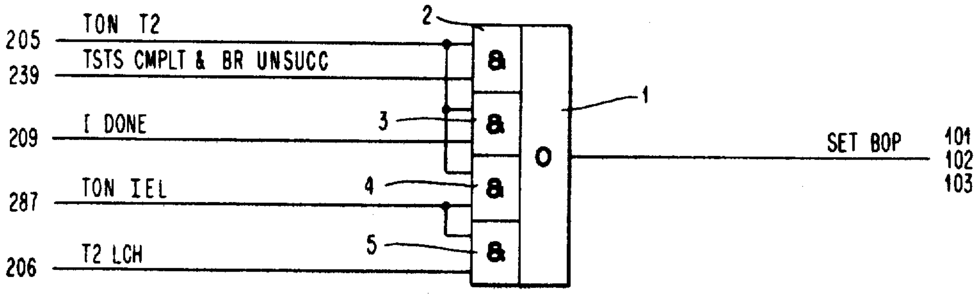
Figure 101:
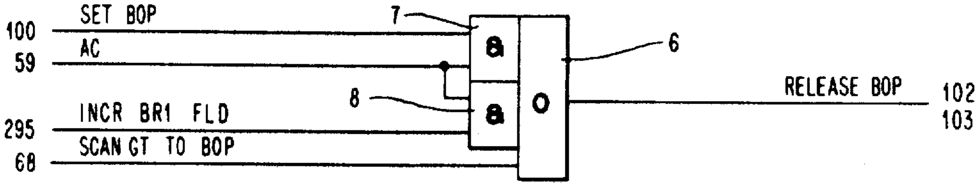
Figure 102:
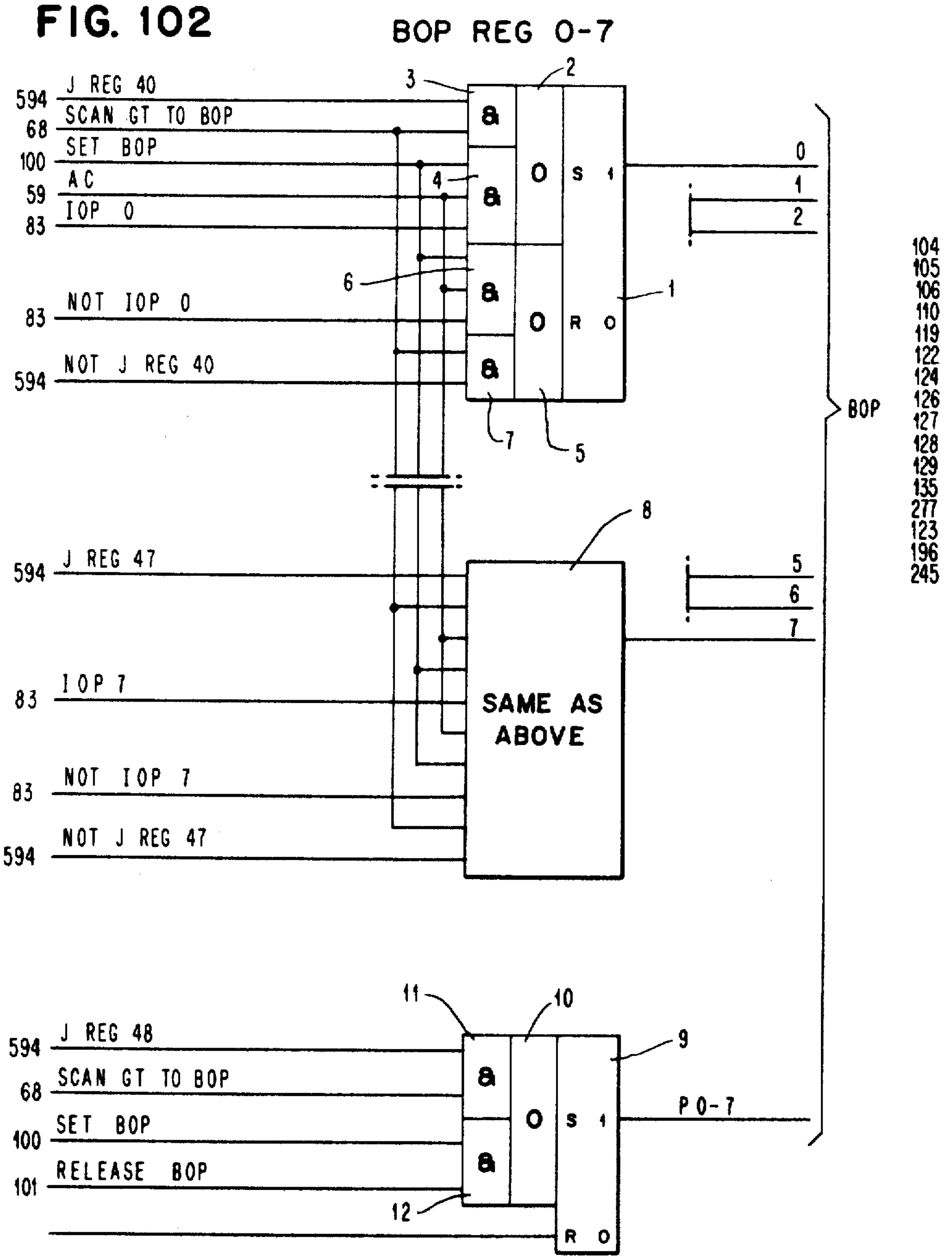
Figure 103:
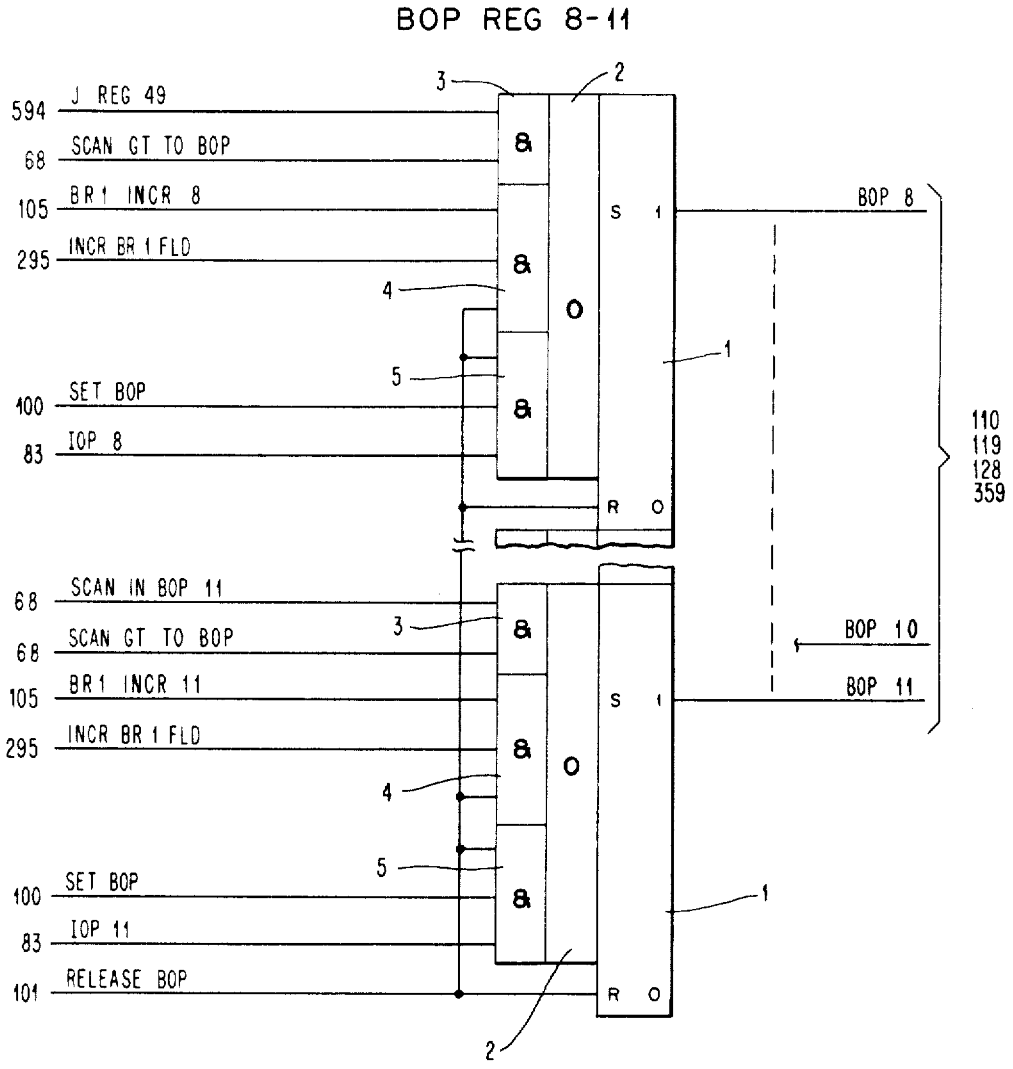
Figure 104:
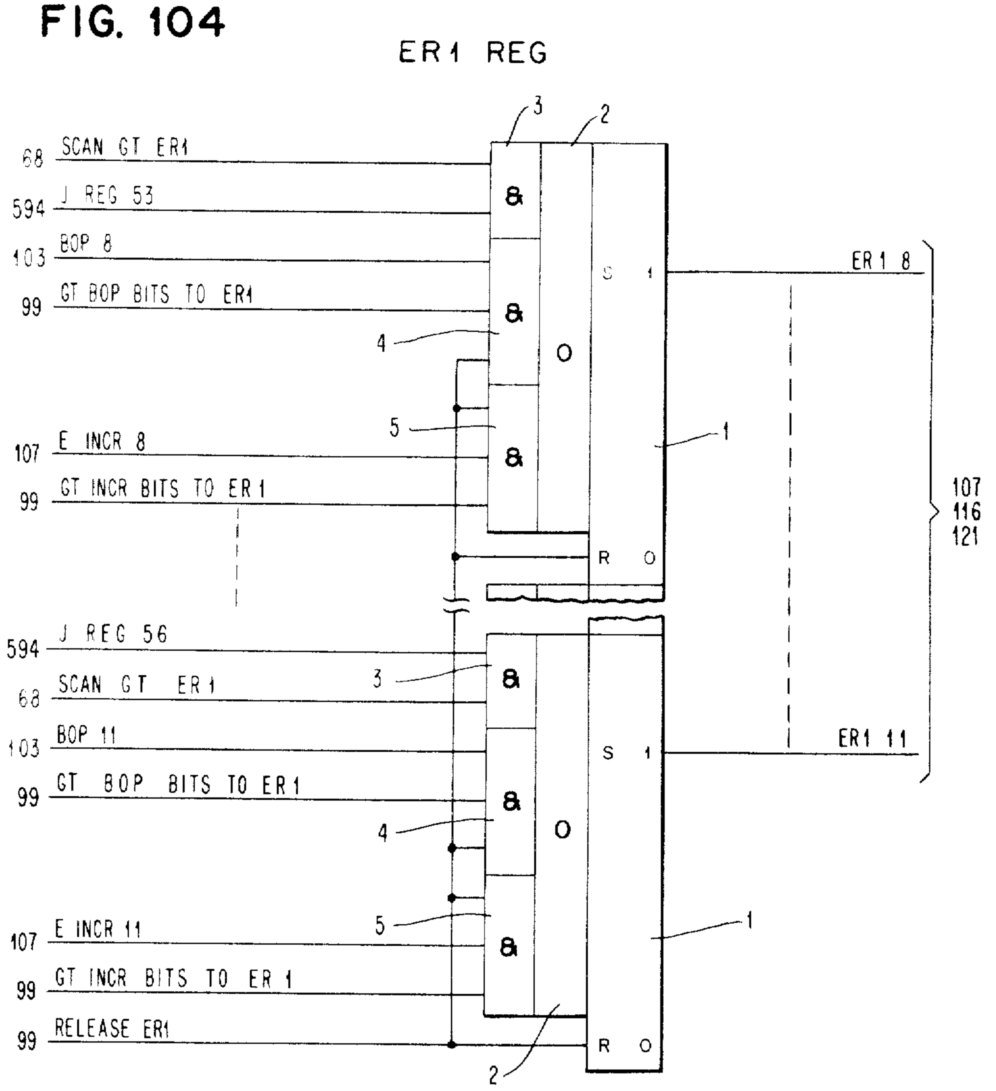
Figure 105:
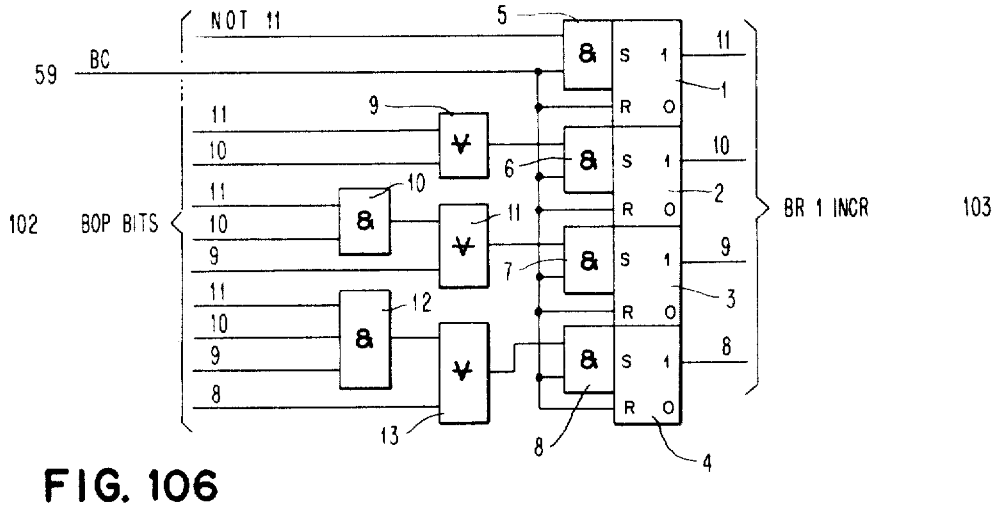
Figure 106:
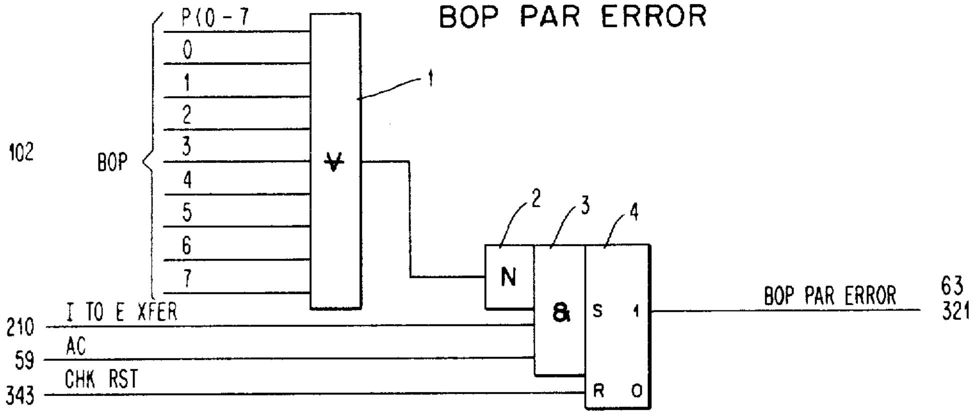
Figure 107:
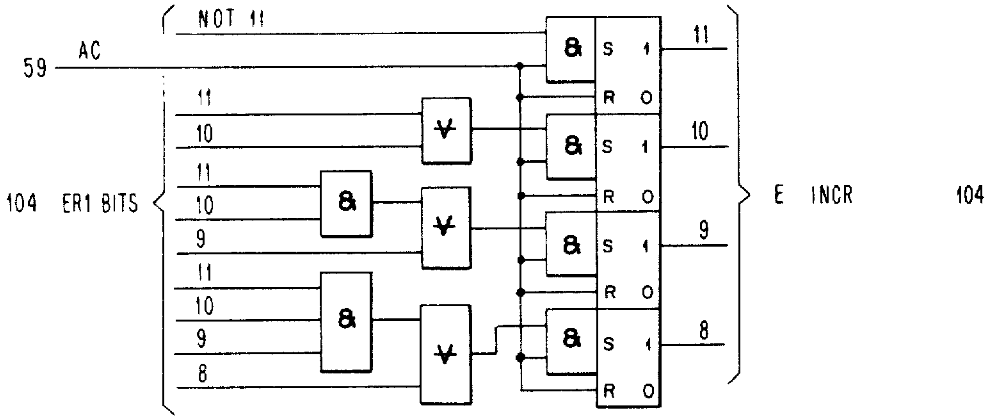
Figure 108:
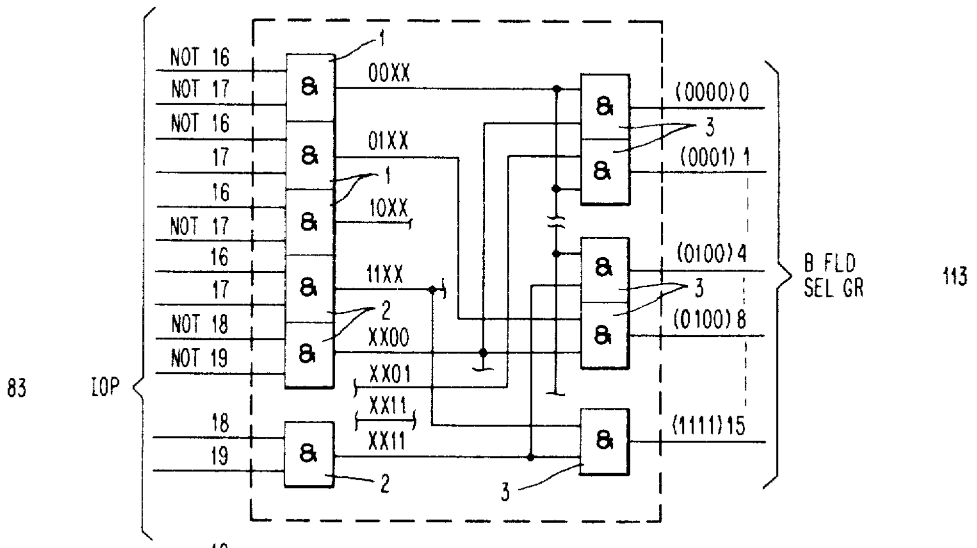
Figure 108A:
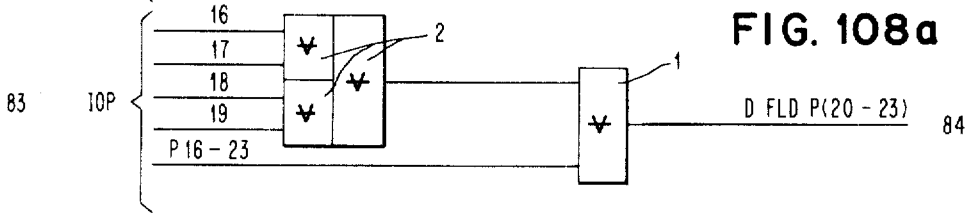
Figure 109:
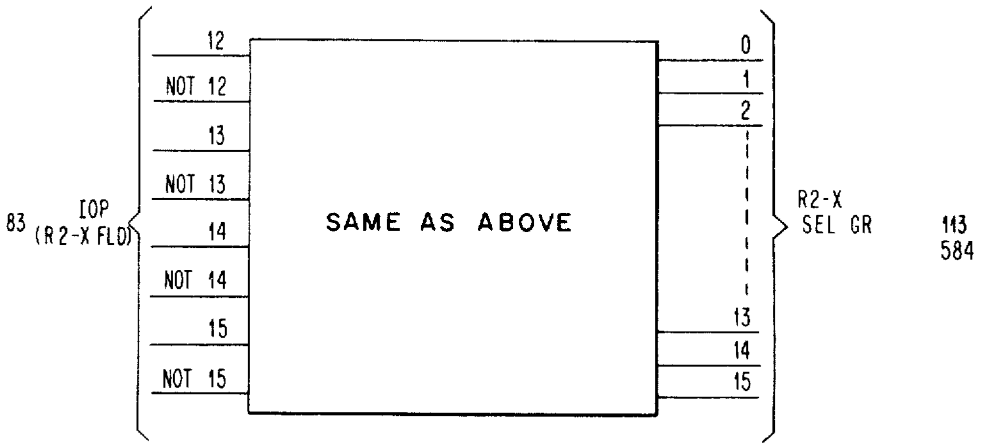
Figure 110:
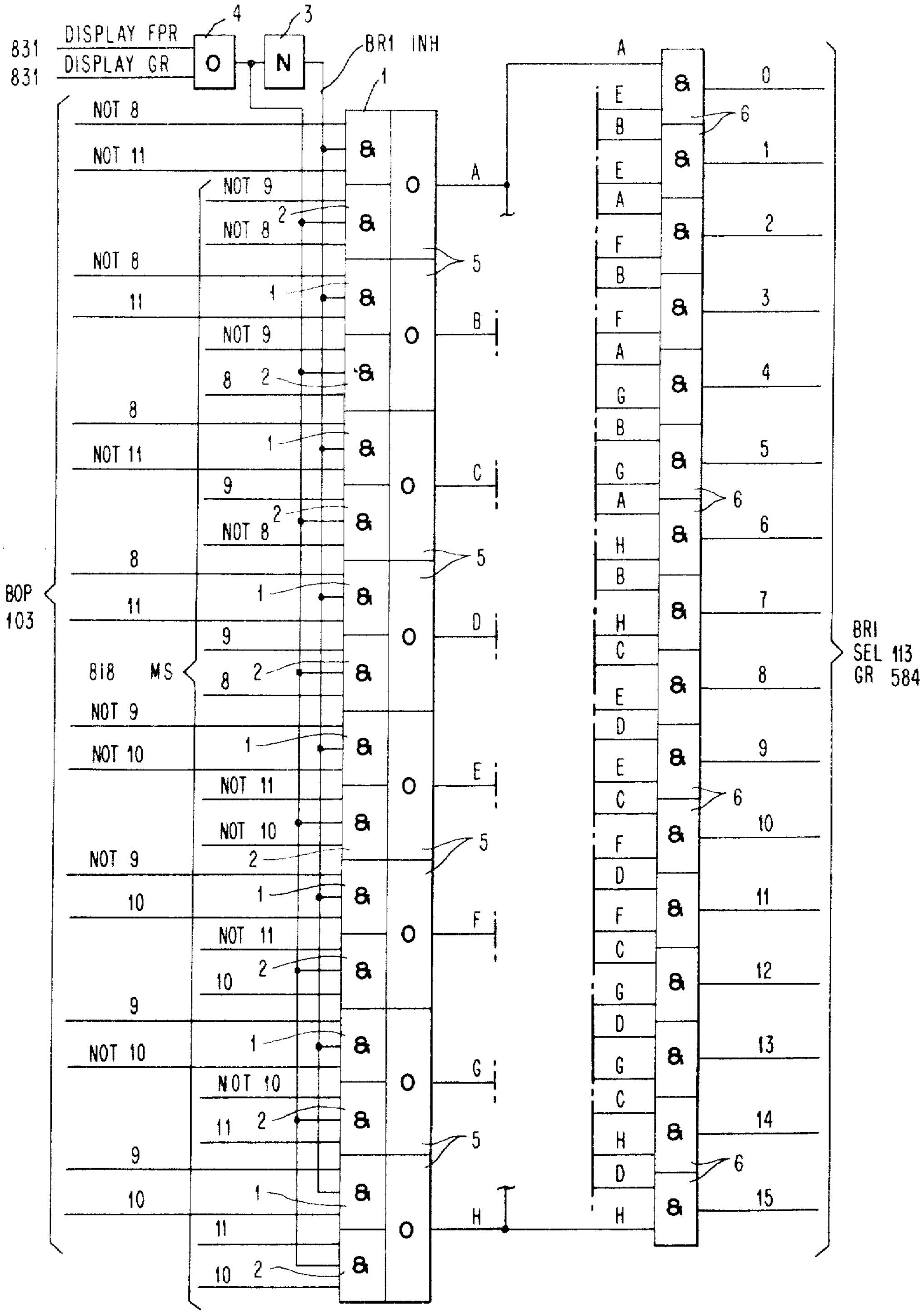
Figure 111:
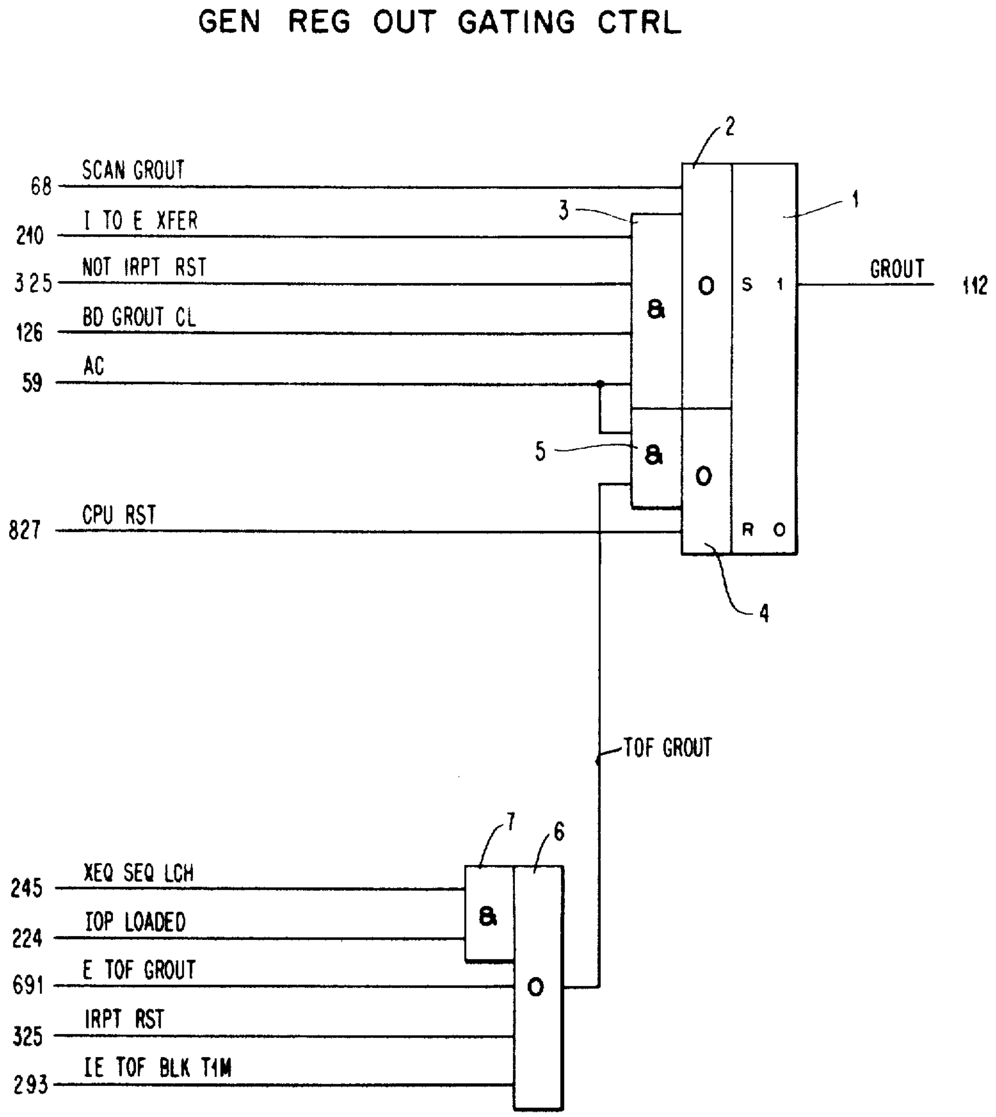
Figure 112:
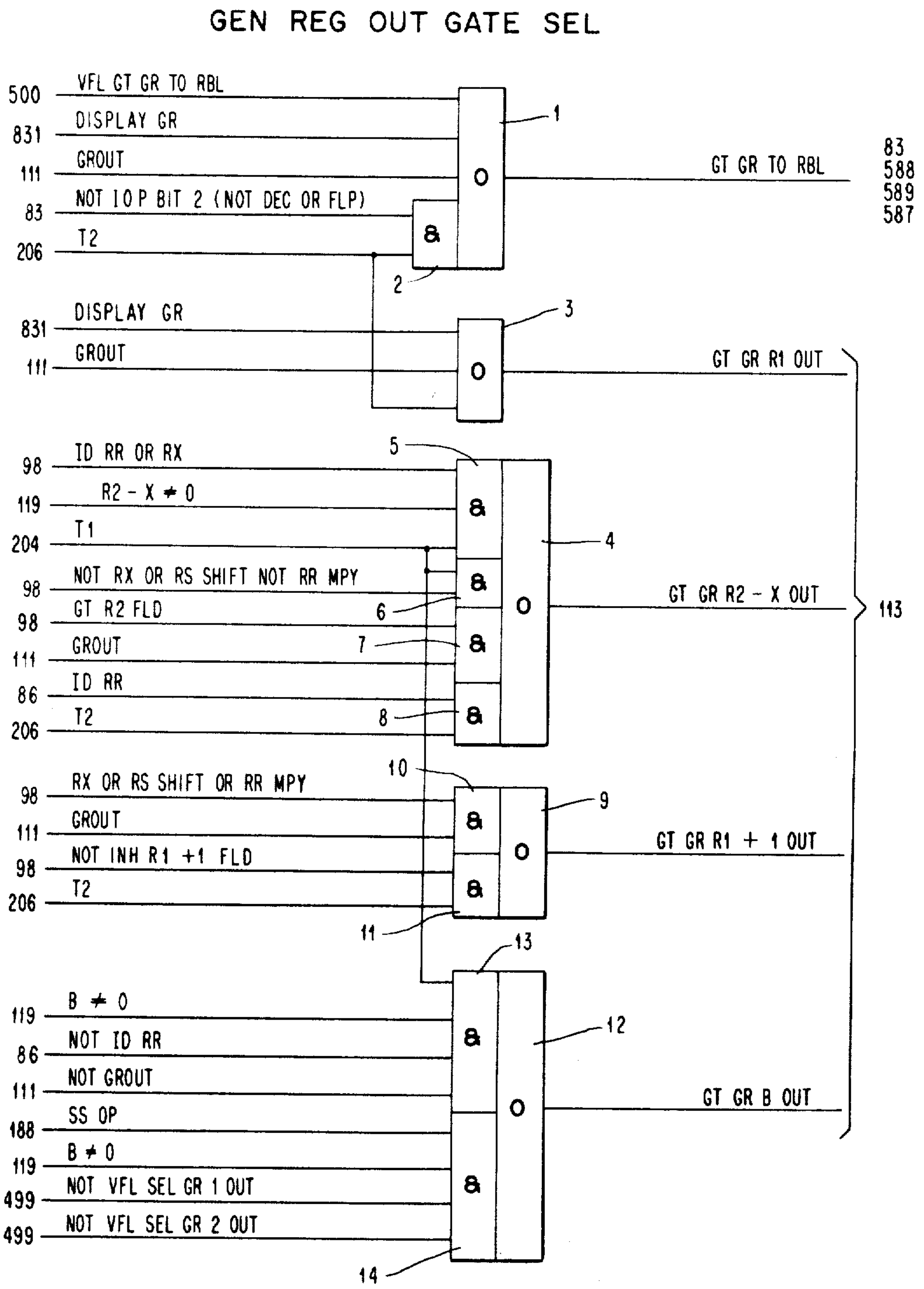

| | Sheet |
|---|---|
| FIG. 1, system illustration | 1 |
| FIG. 2, environmental system | 2 |
| FIGS. 3*a*–5*b*, component circuits | 3 |
| FIGS. 6*a*–8*b*, component circuits | 4 |
| FIG. 9, selection circuits | 5 |
| FIG. 10, storage input circuits | 6 |
| FIG. 11, storage output circuits | 7 |
| FIGS. 12–59 are illustrative of said environmental system | 8–38 |
| FIG. 60, check stop timing | 39 |
| FIGS. 61–67 are illustrative of said environmental system | 40–43 |
| FIG. 68, I unit scan | 44 |
| FIG. 69, E unit scan | 45 |
| FIGS. 70–71 are illustrative of said environmental system | 46–47 |
| FIG. 72, E unit data flow (1) | 48 |
| FIG. 73, E unit data flow (2) | 49 |
| FIG. 74, I unit | 50 |
| FIG. 75, *GR+ADR* | 51 |
| FIG. 76, INST DEC data flow | 52 |
| FIG. 77, SEL A/B | 53 |
| FIG. 78, A/B INV key | 53 |
| FIG. 79, AB register & gating | 54 |
| FIG. 80, AB gate select | 55 |
| FIG. 81, PD—branch decode | 56 |
| FIG. 82, PD—IOP loaded | 56 |
| FIG. 83, IOP REG | 57 |
| FIG. 84, D FLD gate | 58 |
| FIG. 85, IOP error | 58 |
| FIG. 86, IOP format decode | 58 |
| FIG. 87, IOP INST decode | 59 |
| FIG. 88, ID 3 | 59 |
| FIG. 89, ID 4 | 59 |
| FIG. 90 ID INV OP–1 | 60 |
| FIG. 91, ID INV OP–2 | 60 |
| FIG. 92, RR Branching status switching | 61 |
| FIG. 93, RR Floating—point double precision | 62 |
| FIG. 94, RX fixed—point half word & branching | 63 |
| FIG. 95, RX floating-point double precision | 64 |
| FIG. 96, RS-SI branching, status switching & shifting | 65 |
| FIG. 97, SS logical, SS decimal | 66 |
| FIGS. 98–101, IOP line decode | 67 |
| FIG. 102, BOP REG 0–7 | 68 |
| FIG. 103, BOP REG 8–11 | 69 |
| FIG. 104, ER 1 REG | 70 |
| FIG. 105, BR 1 INCR | 71 |
| FIG. 106, BOP PAR error | 71 |
| FIG. 107, ER 1 INCR | 71 |
| FIGS. 108–108*a*, B SEL GR | 72 |
| FIG. 109, R2–X SEL GR | 72 |
| FIG. 110, BR 1 SEL GR | 73 |
| FIG. 111, GEN REG OUT GATING CTRL | 74 |
| FIG. 112, GEN REG OUT GATE SEL | 75 |

TABLE OF FIGURES—Continued

Figure 113:
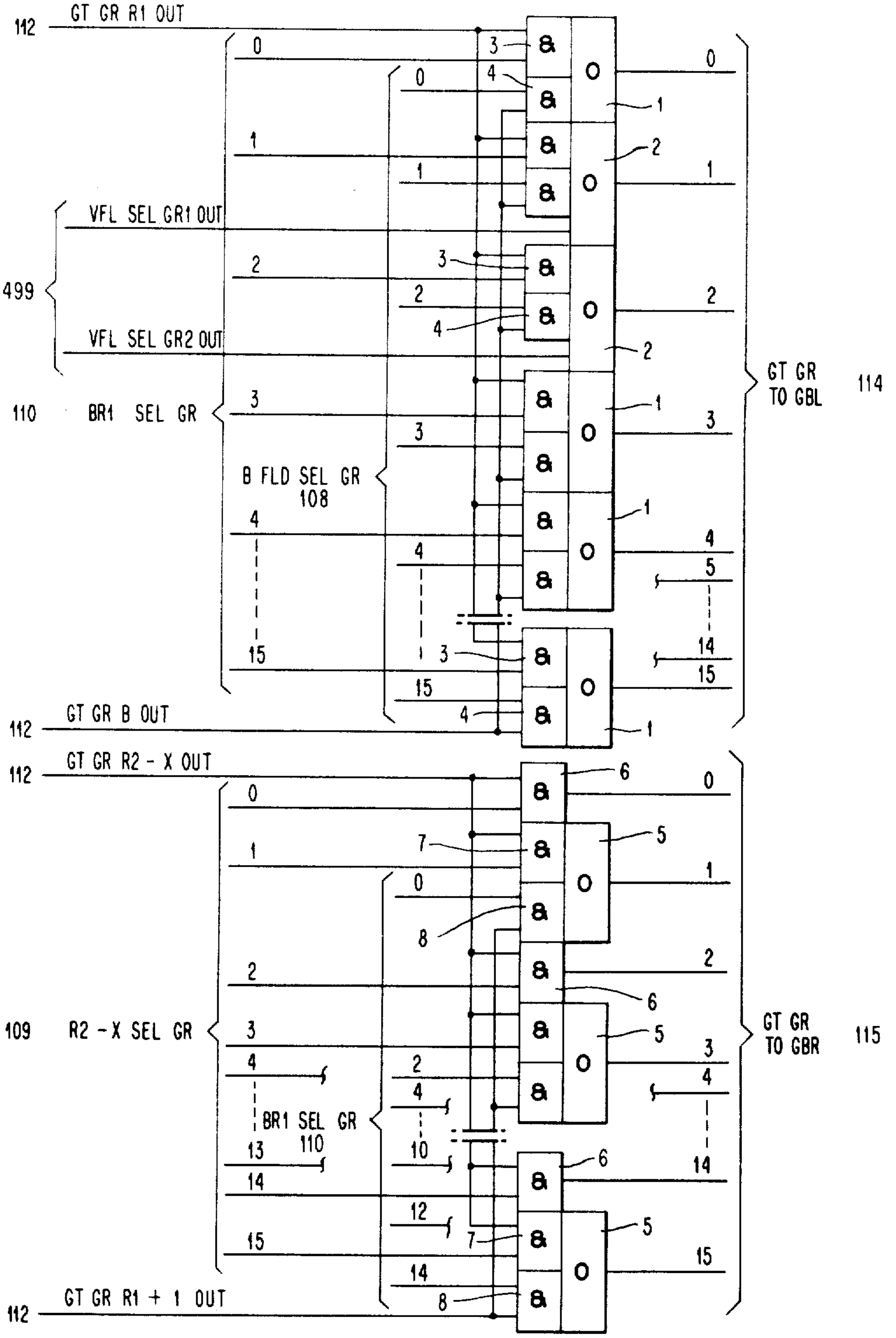
Figure 114:
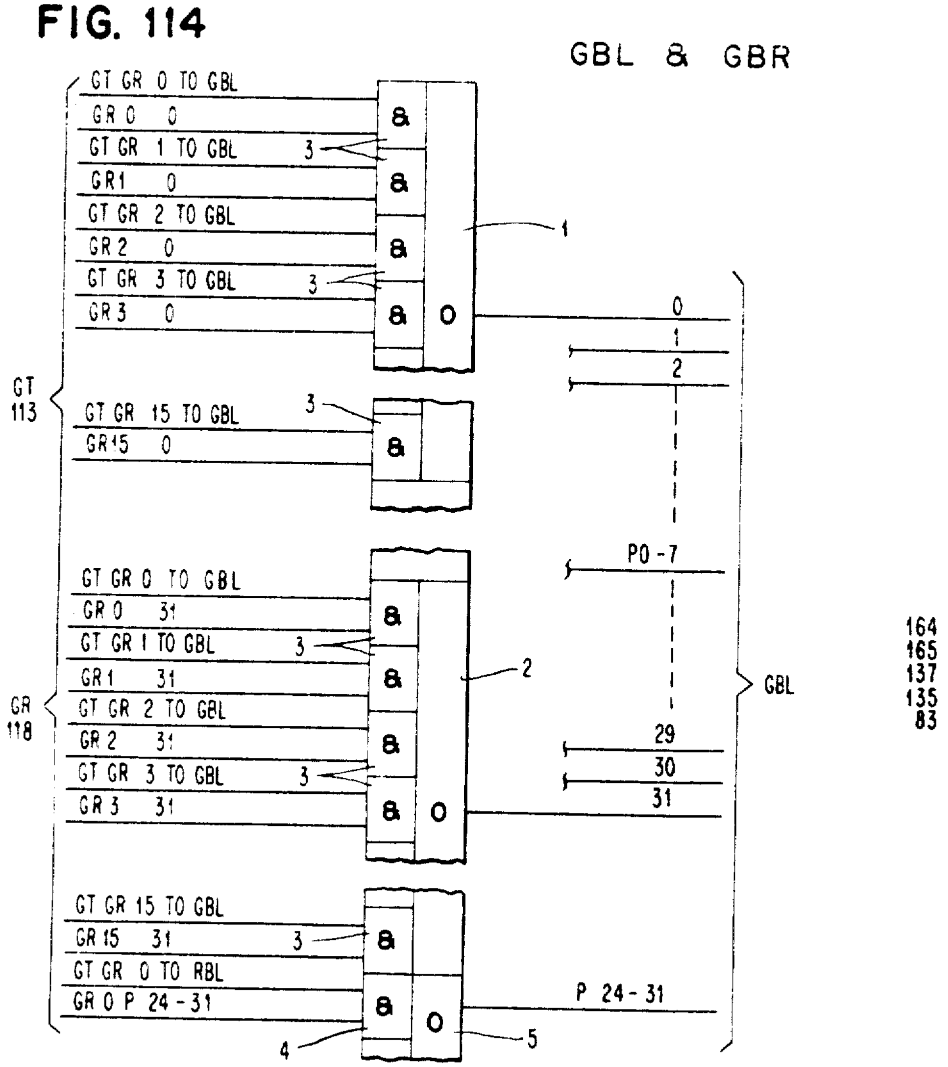
Figure 115:
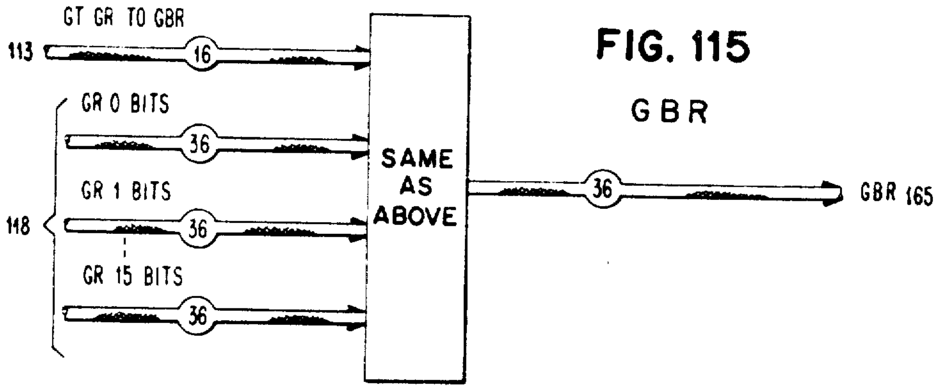
Figure 116:
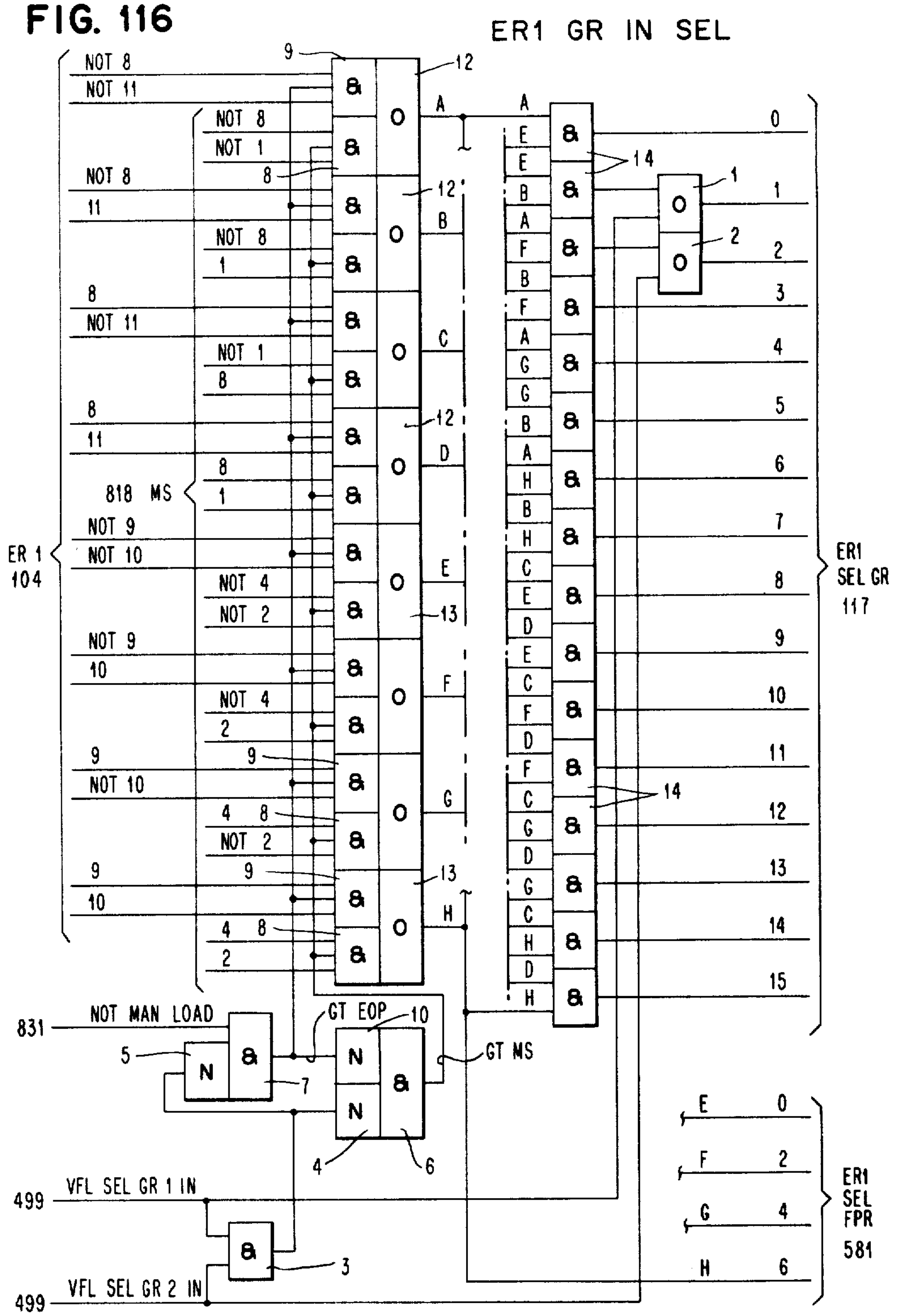
Figure 117:
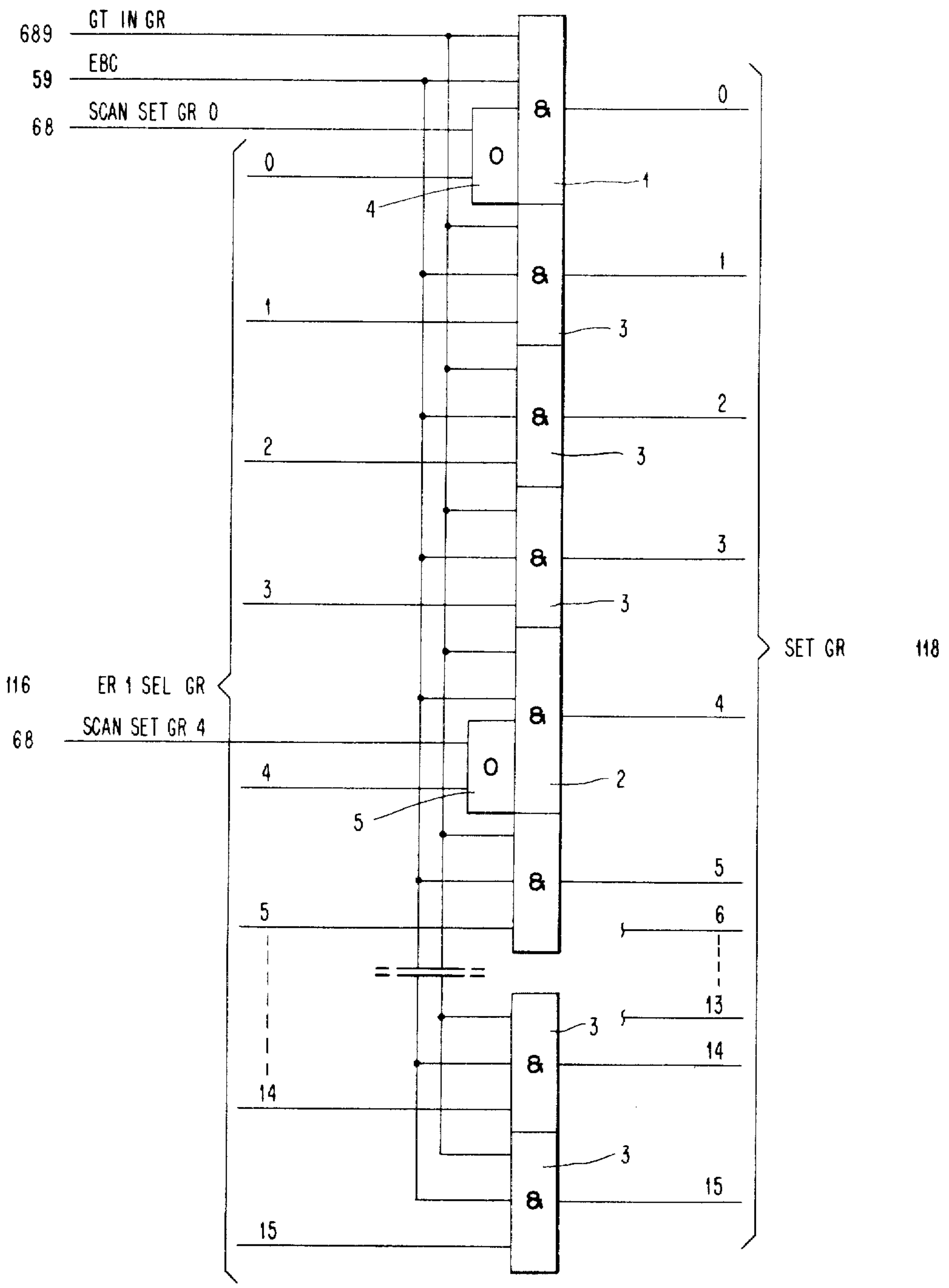
Figure 118:
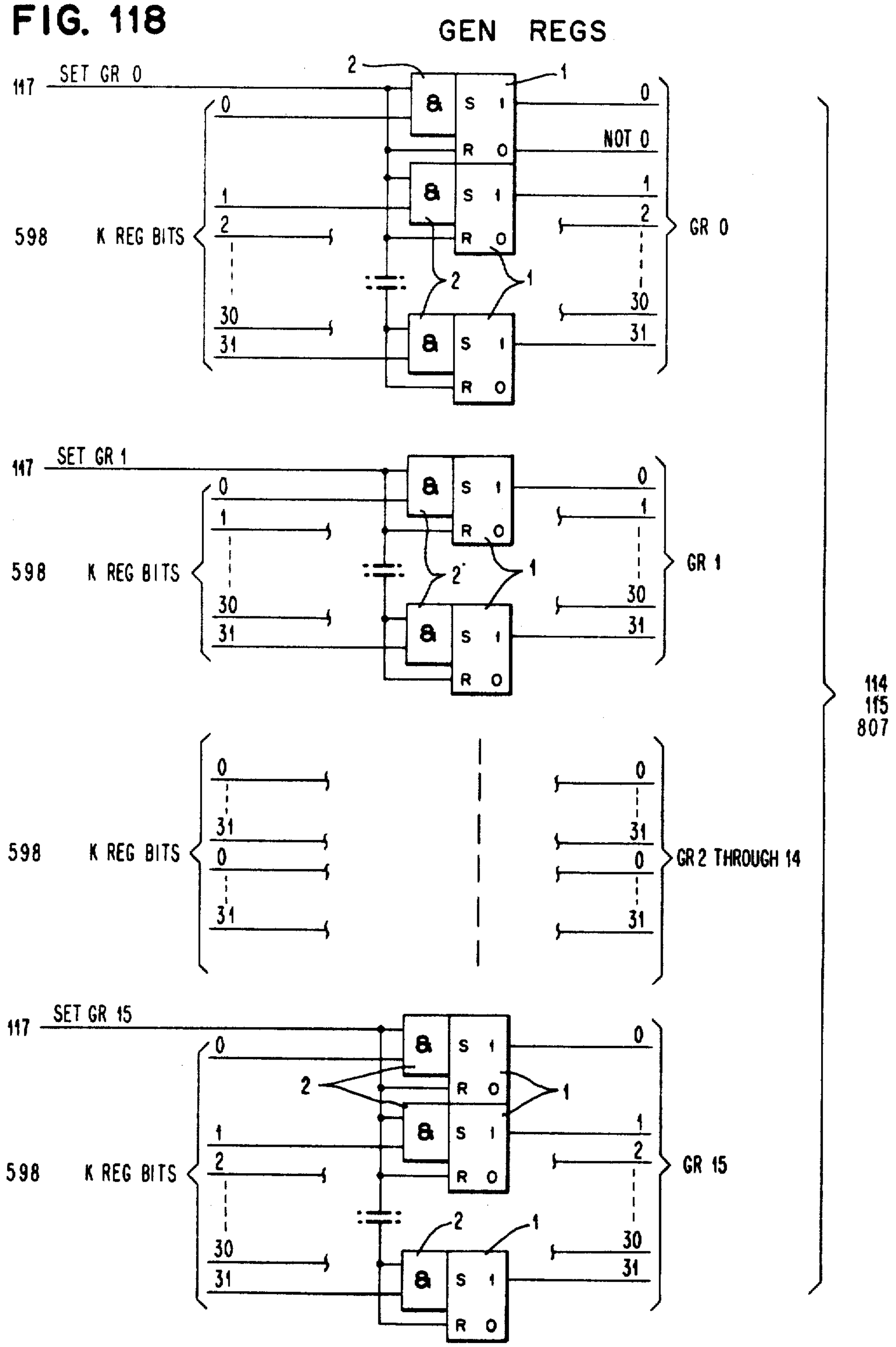
Figures 119, 876:
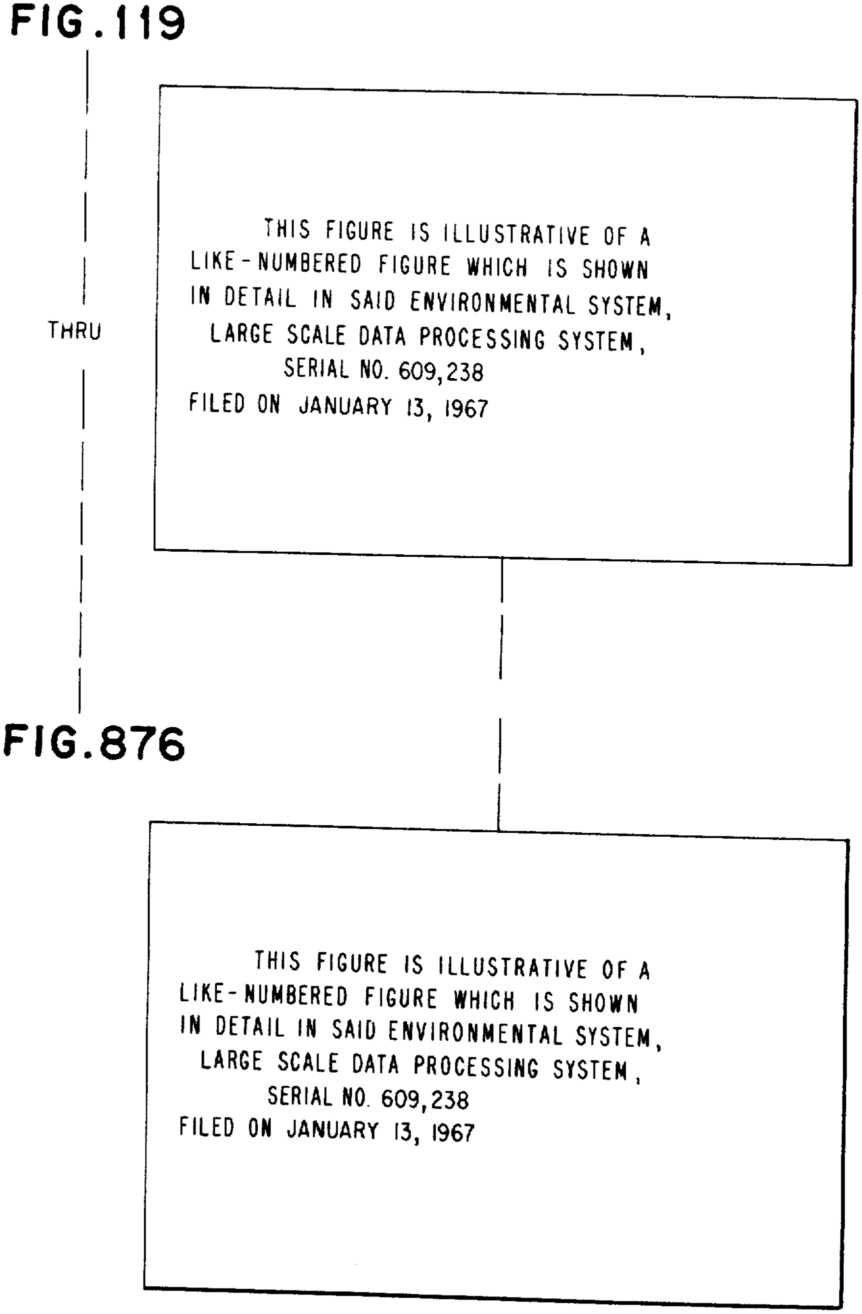

| | Sheet |
|---|---|
| FIG. 113, GEN REG OUT GATES | 76 |
| FIG. 114, GBL & GBR | 77 |
| FIG. 115, GBR | 77 |
| FIG. 116, ER 1 GR IN SEL | 78 |
| FIG. 117, GEN REG IN GATES | 79 |
| FIG. 118, GEN REGS | 80 |
| FIGS. 119–876 are illustrative of said environmental system | 81–643 |

2.0 REFERENCES

A primary reference in understanding the full environment of the present invention is an architectural description, or definition, of a system in which the present invention is embodied. This comprises a manual entitled "IBM System/360 Principles of Operation," a copy of which is available in the Scientific Library of the U.S. Patent Office, "IBM Form No. A22–6821."

Another reference, which discloses a small system in accordance with the architecture of said System/360 Manual is found in a copending application of the same assignee entitled Data Processing System, Ser. No. 357,372, filed on Apr. 6, 1964, by G. M. Amdahl et al.

An input/output channel device which is adapted for use in said environmental system is disclosed in a copending application of the same assignee entitled Automatic Channel Apparatus, Ser. No. 357,369, filed Apr. 6, 1964, by L. E. King et al.

A core storage device is shown in a copending application of the same assignee entitled Storage Drive Sense System, Ser. No. 445,306, filed Apr. 5, 1965 by Anatol Furman.

A bipolar latch, used throughout said environmental system, is described in detail in an article by O. J. Bedrij, entitled Gated Trigger With Bipolar set, IBM Technical Disclosure Bulletin, vol. 2, No. 6, Apr. 1960, page 50 (a copy of which is available in the Scientific Library of the U.S. Patent Office).

A binary trigger is referred to in particular in section 5. This trigger is described in detail in section 11b of a copending application of the same assignee entitled Parallel Memory, Multiple Processing, Variable Word Length Computer, Ser. No. 332,648, filed Dec. 23, 1963 now patent no. 3,270,325, by R. S. Carter and W. W. Welz.

Binary-decimal addition is described in a copending application of the same assignee, Ser. No. 223,431, entitled Byte Processing Unit, filed Sept. 13, 1962 by Robert Keslin. A shifter is described in a copending application of the same assignee, Ser. No. 162,477, Proportional Space Matrix Printer, filed Dec. 27, 1961 now Patent No. 3,174,427 by Richard L. Taylor.

Additional references include the following copending applications of the same assignee as in this case, each of which forms a part of, and is illustrated in, the environmental system, which is entitled Large Scale Data Processing System.

Large Scale Data Processing System, Ser. No. 445,326, filed Apr. 5, 1965, by O. L. MacSorley et al., now abandoned.

Large Scale Data Processing System, Ser. No. 609,238, filed Jan. 13, 1967 by O. L. MacSorley et al., said application being a continuation-in-part of Ser. No. 445,326.

Storage Reference Priority in a Data Processing System, Ser No. 445,316, filed Apr. 5, 1965, now abandoned, by L. J. Hasbrouck et al.

Storage Reference Priority in a Data Processing System, Ser. No. 609,239, now Patent No. 3,376,556, filed Jan. 13, 1967, by L. J. Hasbrouck et al., said application being a continuation-in-part of Ser. No. 445,316.

Unit Unavailability Detector for a Data Processing System, Ser. No. 445,318, filed Apr. 5, 1965, now Patent No. 3,341,824, by W. P. Wissick et al.

Rate Control in an Asynchronous Device Storage Accessing Apparatus, Ser. No. 445,319, filed Apr. 5, 1965, now abandoned, by W. P. Wissick et al.

Plural Channel Priority Control, Ser. No. 609,254, now Patent No. 3,377,579, filed Jan. 13, 1967, by W. P. Wissick et al., said application being a continuation-in-part of Ser. No. 445,319.

Storage Cancellation and Panel Data Key Fetching in a Data Processing System, Ser. No. 445,311, filed Apr. 5, 1965, now abandoned, by W. P. Wissick et al.

Storage Cancellation and Panel Data Key Fetching in a Data Processing System, Ser. No. 609,252, filed Jan. 13, 1967, now Patent No. 3,374,472, by W. P. Wissick et al., said application being a continuation-in-part of Ser. No. 445,311.

3.0 NOMENCLATURE

The nomenclature of the present embodiment is almost entirely consistent with that shown in said System/360 Manual. A few exceptions do exist however. One of these is the instruction Execute and is herein referred to in abbreviated form as XEQ, whereas said manual refers to this instruction in abbreviated form as EX. Another example is the instruction Edit; it is referred to in abbreviated form herein as EDT whereas said manual refers to same as ED. In order to avoid confusion with "execution," "E decode," and other similar functions in the present embodiment, these changes have been made. However, a good definition of each of the instructions which may be performed by the present embodiment is found in said manual. Additionally, the functions of a data processing system in accordance with the architectural definition within said manual are applicable to this embodiment, with the exception of the fact that the present embodiment does not provide for: sharing of storage by more than one system, a multiplex channel, direct coupling between computers, large capacity storage, and certain other features which could be available on an embodiment of the system described in said manual. However, said environmental system is readily adapted for the achievement of these functions.

In the present embodiment, a bit means a binary unit of intelligence, which can be either a one or a zero. A byte comprises eight bits, two bytes comprise a syllable or a half-word. Two syllables, or two half-words comprise a word, which includes thirty-two bits. A storage word is two words or sixty-four bits in the environmental system of the present embodiment. In storage, and within the data flow of the environmental system, there is one parity bit for each eight bits of data; at certain points in a data flow this is altered; for instance, at the output of an adder, it is possible that parity may be carried to several stages of logic on a four bit basis, and then combined on an eight bit basis.

In the detailed descriptions herein, the signals which propagate between various figures are all identified by unique lines which are referred to in the upper case (such as SAR meaning the output of the storage address register, CPU RST being the line that causes a computer reset of a particular type). As is discussed more fully in section 5, hereinafter, the use of positive and negative signals as inputs to positive and negative-type circuits is so customary, that it no longer has any significance to consider signals in actual circuitry as being either the true or the complement of an event; for instance, if a signal is generated in a positive sense when the event occurs, a minus signal may nonetheless be required to indicate that event due to the fact that the circuit which is utilizing the signal requires a negative input. For that reason, complementary functions (such at NOT LC, meaning the complement of the LC signal) are referred to as inputs even though they may not be explicitly generated in the circuit where the event is manifested by the true signal.

In block diagrams which comprise a plurality of blocks, each block being represented by one or more figures, the figure or figures within which the details of the particular block are shown may be identified in that block by figure number only, without the word "FIG." actually being printed within that block. This allows a simpler block configuration which is easier to read.

In the description of the detail figures, the various circuit elements are referred to by reference numerals, the reference numerals being applicable only in the particular figure number. However, in any case where a particular item is referred to in more than one place, it would have the same reference numeral wherever it is referred to. On the other hand, reference numerals between 1 and 30 are used repetitively throughout the environmental system due to the fact that the size of the environmental system would require reference numerals having four or five digits if completely sequential reference numerals were used for the entire environmental system. Therefore, any possible tendency toward confusion is alleviated by also specifying the figure number along with the reference numeral; additionally, the description itself is patently clear insofar as the precise element to which reference is being made.

When terms such as "storage cycle" or "last E cycle" are used, machine cycles as such are not necessarily involved. For instance, a storage cycle requires five machine cycles in the embodiment of said environmental system; last cycle triggers may be set from the start of NOT L time to the start of the following NOT L time, a period equal to a 200 nanosecond machine cycle, but displaced therefrom by approximately 65 nanoseconds since the basic machine cycle is defined to be from the start of A time to the end of A time, as is described in section 7. The duration or phase of any specially-referred to cycle often differs from a basic machine cycle. The terms, when used, refer to the latched condition or event being described, as is apparent in the context where used.

In order to facilitate cross referencing between the various copending applications, and most particularly, to facilitate cross referencing of embodiments in said copending applications of portions of said environmental system with the embodiment of a full environmental system, constant sequential figure numbers are used in all of said copending applications, whereby all figure numbers are identical in all of the cases. In order to reduce the cost of printing, figure numbers which relate to circuits not required in smaller embodiments are shown in an illustrative manner only. Any reference to a figure which is shown in an exemplary form in one of said copending applications should be interpreted as a reference to that same figure in the embodiment of said environmental system.

In certain instances, control lines comprising a partciular combination of operational decoding or other status indications may not be shown in detail; that is, a line called "BR OR STATUS SWX" may be utilized, as an input to a circuit, but may not be generated, as an output from a circuit. However, there are innumerable examples of generated decode lines such that the generation of any other one would be well within the skill of the art. As an example, a line called "VFL T1 OR $Y \neq 0$" could be generated by the OR of "VFL T1" with "$Y \neq 0$," or with "NOT Y EQ 0," or by OR-ing the bits of the Y REG to see that Y does indeed equal other than zero.

4.0. BRIEF DESCRIPTION OF ENVIRONMENTAL SYSTEM, FIG. 2

In FIG. 2, a block representation of said environmental system is shown to include a bus control unit (BCU) which is described in section 6, and which provides data flow communication between the various units of the system, and provides controls for the storage devices. The operator controls, certain maintenance controls, and basic stop, start and reset controls are provided in the power distribution unit (PDU) described in section 21. The system also includes an I unit, the data flow portion of which is described in section 9, the main other functions of the unit being described in separate sections. The clock is shown in in section 7, and includes the main timing pulses which are utilized throughout the system so as to synchronize operations. In section 10, instruction sequencing is described, and instruction fetching is described in section 11. Branching operations, and their effect on the remainder of the system are all described in section 12. Communication with channels, and performance of certain supervisory type instructions, inter alia, are described with respect to an I execution unit (IE UNIT) in section 13. Interruption handling, and functions which, although not interruptions, are handled by the interruption circuitry, are described in section 14 of said environmental system. The E unit of said environmental system includes a binary portion and a VFL portion, which are referred to in a compound fashion; both the binary and VFL portions are considered part of the E unit, and E unit controls can come from either portion. However, the binary portion is generally not referred to as such, but is referred to merely as the E unit, and the VFL (variable field length) portion is usually referred to as the "VFL." Storage devices are not completely described herein, but the logical control thereover as it relates to the bus control unit is described in section 22.

5.0. COMPONENT CIRCUITS, FIG. 3 THROUGH FIG. 8

In FIG. 3 through FIG. 8, component circuits of the type which may be utilized in said environmental system are illustrated. These are not exhaustive, and merely illustrate types of circuits which might be utilized, and the manner in which they are illustrated in the detailed description of said environmental system.

Figure 3A:
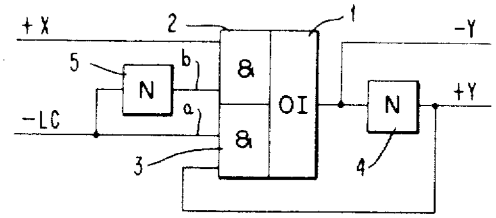

In FIG. 3*a*, a simple latch is shown. This comprises an "AND-OR-INVERTER" combination which includes an OR-INVERT circuit 1 and two AND circuits 2, 3 as well as two inverters 4, 5. In normal operation, whenever the LC line is positive, the inverer 5 will provide a signal *b* to the AND circuit 2 so that a +X signal, whenever it may arrive, will cause the AND circuit 2 to activate the OR-INVERT circuit 1 thereby generating a −Y signal. If the +X signal is removed, then the −Y signal will disappear. The −Y signal causes the inverter 4 to generate the +Y signal which is fed back to an AND circuit 3; however, so long the the −LC pulse is present, the AND circuit 3 will not operate, so that the circuit of FIG. 3*a* is essentially an AND circuit whereby a +X signal and the signal from the inverter 5 pass through the AND circuit 2, becomes inverted in the OR circuit 1, and no latching takes place.

When the LC signal turns positive (at NOT L time) then any +X signal will cause a +Y signal to be gated through the AND circuit 3 thereby causing the circuit of FIG. 3*a* to become latched for the duration of the +LC signal. When the LC signal returns to a negative condition (at L time) then the state of the latch can again be changed. During the time that the circuit is latched, the AND circuit 3 will be passing a signal through the OR circuit 1 provided the latch was on at the time that the latching condition commenced, and the AND circuit 2 is blocked by the inverter 5. When the LC line returns to a negative condition, the AND circuit 3 will be immediately blocked, and the inverter 5, having about a seven nanosecond delay, will later cause the unblocking of the AND circuit 2. Thus, there is a short period of about seven nanoseconds (as illustrated in FIG. 3*d*) when the circuit of FIG. 3*a* will have no output whatever. This is of too short a duration to be illustrated in FIG. 3*c* which shows the operation of the latch of FIG. 3*a* in general terms.

Figure 3B:
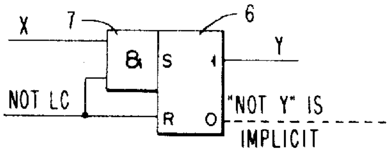
Figure 3C:
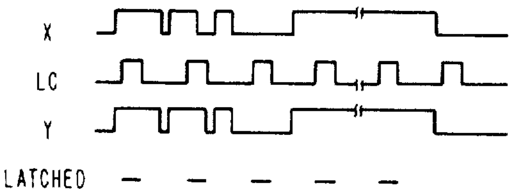
Figure 3D:
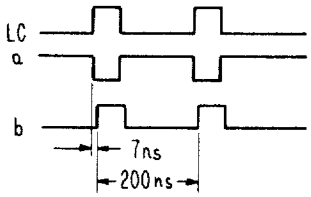

The circuit of FIG. 3*a* is illustrated herein as shown in FIG. 3*b*. Thus, the circuit of FIG. 3*a* can be considered to be a latch circuit 6 settable by an AND circuit 7 at NOT L time, to be reset at L time.

Figures 4A, 4B, 5A:
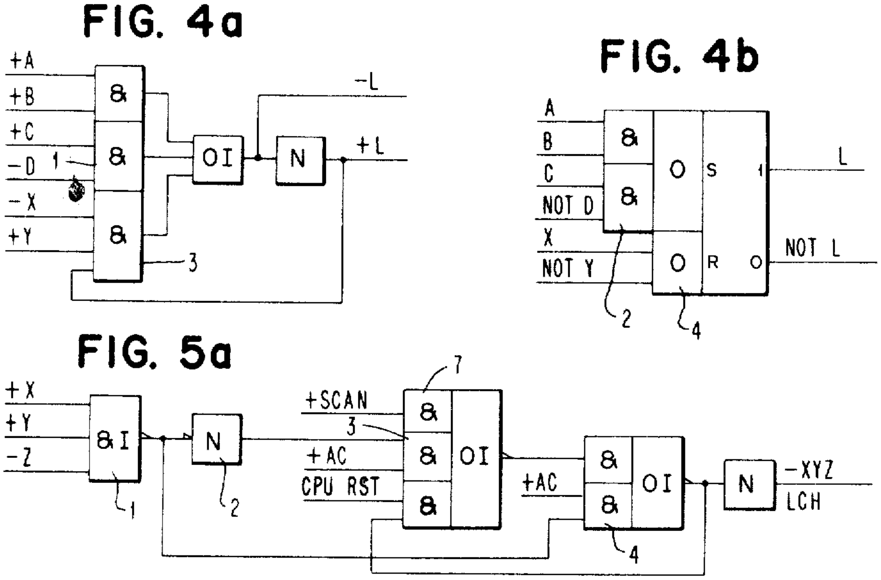

In FIG. 4*a* is shown a variation of a latch having a combined reset condition which, as shown in FIG. 4*b* includes X or NOT Y. Notice that the AND circuit 1 in FIG. 4*a* has a minus D signal applied thereto which represents a NOT D as illustrated by the AND circuit 2 in FIG. 4*b*. Also notice that the AND circuits 3 in FIG. 4*a* has both −X and applied Y signals thereto so that the latched effect will be ended by the disappearance of −X or by the disappearance of +Y. This is illustrated as resetting in response to either X or NOT Y by the OR circuit 4 in FIG. 4*b*. A still further complicated latch is illustrated in FIG. 5*a*. This includes an AND-INVERT circuit 1 which passes a signal through an inverter 2 (the output of which then would be positive when the conditions to the AND invert circuit 1 are met) so as to cause an AND circuit 3 to operate when the +AC signal appears. +AC means a positive controlled clock signal having the A time duration. The "C" within "AC" stands for "controlled," in constrast with "running," as is the case when an AR signal is involved. The AR signal would be of the same duration and timing as the AC signal, but could run even through single cycle operations, whereas the AC signal would be stopped during single cycle operations.

Figure 5B:
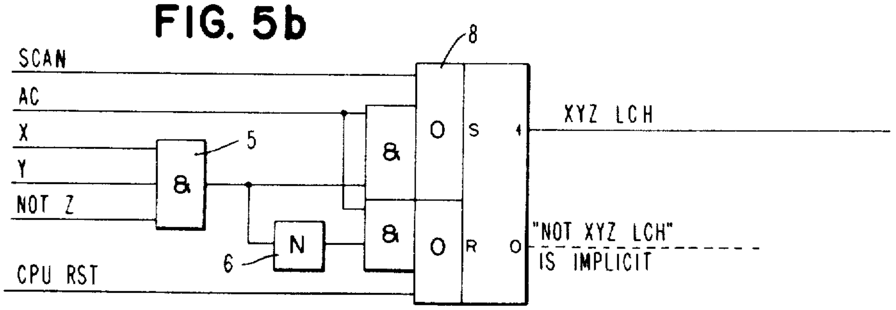

The latch of FIG. 5*a* can be reset by the CPU RST signal, or by the raw output of the AND INVERT circuit 1 as applied to an AND circuit 4. The circuit of FIG. 5*a* would be illustrated herein as shown in FIG. 5*b*, wherein an AND circuit 5 will either set or reset the latch in dependence upon whether the conditions are met, due to the assistance of an inverter 6. Notice also that single-input AND circuits such as the AND circuit 7 in FIG. 5*a* actually represent merely an input to the OR INVERT circuit, as illustrated by the direct application of the scan signal to the OR circuit 8 in FIG. 5*b*.

Figure 6A:
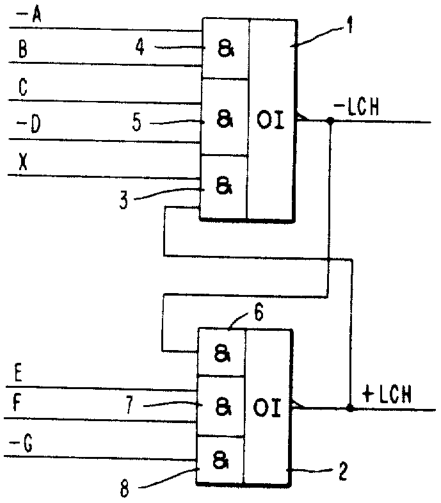
Figure 6B:
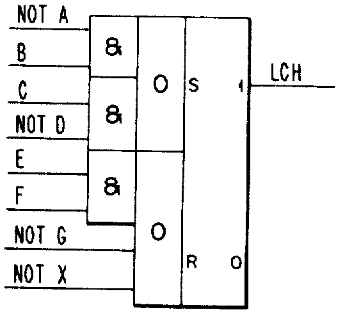

A variation in the circuit of FIG. 5*a* is shown in FIG. 6*a*, wherein a first OR INVERT circuit 1 operates when the latch is in the on condition, and a second OR INVERT circuit 2 operates when the latch is in the reset condition. When the OR circuit 2 operates, it has a negative output, thereby locking an AND circuit 3. However, a negative output from the OR circuit 2 does not preclude an output from the latch inasmuch as either one of two AND circuits 4, 5 could supply an input to the OR circuit 1. If either of the AND circuits 4, 5 do operate, then there will be a minus signal out of the OR circuit 1 which will block a single-input AND circuit 6 at the input to the OR circuit 2 so that the OR circuit 2 will normally have no output unless inputs are applied to either an AND circuit 7 or a single input AND circuit 8. With the OR circuit 2 locked, its positive output will be applied to an AND circuit 3, and if there is an X signal at the AND circuit 3, then the latch will remain on even though either of the OR circuits 4, 5 which turn the latch on in the first place no longer has inputs thereto. This is illustrated more clearly in the circuit shown in FIG. 6*b*, which represents the manner of illustrating this circuit herein. As seen in FIG. 6*b*, the latch can be turned on by NOT A and B, or by C and NOT D. If turned on, it will latch up provided that E and F are not both present, and provided that G and X are both present. If the latch turns on and becomes latched in an on conditon, then the appearance of E and F together or the appearance of NOT G or NOT X will cause the latch to turn off.

Figure 7A:
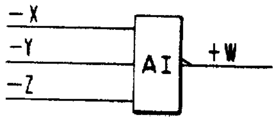
Figure 7B:
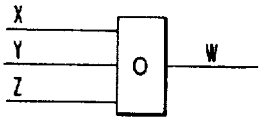

In FIG. 7*a*, an AND INVERT circuit with minus inputs is shown to create a +W signal. This is fully equivalent to the circuit of FIG. 7*b* wherein a positive, non-inverting OR circuit responds to positive XYZ signals to generate a positive W signal.

Figure 8A:
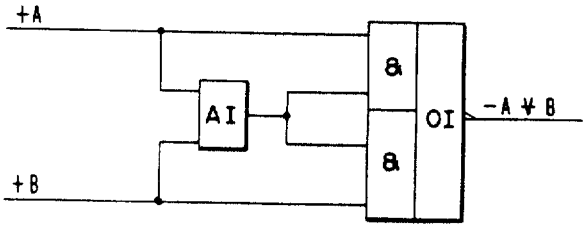
Figure 8B:
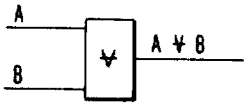

FIG. 8*a* is a simple illustration of a two input EXCLUSIVE OR circuit, which is represented herein as shown in FIG. 8*b*. It should be understood that the EXCLUSIVE OR function with only two inputs is a test for oddness: that is, one and only one input must be present; if no inputs or two inputs are present, then there will be no output. Thus, an odd number of inputs are required. In the embodiment described herein, a term "EXCLU- SIVE OR circuit" is utilized to mean a complex of EXCLUSIVE OR circuits which test for oddness and evenness of the inputs thereto. These may be actually manifested in two input EXCLUSIVE OR circuits as shown in FIG. 8*a*, or may be represented with EXCLUSIVE OR circuits actually responding to more inputs. To the extent that more than two inputs are shown, it can be assumed that a three input EXCLUSIVE OR circuit or a two input EXCLUSIVE OR circuit or combinations thereof are utilized in a well-known "tree" fashion so as to provide an EXCLUSIVE OR complex which gives an output whenever the inputs thereto are odd in number.

From the foregoing description, it can be seen that the presence of a plus or a minus signal has no significance in and of itself, due to the way in which a plus or a minus signal may be utilized. For instance, when applied to a +AND circuit of a reset side of a latch as shown in FIG. 6*a*, it may be a NOT signal, as illustrated by the NOT G signal shown in FIG. 6*b*. Similarly, when applied to a resetting AND circuit such as the AND circuit 3 in FIG. 4*a*, a −X signal really becomes an X signal in terms of its logical connotation as illustrated in FIG. 4*b*. Also, the minus signals applied to the circuit of FIG. 7*a* in fact are plus signals when the function of that circuit is considered to be an OR circuit. For that reason, the simplified showing of the present embodiment (such as illustrated in FIGS. 3, 4*b*, 5*b*, 6*b*, 7*b* and 8*b*) do not consider whether a plus or minus signal may be generated at the source of a signal, or whether that signal may be generated in true or complement form, since such considerations have no bearing on the way in which the signal may be utilized. However, at the input to any particular circuit (such as the input to FIG. 6*b*) the affirmative or negative function which the signal represents does have logical connotation and is shown. To the extent that a "NOT SIGNAL" is required but not generated, it is implied that one with ordinary skill in the art could obtain the opposite phase thereof from the source of the "SIGNAL." This is illustrated, for instance, in FIGS. 3*a* and 3*b* where both phases are generated in 3*a*, and only the affirmative phase is generated in 3*b*, the complement thereto being implied.

6.0. BASIC BUS CONTROL UNIT

The BCU (bus control unit) acts as a buffering traffic control for data, address, control, and checking signals between the storage devices and the rest of the system. In this embodiment, the CPU (including the I unit, the IE unit, the BE unit, and the E unit) is considered to be a single device with respect to the accessing of storage, and it must share storage with the channels. Each of the I/O channels 1–6 has a priority rating corresponding to its number (1–6), and the MC (maintenance channel, including panel keys and panel indicators) comprises a seventh, lowest-priority channel for storage reference purpose. In accessing storage, priority is determined as between channels, and then priority is determined between the selected channel and the CPU. Stated alternatively, the CPU may reference storage unless it is prevented from doing so by a prior outstanding request for an available storage device initiated from one of the channels; which one of the channels will be permitted to reference storage is determined independently by a channel priority circuit. For purposes of completeness and simplicity, the embodiment of a bus control unit described in this section does not include provisions for handling a large capacity storage, nor for the sharing of a single storage device by more than one data processing system. The BCU comprises three general portions, shown in FIG. 9, FIG. 10 and FIG. 11, and described in Sections 6.1, 6.2 and 6.3, respectively of previously referred to application Ser. No. 609,238.

7.4. *Clock circuit*

Figures 12, 59:
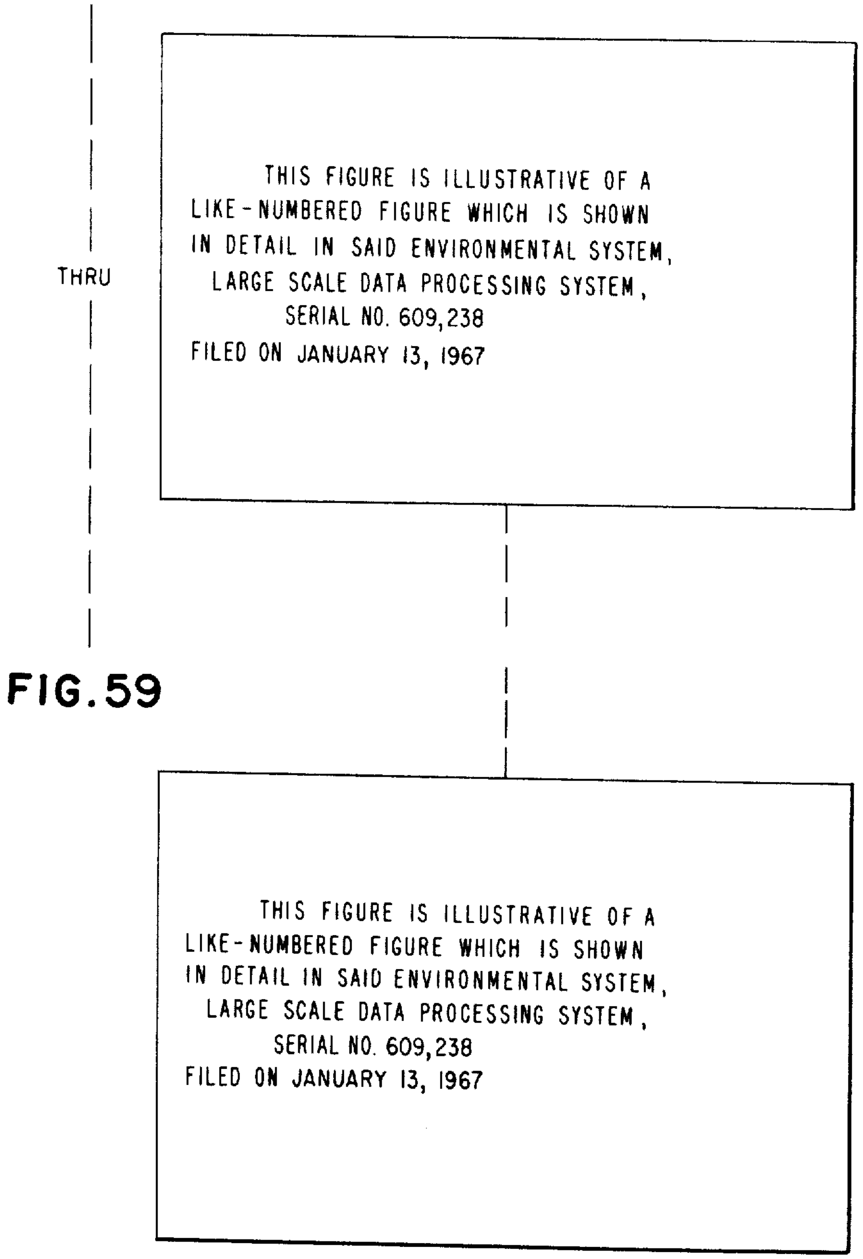
Figures 61, 67:
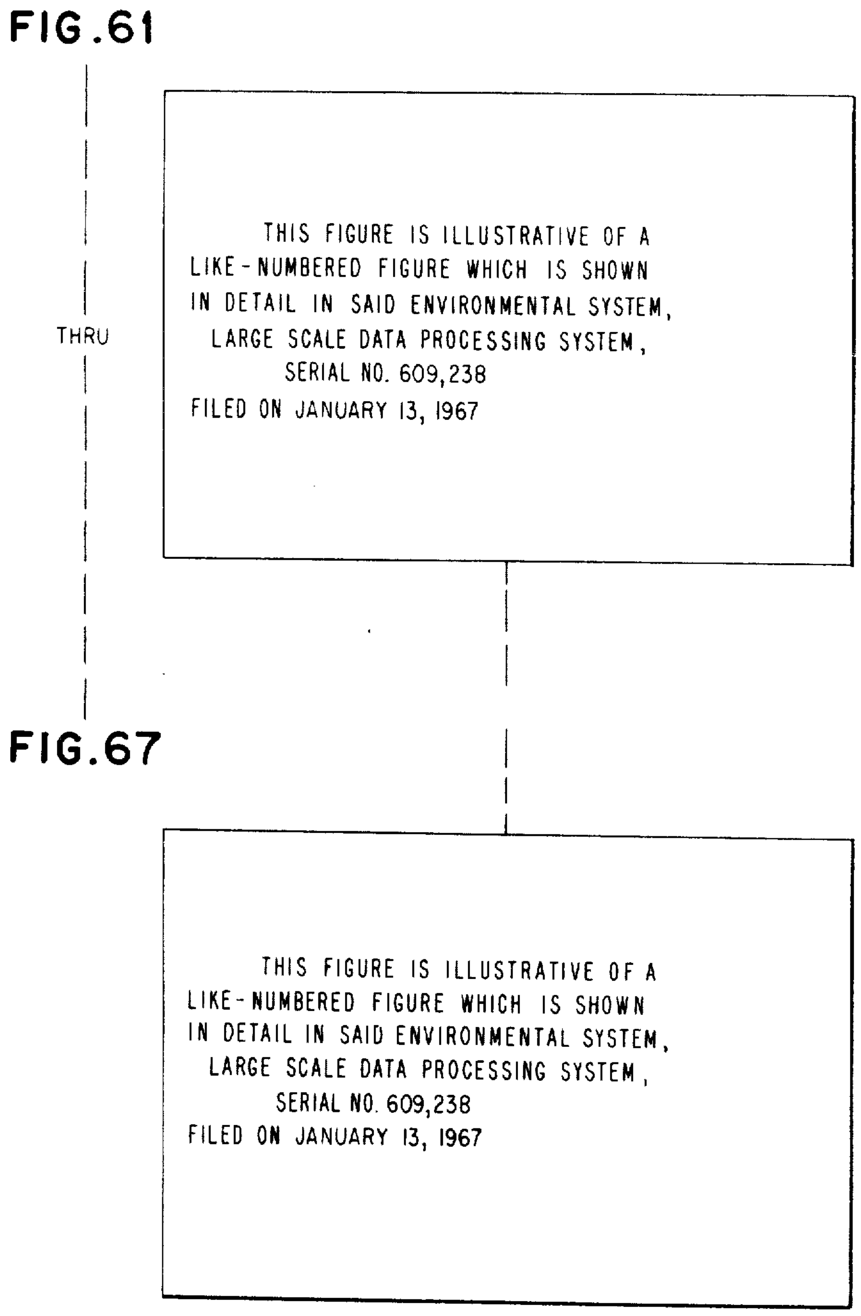

References herein to FIGS. 56–59, 61 and 62, refer to figures in said application Ser. No. 609,238. The actual timing signals used throughout the system are generated by the clock circuits shown in FIG. 59, the upper portion of which comprises the control clock, and the lower portion of which is identical to the upper portion and comprises the running clock; the only difference between them being that the control clock is operated by the gated control pulse signal from FIG. 58, whereas the running clock is operated by the gated running pulse signal from FIG. 58. The operation of the clock generating circuits is illustrated in FIG. 60 through 62. In FIG. 60 through FIG. 62, an OSC PULSE (illustration 1) comprises the signal on the OSC line. It is to be noted that this signal is about 45 nanoseconds in width, and the beginning of each pulse is separated from the beginning of the following pulse by 200 nanoseconds, which comprises a machine cycle. The delayed oscillator pulse (OSC PULSE DLY, illustration 2) comprises the output of the delay unit 7 in FIG. 58. This is the signal which gates the signals on the GATED CTRL PULSE line and on the GATED RUNNING PULSE line. These signals are utilized to generate the actual timing signals as shown in FIG. 59.

Whenever the clock has to be stopped because of error signals which give rise to a check condition, it is desirable to always know that the clock will stop at a definite time in relation to the time at which the error condition was sensed. Therefore, the clock circuits of FIG. 56 through FIG. 59 are arranged so that the clock will always stop within a machine cycle following the cycle within which an error could be sensed. Referring to illustration 3 of the check signal (CHK) in FIG. 60, it will be seen that check signals can appear at a number of different times within a machine cycle. It is therefore desirable to establish that these check signals will fall within a single defined machine cycle. For this reason, the final timing of the various clock signals (as shown in illustrations 7–12 in FIG. 60), is set up so that A time begins prior to the time when any of these check signals could occur and the next A described in section 7.5) only during the nonoscillator pulse time. Thus, either of the first two check setting times (3*a*, 3*b*) will cause the check latch to be set at time 4*a*, all other occurrences of a check condition causing the check latch to be set at a corresponding time, approximately 20 nanoseconds after the check condition has occurred, due to the time delays inherent in logic circuits used for setting the check latch. Thus, the establishment of a signal from the check latch is related to the timing of the oscillator in such a fashion that the basic timing signal which defines a machine cycle, which is A time, must occur approximately 180 nanoseconds after the oscillator pulse output on the OSC line in FIG. 56.

Within the embodiment of said environmental system, the word "scan" means the forcing of conditions in bistable devices throughout the system, so as to cause the system to establish a particular state. This is accomplished by a network of circuitry which is complex in its size, but is conceptually very simple. The process includes defining a scan mode, identifying a particular cycle within the scan mode, and utilizing certain bits of a storage word fetched from storage as data bits to force particular bistabe devices.

8.1. *Scanning into the I unit, FIG. 68*

I unit scanning is illustrated in FIG. 68. Scanning into the I unit is controlled by six scan word cycles, each one of which causes a 63-bit word to be set into various latches and triggers of the machine. The first scan cycle is defined as word 1 (WD 1), which causes all 63 bits of the J register to be loaded into the PSW register, bit for bit, as shown in FIG. 68. In word 2 of the scan, bits 0–31 are loaded into the ICP register, and IOP parity bits themselves are forced by bits 32–36 of the J register. During this same cycle, the storage address register is loaded with bits 40–63 of the J register, and the parity bits of the storage address register are forced by bits 37–39 of the J register. In a similar fashion, the other words are applied to the various circuits as shown in the chart of FIG. 68. The manner of providing this gating is two-fold: as in the case of the PSW register, scan gates are provided as shown at the top of FIG. 70 of application Ser. No. 609,238. When status triggers and registers are being scanned into (as in the case of word 5 and word 6, FIG. 68) actual signals are generated by scan gate signals in combination with bits of the J register as shown in FIG. 71 of application Ser. No. 609,238. But the circuits of FIGS. 70 and 71 are merely illustrative of the manner in which scanning signals may be applied to the circuits of this embodiment.

8.2. *Scanning into the E unit, FIG. 69*

A chart which is illustrated somewhat differently than FIG. 68, but which contains the same information, is shown in FIG. 69. E unit scanning commences after I unit scanning, and includes word 7 through word 15 of a scan operation. The chart of FIG. 69 is not complete as shown therein, bits 36–62 thereof for words 7 through 14 being illustrated in the following chart:

*Bit trigger*

36 J 0–7 EA
37 J 0–63 MA T/C
38 J 0–31 MA T/C
39 J 32–39 EA
40 J L 32 MA T/C
41 J For Parity MA T/C
42 K 0–63 MA
43 K R4 MA
44 K L2 MA
45 DC 8
46 DC 4
47 DC 2
48 DC 1
49 DB 0
50 DB 1
51 DB 2
52 DB 3
53 DB P
54 QUOT OVFLO
55 QUOT SIGN OVFLO
56 QUOT INSRT Z VALID
57 QUOT INSRT Z QUOT
58 QUOT INSRT DIV TRUE 9.0. INSTRUCTION UNIT DATA FLOW As is well known in the data processing art, every computer, or data processing system, utilizes instructions which include an operation portion that defines the actual data handling steps which the computer is to perform as well as an address portion which defines a location in storage of the data, or operands, upon which the operation is to be performed. Traditionally, a computer will have a section of the machine set aside for the purpose of handling the instruction, which section may have a variety of names such as control unit, instruction sequencing unit, or instruction unit. This portion of the machine is referred to herein as the I unit, the I unit selects instructions, handles branch and interrupt functions, communicates with the channels, and performs other related control functions.

The description of the I unit herein is divided into "data flows" and controls. "Data flow" refers to the main registers, adders, incrementers, and decoders among which the manifestations of instructions, or portions of instructions, are routed, so as to perform the registering, testing, incrementing, and decoding of their instruction manifestations so as to derive a useful result therefrom.

The description of the I unit data flow is covered in two different ways herein: first, a complete look at the data flow will be given in sections 9.1 et seq. followed by individual descriptions of main portions thereof. The block diagrams of the first section show the same matter as the block diagrams of the second section, but the purpose and approach of the drawings differs. In studying the circuitry in detail, the second section should be utilized; to get an idea of how instructions are handled in this system, the drawings of the first section should be utilized.

9.1. *General introduction to unit data flow*

The I unit data flow is described in conjunction with portions of the E unit (which performs the arithmetic and logic operations upon operands, thereby executing the instructions), and the BCU (bus control unit, which controls the flow of data to and from storage units). The I unit data flow may be considered to comprise four portions:

Instruction selection shown in FIG. 72 and described in section 9.1.1;

Instruction input paths shown in FIG. 73 and described in section 9.1.2;

Instruction decoding shown in FIG. 74 and described in section 9.1.3;

AND instruction utilization shown in FIG. 75 and described in section 9.1.4.

9.1.1. INSTRUCTION SELECTION, FIG. 72

In the upper central section of FIG. 72 is shown the program status word register (PSW). This register is shown in detail in FIG. 131 through FIG. 139 of application Ser. No. 609,238. The PSW contains the system mask, storage protection keys, status bits indicating that the machine is utilizing ASCII code (A), the machine check mask (M), a WAIT bit (W), a PROBLEM bit (P), the INTERRUPTION CODE (IRPT CODE), the instruction LENGTH CODE (LC), the CONDITION CODE (CC), the PROGRAM MASK (PGM), and the instruction counter register (ICR), including a low order portion thereof (LO). It is the ICR which determines the address of the next instruction in a sequence of instructions which comprise a program.

The ICR feeds an incrementer (INCR) which increments the instruction address each time that an instruction buffer register is to be loaded from storage; the ICR also feeds a gate select adder (GSA) which updates the instruction count each time an instruction is performed so as to generate a correct address for the next instruction in a sequence. The INCR is shown in detail in FIG. 140 through FIG. 154 of application Ser. No. 609,238, The output of the INCR may be returned to the ICR and may also be applied to the SAR (storage address register) and the H REG (H register, a backup for the storage address register), as well as to a PGM STR COMP (program store compare circuit) and to the high order half (K 0–31) of the K register. The INCR is sometimes used merely as a data path to pass 32 bits from one portion of the PSW register to the K register, and is sometimes used to check (for correct parity) the two halves of the PSW. In order to provide a 32 bit data path, the INCR is provided with an INCR EXT (incrementer extender) which provides the low order 8 bits (0–7) of the data path when the INCR is so utilized. The INCR may also receive inputs from the H REG.

The illustrative diagram of FIG. 72 also shows a gate select adder and gate select register (GSA, GSR) which control the selection of a particular group of instruction bytes from among 8-byte storage words as described in section 9.1.2. Since each instruction has at least two bytes, any addressing of storage is on a byte basis, the lowest order bit (23) of the ICR is not utilized in selecting instructions from the AB REG; thus, only bits 20–22 are involved in the gate select mechanism. The GS mechanism is shown in FIG. 156 through FIG. 162 of application Ser. No. 609,238.

9.1.2. INSTRUCTION INPUT PATHS, FIG. 73

The output of the gate select register (GSR) in FIG.

72 is applied to a gate select decode circuit GS DEC (ABREG) so as to select the correct 32 bits at one time out of the AB register (A REG, B REG). The AB register is utilized as a buffer register for instructions which are fetched from storage so as to insure that there is always one instruction available for processing in addition to the instruction which is currently being processed in the I unit. Since the I unit generally processes each instruction concurrently with the execution of a previous instruction by the E unit, this means that the contents of the AB register may be as much as two instructions ahead of that which is being executed. Instructions are received from one of the storage units (STG 1A, STG 1B) over the storage bus out (SBO), or on the channel storage bus out (CH SBO) including data from the power distribution unit (PDU, which includes the maintenance channel). All data so received are stored in the storage bus out latch (SBOL), instructions being transferrable directly to the AB register, and all data, including instructions, being transferrable to the channel storage bus out or to the J register (J REG). Instructions may be temporarily placed in the J REG if they have not been fetched by a certain time in an instruction fetch cycle, and will thereafter be transferred to the AB register provided that a branch has not occurred. In all other cases, timely received instructions are transferred directly from SBOL to the AB register. The contents of the AB register is transferred to the IOP register and to the PRE DEC or TP (predecode) circuit by means of the gate select mechanism, 32 bits at a time. The choice of the 32 bit group to be selected from the AB register is made by the GATE SEL DEC (gate select decode) circuit which is controlled by the gate select circuitry of FIG. 72 so that the extraction of each instruction will result in extracting the next sequential instruction on a following operation. The AB register, and GS output gating therefore, are shown in FIG. 76 through FIG. 80 of application Ser. No. 609,238.

9.1.3. INSTRUCTION DECODING, FIG. 74

The 32 bits from the AB register are applied to the IOP register as shown in FIG. 74. This register includes an operation portion (OP), an R1 field, an R2–X field, a B field, and a D field. At the time an instruction (or a portion of an instruction) is loaded into the IOP register, preliminary information about the instruction is also being derived from the PRE DEC. The contents of the IOP register are transferred to various circuits which perform different functions in the handling of an instruction. The OP portion is applied to the IOP DEC (ID), where the operation portion is decoded for I unit use. The same portion is transferred along with the R1 portion to the BOP register; in turn, the OP portion of the BOP register is applied to the BOP DEC (BD), for backup operation decoding. It is the IOP and BOP decoders which perform a major portion of the operand and branch decoding in the system. Each of the fields R1, R2–X, and B are used to specify general purpose registers, the contents of which are involved in the execution of the instruction. The R1 field, however, is utilized from the BOP register rather than from the IOP register controlling selection of the general registers. Each of these fields is also tested for zero in order to determine special situations where no general register is to be utilized in accordance with the architectural definition of a data processing system in said System/360 Manual. The B field of the IOP register is applied to the addressing adder (AA) as a component of a storage address for all instructions which reference storage, the addressing adder being shown in FIG. 79 of application Ser. No. 609,238 which the R1 portion of the BOP register also applies to an ER1 register which provides R1 information later in a cycle. The ER1 register is so called because it provides R1 information to the E cycle rather than the I cycle.

In FIG. 74 various comparison circuits are shown which compare ER1 with R2–X, BR1 with R2–X, and BR2 with B. The purposes of the various comparisons are described in conjunction with the circuits which utilize them. The instruction decoding circuits are shown in detail in FIG. 76 et seq. of application Ser. No. 609,238.

9.1.4. INSTRUCTION UTILIZATION, FIG. 75

In FIG. 75, a plurality of general purpose registers (GR) receive information from the K REG under control of the ER1 SEL GR IN lines. The output of a general register selected by one of the lines: IR2 SEL GR, IB SEL GR, BR1 SEL GR, BR1+1 SEL GR lines will be applied to the general bus left or general bus right (GBL, GBR) for application to the register bus latch (RBL) shown in FIG. 73, and to the address adder (AA). The general registers, the GBL and GBR, and the controls therefor are shown in FIG. 114 et seq. of application Ser. No. 609,238. Other inputs to the address adder include a VFL LGTH FLD (VFL length field), the interrupt controls (IRPT CTRLS), and the IOP D field. The output of the address adder is applied to the SAR, and thence to the SAB (storage address bus) which applies address bits to storage. The address adder is also applied to the H register which serves as a sort of backup register for the SAR; addresses which are to be manipulated or compared are derived through the H register whereas utilization of address manifestations is through the SAR.

Also illustrated in FIG. 75 are the channel and unit selection circuits which respond to the H REG. Specifically, either the H REG or channel address signals from the console may be utilized to form a unit address on the UABO as well as channel selecting signals.

It should be borne in mind that FIG. 72 through FIG. 75 are intended as illustrative figures for reference, rather than being descriptive of the hardware as such. All of the hardware illustrated in FIG. 72 through FIG. 75 is illustrated, both in block diagram form, and in detail, in figures relating thereto, described hereinafter.

9.2. *Instruction decode data flow*

In FIG. 76 is shown that portion of the I unit data flow circuitry which receives and initially decodes instructions, including the general registers and the gates for the control over the input and output thereof. In the upper left hand corner of FIG. 76, a circuit which selects between the A register and the B register (SEL A/B) FIG. 77 and controls the operation of the A/B INV KEY circuit FIG. 78 and the SBO A/B GATING circuit FIG. 79 which select the proper invalid key for storage and which causes the proper one of the A and B registers to be gated, respectively. The A register (A REG) and the B register (B REG) FIG. 79 may respond to signals from either the storage bus out latch (SBOL) or the J register (J REG) so as to store manifestations of instructions which are to be performed. Both the A REG and the B REG are utilized together as a single instruction register (AB REG) the content of which may be selected by a gate select (GS) circuit FIG. 80 so as to supply one instruction at a time to the I unit operation register (IOP REG) FIG. 83. A portion of each instruction is also fed to a predecode circuit (PD) FIG. 81 and FIG. 82 where preliminary decoding takes place in order to provide control information useful in the proper fetching of instructions. Bits 8 to 15 of the IOP REG may also be set in response to bits 24–31 of the general bus left (GBL) output of the general registers (which is shown at the lower right hand corner of FIG. 76).

The IOP REG is the primary instruction register for the system, and is utilized as a source of operands, operand addresses, and operational codes as is described in said System/360 Manual. Specifically, the IOP REG supplies the operational portion of an instruction to the instruction decoder (ID) FIG. 86 through FIG. 98 and to a backup (or buffer) operation register (BOP) FIG. 102 through FIG. 103 and FIG. 106, which in turn feeds the BOP decode circuit (BD) FIG. 122 through FIG. 130. It is the I decode and the BOP decode circuits which supply the primary operation decoding for the I unit. The IOP REG also supplies operational manifestations to an E unit operation register (EOP) which in turn feeds a last cycle operation register (LCOP), both of which are located in the E unit of the system. A parity check is performed on the contents of the IOP REG by a checking circuit (IOP CHK) FIG. 85. The D field portion of each instruction is passed to an address adder under the control of a D field gating circuit (GT D FLD TO AA) FIG. 84.

The B and R2–X portions of each instruction are utilized in selecting a particular general register, the contents of which are to be utilized in some manner in the performance of an instruction; this is achieved by a general register outgating selection circuit (GR OUT SEL) FIG. 108 through FIG. 110. The B, R2–X, and R1 portions of each instruction are each tested to see that it equals other than zero, and the R1 portion of the contents of the BOP register is compared against the B and R2–X portion of the IOP register, as well as the R1 portion of the E register being compared with the R2–X portion of the IOP register. This is accomplished in compare circuits (COMP), FIG. E.37. through FIG. E.39.

The R1 portion of the BOP register may be incremented one unit at a time by an incrementer which is referred to in FIG. 74 as the BR1 ADDER and is referred to in FIG. 76 as the INCR FIG. 105. The R1 portion of the BOP register is applied to another R1 register (ER1) FIG. 104 which contains a manifestation of the R1 portion of an execution which is currently being executed in the E unit; thus, the ER1 register FIG. 104 is essentially an E unit register which is, however, located within the I unit and associated directly with control of circuitry within the I unit. The ER1 register also has an incrementer (INCR) FIG. 107 which permits incrementing R1 one unit at the time within the ER1 register. The content of the ER1 register is not only used in the compare circuit, but is also applied to ingating controls for the general registers (IN GTS) FIG. 116 and FIG. 117. These gates control the passage of data manifestations from a K register (K REG) into the general registers (GEN REGISTERS) FIG. 118. The content of the general registers FIG. 118 may be passed to either a left-hand general register output bus called "general bus left" (GBL) or to a right hand general register output bus called "general bus right" (GBR) by a general register outgate circuit (OUT GTS) FIG. 113 through FIG. 115. A general register gate control circuit (GT GR CTRLS) FIG. 112 selects which of the outputs of the GR OUT SEL circuit will be utilized to control the OUT GTS circuit.

Although not shown in FIG. 76, the predecode, I decode and BOP decode all supply a plurality of signals to various parts of the system in order to control the handling and execution of successive instructions.

Thus, the basic instruction handling circuits shown in FIG. 76 receive, select, and decode instructions, as well controlling the input and output of data from the general registers, portions of the instructions being tested for zero and compared against one another so as to provide proper control signals for the system.

9.2.1. A B REGISTERS

9.2.1.1. A/B Selection Circuit, FIG. 77

The selection as between the A register and the B register is determined by the SEL A/B circuit of FIG. 77 wherein a signal designating register A is generated on a SEL A line by an OR circuit 1 in response to a signal on a SEL A UNCOND line or in response to either one of two AND circuits 3, 4. The AND circuit 3 responds to the concurrence of a signal indicating that a branch condition upon events within the I unit has been successful on an I BR SUCC line together with the output of an OR circuit 5 which responds to an AND circuit 6. The AND circuit 6 operates in response to signals on a J LOADED LCH (I) line concurrently with a signal on a SEL A ON BR SUCC & J LD line. The other input to the OR circuit 5 is a signal on a SEL A ON SUCC BR line. The OR circuit 5 is also supplied to the AND circuit 4 which responds to signals on the E BR SUCC line. Thus, the OR circuit 1 will generate a signal on the SEL A line whenever successful branch for the I unit or from the E unit is indicated concurrently with an indication that A should be selected on a successful branch or that A should be selected on a successful branch when the J register is loaded and the J register is in fact loaded. A signal indicating that the B register is to be selected on a SEL B line is generated by a circuit 7 which is identical to the circuitry 1–6 at the top of FIG. 77. The inputs of the circuit 7 are identical to those of the circuits 1–6 with the exception of the fact that the following lines relating to the B register are substituted for those relating to the A register: SEL B ON BR SUCC & J LD, SEL B ON SUCC BR SEL B UNCOND.

9.2.1.2. A/B Invalid Key Circuit, FIG. 78

Instructions are fetched from storage in an overlap fashion; that is, a storage word containing instruction manifestations may be first fetched to the A register, and while these are being handled, a subsequent storage word, next in a sequence of storage words, may be fetched to the B register. If a fetch operation is initiated for either the A or B register with invalid storage protection keys, the bus control unit (BCU) will not be able to differentiate between the A and B register as to the destination of the fetch with which the invalid key was associated. This is so because of the fact that whether the A or B register is to be selected is determined solely by whether the storage word being fetched is in an even or an odd address. An instruction manifesting storage word fetched from an even address is automatically placed in the A register, whereas an instruction manifesting storage word from an odd address is placed in the B register. In order to properly handle an interruption resulting from the specification of an invalid storage key, the I unit data flow control circuits determine whether the invalid key is associated with a fetch to the A register or to the B register.

In FIG. 78, a signal is generated on an A INV ADR line by a latch 1 which is set by an OR circuit 2 in response to a signal on a SCAN IN A INV KEY line or in response to either one of two AND circuits 3, 4. Both of the AND circuits 3, 4 respond to a signal on the SET A REG line. The AND circuit 3 responds to a signal from the BCU which indicates that an invalid key was sensed as a result of a fetch to the AB registers (in this sense, there is no distinction between the A register and the B register) on an AB INV line, and also responds to a signal which indicates that data manifestations which in fact have been retrieved from storage are to be stored in the AB registers on a GT J TO AB line. The AND circuit 4 responds to signals on a J INV line concurrently with a GT J TO AB line. Thus, either the AND circuit 3 or the AND circuit 4 will operate provided that the A register is to be set, and there is either an indication that an AB register fetch has resulted in an invalid key in an operation where the SBO is to be gated to the AB registers, or where a fetch to the J register has resulted in an invalid key indication in an operation where the J register is to be gated to the AB registers.

In the bottom of FIG. 78, a circuit 5 is identical to the circuits 1–4 with exception to the fact that input lines relating to the B register are substituted for corresponding lines relating to the A register so as to generate a signal on a B INV AD R line.

Notice that the latch 1 and the corresponding latch within the circuit 5 are each reset by the same signal as is used to gate the setting AND circuit; thus, each latch is reset just a few nanoseconds prior to being set as described in the section herein relating to circuit components.

9.2.1.3. AB Register And Gating Circuits Therefor, FIG 79

At the top of FIG. 79 is shown the A register, and the B register is shown at the bottom thereof. The A register is set in response to a signal on a SET A REG line (which line is utilized in FIG. 78). A signal is generated on the SET A REG line by an OR circuit 1*a* in response to a signal on a NOT SCAN GT TO IOP or by an AND circuit 2*a* which operates in response to signals on a SEL A line and to a late B running clock pulse or an LBR line. The scan input to the OR circuit 1 permits setting the A register at the particular point in a scanning type of maintenance operation. The A register comprises a plurality of latches 1 each settable by a corresponding OR circuit 2 in response to related pairs of AND circuits 3, 4, each of which responds to the signal on the SET A REG line. The AND circuits 3 also respond to an inverter 5 which is operated by a signal on a GT J TO AB line. The GATE J TO AB signal is generated by an AND circuit 6 in response to signals on the J LOADED LCH (I) and TSTS CMPLT lines. The AND circuit 6 therefore operates at a time when a conditional branch operation has been indicated by a first instruction, and fetching of an instruction, to which a branch is to be effected, has taken place; when a storage word containing the instruction to which branching is to be effected is loaded in the J register, and when all conditional branch testing is completed, the AND circuit 6 will provide a signal on the GT J TO AB line. Due to the inverter 5, each of the AND circuits 3 will respond to a corresponding bit of the storage bus out (SBO) whenever there is no signal on the GT J TO AB line concurrently with a signal on the SET A REG line. On the other hand, if there is a signal on the GT J TO AB line, then each of the AND circuits 4 will permit a corresponding bit of the J register (J REG) to set a corresponding one of the latches 1 of the A REG.

On a corresponding fashion, each bit of the B REG may be set by a corresponding bit of the SBO or the J REG in dependence upon an output from the inverter 5 or the AND circuit 6, respectively, concurrently with a signal on the SET B REG line. The SET B REG line is controlled by an OR circuit 7 in response to an AND circuit 8, both of which operate in the same fashion as the OR circuit 1 and the AND circuit 2 except for the fact that a signal on the SEL B line is used instead of the SEL A line.

9.2.1.4. AB Gate Select Circuit, FIG. 80

The manner in which the gate select mechanism selects a particular 32 bits for extraction from the AB register is illustrated in FIG. 73 and the actual implementation thereof is shown in FIG. 80. In FIG. 80, a plurality of AND circuits 1–6 permit gating out particular 32 bit groups of the AB register, there being two AND circuits for each bit of the AB register so as to achieve the overlapped gating of 32 bit groups which are separated by 16 bits as illustrated in FIG. 73. The outputs of the AND circuits 1–6 are supplied to a plurality of OR circuits 8 . . . 9, there being 36 OR circuits, one for each bit in a 32 bit group and one for each of 4 parity bits associated therewith. The output of FIG. 80 comprises the AB register output which is utilized by the IOP register and the predecode circuit.

9.2.2. PREDECODE 9.2.2.1 Predecode Circuit FIG. 76

In order to determine whether a second group of manifestations must be gated out of the AB register, and to sense the presence of special instructions such as branch instructions which affect the manner in which the instruction itself will be processed prior to the execution thereof, the predecode circuit (PD) of FIGS. 81, 82 determines the presence of certain types of instructions. A first group of branch instructions is indicated by a signal on a PD BR GROUP 1 line by an AND circuit 1 in FIGS. 81, 82 which responds to the following bits of the AB register: NOT 2, NOT 3, NOT 4, and 5. Reference to the operation code charts shown in section 9.2.4.1 illustrates that this combination of bits will specify the following instructions as being within branch group 1 as sensed by the AND circuit 1: (RR format instructions). Set Program Mask, Branch and Link, Branch on Count, Branch on Condition; (RX format instructions) Execute, Branch on Link, Branch on Count, Branch on Condition; and (RS, SI format instructions) Write Direct, Read Direct, Branch on Index High, and Branch on Index Low-Equal.

A second group of branch type instructions are indicated by a signal on a PD BR GROUP 2 line which is generated by an OR circuit 2 in response to any one of three AND circuits 3–6, in FIG. 81. The AND circuit 3 responds to AB bits NOT 7, 6, AND NOT 0. The NOT 0 bit restricts the decoding to the RR and RX formats; the combination of NOT 7 and 6 specify Branch And Link and Superviser Call instructions in the RR format, and specify Branch And Link, Add, and Convert To Decimal instructions in the RX format. The AND circuit 3 also requires a signal from an inverter 7, which it will have when there is no signal on a PD R1=15 line from an AND circuit 8, which in turn senses all ONES in the R1 field of BOP (8–11). In a similar fashion, the AND circuit 4 will create a signal for the Branch And Link instruction in the RR format, the AND circuit 5 will provide a signal for the Execute instruction, and the AND circuit 6 provides a signal for the Branch On Index High and Branch On Index Low-Equal instructions.

9.2.2.2 Predecode IOP Loaded Circuit, FIG. 82

In order to determine whether the AB register is sufficiently loaded so that an instruction of suitable length (2, 4 or 6 bytes) is available for initial decoding of the instruction, the circuit of FIG. 82 analyzes the setting of the gate select register (GSR) and the highest order two bits of the instruction which determine the format (and therefore the length) of the instruction which is being read out of the AB register. Refer to the chart on operation codes in section 9.2.4.1 and to the data flow illustration of FIG. 73, whenever bits 21 and 22 of the GSR are both present, that means that a 32 bit instruction manifestation will be derived partly from the A register and partly from the B register. If a 16 bit (RR) instruction is to be involved, 16 of the bits are useful and the other 16 are not. Of the various instruction formats, the RR format is of a single syllable (16 bits) and therefor even though the GSR specifies both bits 21 and 22, which means that split gating as between the A and B registers is involved, a complete RR instruction may be had out of the remainder of the register wherein the instruction starts.

For instance, assuming that the GSR is set to 011, this will cause bits 48 through 63 of the A register and bits 0 through 15 of the B register to be gated out. If an RR instruction is involved, the instruction will be complete within bits 48–63 of the A register. The content of bits 0–15 of the B register are totally immaterial. Therefore, the A register can be considered to be completely loaded insofar as that instruction is concerned when the GSR is set to 011. On the other hand, the RX, RS AND SI formats each contain two syllables (32 bits) and therefore addresses within the A and B registers of 0, 16 or 32 will specify a complete instruction of that type within one of those registers. On the other hand, two syllable instructions beginning at bit 48 of the A register will not be complete without the first 16 bits of the B register, and these two-syllable instructions if they begin at bit 48 of the B register will not be complete without the first 16 bits of the A register. The circuit of FIG. 82 senses whether or not a complete instruction is contained within the register which is being referenced, beginning at the bit position designated by the GSR. For instance, an AND circuit 1 senses the presence of GSR bits 21 and 22 so as to indicate that a split register situation exists: that is, bits 48 to 63 of the A register will be gated out with bits 0–15 of the B register, or bits 48–63 of the B register will be gated out with bits 0–15 of the A register. When this is true, and the instruction format is one which contains either 4 or 6 syllables, then the instruction is not complete within the particular register where it begins. The AND circuit 1 senses a 1 bit from the AB registers, which bit is present in both the RX and the SS format, and the AND circuit 2 senses a 0 bit from the AB register which 0 bit is present in the RS, SI format. Thus, between AND circuit 1 and AND circuit 2 it is possible to sense that the GSR setting is such that only a 16 bit instruction can be read out, but that either a 32 bit or a 48 bit instruction is being specified.

When either of the AND circuits 1, 2 is operated, an OR circuit 3 will supply a signal to an inverter 4 which prevents the presence of a signal on a PD COND IOP LOADED line. In a similar fashion, an AND circuit 5 senses the presence of GSR bit 21, which will be present whenever an instruction begins in the high order half of a register. That is, if bits 32 through 63 are being read out, or if bits 48–63 together with bits 0–15 of the other register are being read out, the AND circuit 5 will be operative. Since 32 bits or 16 bits only will be available in whichever register is being read out, it is apparent that a 48 bit instruction will not be completely contained within the register at that time. The AND circuit 5 responds to a 0 bit from the AB register to recognize that the SS format is involved (see the instruction format chart shown in said System/360 Manual), to cause the OR circuit 3 to energize the inverter 4 and thereby prevent a signal from being generated on the PD COND IOP LOADED line. In all other situations, the inverter 4 will supply the predecode condition IOP loaded signal which is utilized elsewhere to sense when the instruction is properly loaded.

9.2.3. IOP CIRCUITS

9.2.3.1 IOP Register, FIG. 83

As is illustrated in FIG. 74, all of the bits of the IOP register are set by the AB register, and in addition, bits 8–15 of the IOP register may be set by bits 24–31 of the GBL (general bus left). As shown in FIG. 83, the IOP register comprises a plurality of latches 1 each of which is set by a corresponding OR circuit 2 in response to a related paid of AND circuits 3, the OR circuits 2 for bits 8–15 and P8–15 also responding to a related AND circuit 4 which relates to the GBL input. Each of the latches 1 is reset by a related OR circuit 5 in response to either one of a pair of corresponding AND circuits 6. Half of the AND circuits 3, 6 are responsive to an AND circuit 7 which provides a gating signal whenever there are signals present on the SET IOP and AC lines. The remainder of the AND circuits 3 and the AND circuits 6 respond to a SCAN gating signal on the SCAN GT TO IOP line. The AND circuits 4 are responsive to a gating signal on the GR GB TO RBL.

Concurrently with a signal on the GATE line, which permits OR-ing bits 24–31 of GR (R1) into bits 8–15 of the subject instruction of an Execute instruction. The SCAN input to IOP is not shown on the data flow illustrative drawing of FIG. 74 since it has to do with maintenance, rather than with regular operation of the machine. Whenever scanning into the IOP is involved, a signal on the SCAN GT TO IOP line will cause the related AND circuits 3, 6 which are fed thereby to respond to respectively corresponding bits of the J register, the J register being gated through the instruction counter register (ICR); therefore, respective bit lines of the ICR are applied to the AND circuits 3, 6 in FIG. 83. During normal system operation, a signal on the SET IOP line to cause corresponding bits of the IOP register to respond to related AB register bits, that is the bits presented from the A register and B register through the gate select mechanism. The output of the IOP register comprises the IOP bits 0–23 together with three parity bits: P0–7, P8–15, and P16–23.

A portion of the IOP register is shown in FIG. E26A., wherein a parity bit for the high-order four bits of the D field is generated. In order to generate a parity bit for the D field, the parity bit for the 8 bit group which includes the D field has the effect of the B field removed therefrom whereby the result is correct parity for the D field. In FIG. E26A., a signal is generated on the D FLD P 20–33 line by an EXCLUSIVE OR circuit 1 in response to an EXCLUSIVE OR complex 2 which in turn responds to IOP bits 16–19. The EXCLUSIVE OR circuit 1 also responds to the parity bit for IOP bits 16–23 as manifested by a signal on the P16–23 line. Thus, the output of the EXCLUSIVE OR circuit will reflect the total evenness or oddness of the high-order four bits of the D field (bits 20–23 of the IOP register).

9.2.3.2. D Field Gate, FIG. 84

Referring briefly to the illustrative drawings in FIG. 74 and FIG. 75, the D field of the IOP register is a "displacement" field of operand addresses for instructions which are in the RX, RS, SI, and SS formats. The contents of the D field therefore is to be applied to the address adder so that it may be added to the value derived from a general register which is specified by the B field of the IOP register, and, in the case of an RX format instruction, there is also added the value of a general register specified by the contents of the R2–X field of the IOP register. The circuit of FIG. 84 controls gating of the D field from the IOP register to the addressing adder (AA).

In FIG. 84, a D field gating signal is generated on a GT D FLD TO AA line by an OR circuit 1 in response to an AND circuit 2 which in turn is operated by signals on a T1 line concurrently with a signal on a NOT ID RR line. The other input to the OR circuit 1 is a signal on the SS OP line. The GT D FLD TO AA line is also connected to a plurality of AND circuits 3, each of which responds to a related IOP bit 20–31 (which comprises the D field portion of the IOP register). Each of the AND circuits 3 generates a respectively corresponding signal on a related one of a plurality of D FLD lines 20–31. In addition, an AND circuit 4 will generate a D field parity bit in response to a signal on the D FLD P 20–23 line.

9.2.3.3. IOP Error Circuit, FIG. 85

In FIG. 85 is shown a latch 1 which generates an error signal on an IOP ERR line. The latch 1 is set by an AND circuit 2 at A time in response to a signal on the SET IOP ERR line whenever there is a signal generated by an OR circuit 3. The OR circuit 3 is responsive to three different EXCLUSIVE OR complexes, only one of which is shown in FIG. 85. Concerning the parity of the byte containing bits 8–15, an inverter 4 is responsive to an EXCLUSIVE OR tree 5 so that there will be a signal from the inverter 4 to the OR circuit 3 whenever the sum total of inputs to the EXCLUSIVE OR tree 5 is an even number. Circuits similar to the inverter 4 and the EXCLUSIVE OR tree 5 would be provided for the other two bytes of the IOP register so that the OR circuit 3 would provide a signal to set the latch 1 in the event that other than odd parity existed in any one of the bytes.

9.2.4. IOP INSTRUCTION DECODE, FIG. 86 THROUGH FIG. 98

The I decode circuits are shown in a simplified form in FIG. 86 through FIG. 91. FIG. 92 through FIG. 97 comprise charts illustrating the I decode and BOP decode lines which are energized for each of the instructions of the present embodiment. The chart layout shown in FIG. 92 through FIG. 97 is similar to the layout of the instruction chart shown hereinbefore, that is, the format of the instruction is indicated in the upper left hand corner of the top half of the chart and in the upper left hand corner of the bottom half of the chart, and the variation bits for the particullar instruction within the format is shown in the right hand column of each chart. Thus, the branch and link instruction in the RR format (BALR) is shown in the center section of FIG. 92, and has an operand code for the IOP bits 0–7 of 0000–0101. Taking the BALR instruction as an example, it can be seen that a number of lines (which are indicated vertically at the top of the figure) are involved with this instruction. The nature of the involvement is identified by the key letters found in the horizontal row which correspond to the BALR instruction. The conditions, upon which the generation of signals on the lines indicated in FIG. 92 through FIG. 97 are conditioned, are shown in the following chart:

*ID and BD decoding conditions*

A. ($R2$ or $X2=0$) & (BR1 equals IR2) & (BD COMP REQ)
B. ($B2\neq 0$) & (BR1 equals IB) & (BD COMP REQ)
C. $R2\neq 0$
D. GROUT
E. T2
F. (T1) & ($R2$ or $X2=0$)
G. *H REG* 22=1
H. *H REG* 21=0
J. (*H REG* 21=0) & (*H REG* 22=0)
K. (*H REG* 21=0) & (*H REG* 22= 1)
L. (*H REG* 21=1) & (*H REG* 22=0)
M. *H REG* 21=1
N. (*H REG* 21=1) & (*H REG* 22=1)
X. Unconditional Whenever more than one condition letter is shown in the tables of FIG. 92 through FIG. 97, the satisfaction of any one of the conditions will permit the generation of the indicated signal. It should be noted that the majority of the decode lines are energized by the BOP decode circuits rather than the I decode circuits; for that reason, the BOP decode circuits are shown in complete detail, but to avoid duplicity, the I decode circuits are shown in a simplified, illustrative manner. It should be understood by those skilled in the art that the manner in which the various decode lines are energized is relatively unimportant, it being sufficient that the requirements of the embodiment be satisfied by generating sufficient signals of a suitable kind so as to initiate circuit responses in a required manner. More specifically, a "shotgun" approach to decoding is illustrated with respect to the I decode circuitry shown in FIG. 86 through FIG. 98, whereas an efficient, though conceptionally complex method of decoding is utilized in the illustrative example of the BOP decode circuits illustrated in FIG. 122 through FIG. 130.

9.2.4.1. Chart of Instructions by Class

The following chart illustrates instructions to which the system of the present embodiment may respond. These instructions are the same as those set forth in the architectural definition of the data processing system disclosed in said System/360 Manual.

In the following chart, the following abbreviations are used:

| | |
|---|---|
| & | And. |
| BR | Branch. |
| CH | Channel. |
| CHAR | Character. |
| COMP | Compare. |
| COND | Condition. |
| CPMNT | Complement. |
| CVRT | Convert. |
| D | Double. |
| DL | Double Logical. |
| EQ | Equal. |
| EXCL | Exclusive. |
| N | Normalized. |
| NEG | Negative. |
| NUM | Numeric. |
| PGM | Program. |
| POS | Positive. |
| S | Single. |
| SL | Single Logical. |
| SUB | Subtract. |
| SUP | Supervisor. |
| U | Unnormalized. |

CHART OF INSTRUCTIONS BY FORMAT

| Format | RR | RR | RR | RR |
|---|---|---|---|---|
| Class | Branching & Status Switching | Fixed Point Fullword, & Logical | Floating Point, Long | Floating Point, Short |
| xxxx | 0000xxxx | 0001xxxx | 0010xxxx | 0011xxxx |
| 0000 | | LOAD POS | LOAD POS | LOAD POS. |
| 0001 | | LOAD NEG | LOAD NEG | LOAD NEG. |
| 0010 | | LOAD & TEST | LOAD & TEST | LOAD & TEST. |
| 0011 | | LOAD CPMNT | LOAD CPMNT | LOAD CPMNT. |
| 0100 | SET PGM MASK | AND | HALVE | HALVE. |
| 0101 | BR & LINK | COMP LOGICAL | | |
| 0110 | BR ON COUNT | OR | | |
| 01111 | BR ON COND | EXCL OR | | |
| 1000 | SET KEY | LOAD | LOAD | LOAD. |
| 1001 | INSERT KEY | COMP | COMP | COMP. |
| 1010 | SUP CALL | ADD | ADD N | ADD N. |
| 1011 | | SUB | SUB N | SUB N. |
| 1100 | | MULTIPLY | MULTIPLY | MULTIPLY. |
| 1101 | | DIVIDE | DIVIDE | DIVIDE. |
| 1110 | | ADD LOGICAL | ADD U | ADD U. |
| 1111 | | SUB LOGICAL | SUB U | SUB U. |

| Format | RX | RX | RX | RX |
|---|---|---|---|---|
| Class | Fixed Point Halfword & Branching | Fixed Point Fullword & Logical | Floating Point, Long | Floating Point, Short |
| xxxx | 0100xxxx | 0101xxxx | 0110xxxx | 0111xxxx |
| 0000 | STORE | STORE | STORE | STORE. |
| 0001 | LOAD ADDRESS | | | |
| 0010 | STORE CHAR | | | |
| 0011 | INSERT CHAR | | | |
| 0100 | EXECUTE | AND | | |
| 0101 | BR & LINK | COMP LOGICAL | | |
| 0110 | BR ON COUNT | OR | | |
| 0111 | BR ON COND | EXCL OR | | |
| 10000 | LOAD | LOAD | LOAD | LOAD. |
| 1001 | COMP | COMP | COMP | COMP. |
| 1010 | ADD | ADD | ADD N | ADD N; |
| 1011 | SUB | SUB | SUB N | SUB N. |
| 1100 | MULTIPLY | MULTIPLY | MULTIPLY | MULTIPLY. |
| 1101 | | DIVIDE | DIVIDE | DIVIDE. |
| 1110 | CVRT DECIMAL | ADD LOGICAL | ADD U | ADD U. |
| 1111 | CVRT BINARY | SUB LOGICAL | SUB U | SUB U. |

CHART OF INSTRUCTIONS BY FORMAT—Continued

| Format | RS, SI | RS, SI | | |
|---|---|---|---|---|
| Class | Branching, Status Switching and Shifting | Fixed Point, Logical, and Input/Output | | |
| xxxx | 1000xxxx | 1001xxxx | 1010xxxx | 1011x |
| 0000 | SET SYSTEM MASK. | STORE MULTIPLE | | |
| 0001 | | TEST UNDER MASK. | | |
| 0010 | LOAD PSW | MOVE | | |
| 0011 | DIAGNOSE | TEST & SET | | |
| 0100 | WRITE DIRECT | AND | | |
| 0101 | READ DIRECT | COMP LOGICAL | | |
| 0110 | BR HIGH | OR | | |
| 0111 | BR LOW-EQ | EXCL OR | | |
| 1000 | SHIFT RIGHT SL | LOAD MULTIPLE | | |
| 1001 | SHIFT LEFT SL | | | |
| 1010 | SHIFT RIGHT S | | | |
| 1011 | SHIFT LEFT S | | | |
| 1100 | SHIFT RIGHT DL | START I/O | | |
| 1101 | SHIFT LEFT DL | TEST I/O | | |
| 1110 | SHIFT RIGHT D | HALT I/O | | |
| 1111 | SHIFT LEFT D | TEST CH | | |

| Format | | SS | | SS |
|---|---|---|---|---|
| Class | | Logical | | Decimal |
| xxxx | 1100xxxx | 1101xxxx | 1110xxxx | 1111xxxx |
| 0000 | | | | |
| 0001 | | MOVE NUM | | MOVE W OFFSET. |
| 0010 | | MOVE | | PACK. |
| 0011 | | MOVE ZONE | | UNPACK. |
| 0100 | | AND | | |
| 0101 | | COMP LOGICAL | | |
| 0110 | | OR | | |
| 0111 | | EXCL OR | | |
| 1000 | | | | ZERO AND ADD. |
| 1001 | | | | COMP. |
| 1010 | | | | ADD. |
| 1011 | | | | SUB. |
| 1100 | | TRANSLATE | | MULTIPLY. |
| 1101 | | TRANSLATE & TEST | | DIVIDE. |
| 1110 | | EDIT | | |
| 1111 | | EDIT & MARK | | |

Legend N=Normalized; U=Unnormalized; SL=Single logical; S=Single; DL=Double logical; D=Double.

9.2.4.2. Alphabetical List of Instructions

The following list is an alphabetical list by instruction name of the instructions found in the chart shown in the preceding section. This chart also includes instruction abbreviations as used herein, although not all of such abbreviations appear specifically in the description of this embodiment. The chart also shows the instruction format, indicates whether or not the condition code is set, indicates the kinds of exceptions which make may cause interruptions during the execution of the particular instruction, and indicates the code (that is, the two digit designation which is equal to the 8 bit code such as bits 0–7 of the IOP register) which identifies a particular instruction: in that code, decimal values of 1 through 9 are created by an equivalent binary value, and the values A–F are equal to decimal values of 10–15, whereby the code is specified in two hexadecimal columns, each column capable of having a decimal value of 0–15 as indicated by the numbers 0–9 and A–F. The first character of the instruction code (such as the numeral 1 for the AR instruction) equals the hexadecimal value of the IOP bits 0–3 shown at the top of each column in the chart of the preceding section:

ALPHABETIC LIST OF INSTRUCTIONS

| Name | Mnemonic | Format | Exceptions | Codes |
|---|---|---|---|---|
| ADD | AR | RR C | IF | 1A 3 |
| ADD | A | RX C | A S IF | 5A 3 |
| ADD DECIMAL | AP | SS C | P A D DF | FA 4 |
| ADD HALFWORD | AH | RX C | A S IF | 4A 3 |
| ADD LOGICAL | ALR | RR C | | 1E 3 |
| ADD LOGICAL | AL | RX C | A S | 5E 3 |
| ADD NORMALIZED LONG | N ADR | RR C | S U E LS | 2A 5 |
| Do | N AD | RX C | A S U E LS | 6A 5 |
| ADD NORMALIZED SHORT | N AER | RR C | S U E LS | 3A 5 |
| Do | N AE | RX C | A S U E LS | 7A 5 |
| ADD UNNORMALIZED LONG | AWR | RR C | S E LS | 2E 5 |
| DO | AW | RX C | A S E LS | 6E 5 |
| ADD UNNORMALIZED SHORT | AUR | RR C | S E LS | 3E 5 |
| Do | AU | RX C | A S E LS | 7E 5 |
| AND | NR | RR C | | 14 6 |
| AND | N | RX C | A S | 54 6 |
| AND | NI | SI C | P A | 94 6 |
| AND | NC | SS C | P A | D4 6 |
| BRANCH AND LINK | BALR | RR | | 05 7 |
| Do | BAL | RX | | 45 7 |
| BRANCH ON CONDITION | BCR | RR | | 07 7 |
| Do | BC | RX | | 47 7 |
| BRANCH ON COUNT | BCTR | RR | | 06 7 |
| Do | BCT | RX | | 46 7 |
| BRANCH ON INDEX HIGH | BXH | RX | | 86 7 |
| BRANCH ON INDEX LOW OR EQUAL | BXLE | RS | | 87 7 |
| COMPARE | CR | RR C | | 19 3 |
| Do | C | RX C | A S | 59 3 |
| COMPARE DECIMAL | CP | SS C | A D | F9 4 |
| COMPARE HALFWORD | CH | RX C | A S | 49 3 |
| COMPARE LOGICAL | CLR | RR C | | 15 6 |
| Do | CL | RX C | A S | 55 6 |
| Do | CLI | SI C | A | 95 6 |
| Do | CLC | SS C | A | D5 6 |

ALPHABETICAL LIST OF INSTRUCTIONS—Continued

| Name | Mnemonic | Format | Exceptions | Codes |
|---|---|---|---|---|
| COMPARE LONG | CDR | RR C | S | 29 5 |
| Do | CD | RX C | A S | 69 5 |
| COMPARE SHORT | CER | RR C | S | 39 5 |
| Do | CE | RX C | A S | 79 5 |
| CONVERT TO BINARY | CVB | RX | A S D IK | 4F 3 |
| CONVERT TO DECIMAL | CVD | RX | P A S | 4E 3 |
| DELAY | DLY | RR | | 0B 8 |
| DIAGNOSE | | SI | M A S | 83 8 |
| DIVIDE | DR | RR | S IK | 1D 3 |
| Do | D | RX | A S IK | 5D 3 |
| DIVIDE DECIMAL | DP | SS | P A S D DK | FD 4 |
| DIVIDE LONG | N DDR | RR | S U E FK | 2D 5 |
| Do | N DD | RX | A S U E FK | 6D 6 |
| DIVIDE SHORT | N DER | RR | S U E FK | 3D 5 |
| Do | N DE | RX | A S U E FK | 7D 5 |
| EDIT | ED | SS C | P A D | DE 6 |
| EDIT AND MARK | EDMK | SS C | P A D | DF 6 |
| EXCLUSIVE OR | XR | RR C | | 17 6 |
| Do | X | RX C | A S | 57 6 |
| Do | XI | SI C | P A | 97 6 |
| Do | XC | SS C | P A | D7 6 |
| EXECUTE | EX | RX | A S EX | 44 7 |
| HALT I/O | HIO | SI C | M | 9E 1 |
| HALVE LONG | HDR | RR | S | 24 5 |
| HALVE SHORT | HER | RR | S | 34 5 |
| INSERT CHARACTER | IC | RX | A | 43 6 |
| INSERT STORAGE KEY | ISK | RR | M A S | 09 8 |
| LOAD | LR | RR | | 18 3 |
| Do | L | RX | A S | 58 3 |
| LOAD ADDRESS | LA | RX | | 41 6 |
| LOAD AND TEST | LTR | RR C | | 12 3 |
| LOAD AND TEST LONG | LTDR | RR C | S | 22 5 |
| LOAD AND TEST SHORT | LTER | RR C | S | 32 5 |
| LOAD COMPLEMENT | LCR | RR C | IF | 13 3 |
| LOAD COMPLEMENT LONG | LCDR | RR C | S | 23 5 |
| LOAD COMPLEMENT SHORT | LCER | RR C | S | 33 5 |
| LOAD HALFWORD | LH | RX | A S | 48 3 |
| LOAD IDENTITY | LI | RR | | 0C 8 |
| LOAD LONG | LDR | RR | S | 28 5 |
| Do | LD | RX | A S | 68 5 |
| LOAD MULTIPLE | LM | RS | A S | 98 3 |
| LOAD NEGATIVE | LNR | RR C | | 11 3 |
| LOAD NEGATIVE LONG | LNDR | RR C | S | 21 5 |
| LOAD NEGATIVE SHORT | LNER | RR C | S | 31 5 |
| LOAD POSITIVE | LPR | RR C | IF | 10 3 |
| LOAD POSITIVE LONG | LPDR | RR C | S | 20 5 |
| LOAD POSITIVE SHORT | LPER | RR C | S | 30 5 |
| LOAD PS BASE ADDRESS | LPSB | SI | M A S | A1 8 |
| LOAD PSW | LPSW | SI L | M A S | 82 8 |
| LOAD SHORT | LER | RR | S | 38 5 |
| Do | LE | RX | A S | 78 5 |
| MOVE | MVI | SI | P A | 92 6 |
| Do | MVC | SS | P A | D2 6 |
| MOVE NUMERICS | MVN | SS | P A | D1 6 |
| MOVE WITH OFFSET | MVO | SS | P A | F1 4 |
| MOVE ZONES | MVZ | SS | P A | D3 6 |
| MULTIPLY | MR | RR | S | 1C 3 |
| Do | M | RX | A S | 5C 3 |
| MULTIPLY DECIMAL | MP | SS | P A S D | FC 4 |
| MULTIPLY HALFWORD | MH | RX | A S | 4C 3 |
| MULTIPLY LONG | N MDR | RR | S U E | 2C 5 |
| Do | N MD | RX | A S U E | 6C 5 |
| MULTIPLY SHORT | N MER | RR | S U E | 3C 5 |
| Do | N ME | RX | A S U E | 7C 5 |
| OR | OR | RR C | | 16 6 |
| OR | O | RX C | A S | 56 6 |
| OR | OI | SI C | P A | 96 6 |
| OR | OC | SS C | P A | D6 6 |
| PACK | PACK | SS | P A | F2 4 |
| READ DIRECT | RDD | SI | M P A S | 85 8 |
| SET CONFIGURATION | SCON | RR C | M S | 01 8 |
| SET PCI | SPCI | SI C | M | 9B 1 |
| SET PROGRAM MASK | SPM | RR L | | 04 8 |
| SET STORAGE KEY | SSK | RR | M A S | 08 8 |
| SET SYSTEM MASK | SSM | SI | M A | 80 8 |
| SHIFT LEFT DOUBLE | SLDA | RS C | S IF | 8F 3 |
| SHIFT LEFT DOUBLE LOGICAL | SLDL | RS | S | 8D 6 |
| SHIFT LEFT SINGLE | SLA | RS C | IF | 8B 3 |
| SHIFT LEFT SINGLE LOGICAL | SLL | RS | | 89 6 |
| SHIFT RIGHT DOUBLE | SRDA | RS C | S | 8E 3 |
| SHIFT RIGHT DOUBLE LOGICAL | SRDL | RS | S | 8C 6 |
| SHIFT RIGHT SINGLE | SRA | RS C | | 8A 3 |
| SHIFT RIGHT SINGLE LOGICAL | SRL | RS | | 88 6 |
| START I/O | SIO | SI C | M | 9C 1 |
| STORE | ST | RX | P A S | 50 3 |
| STORE CHARACTER | STC | RX | P A | 42 6 |
| STORE HALFWORD | STH | RX | P A S | 40 3 |
| STORE LONG | STD | RX | P A S | 60 5 |
| STORE MULTIPLE | STM | RS | P A S | 90 3 |
| STORE PS BASE ADDRESS | SPSB | SI | M P A S | A0 8 |
| STORE SHORT | STE | RX | P A S | 70 5 |
| SUBTRACT | SR | RR C | IF | 1B 3 |
| SUBTRACT | S | RX C | A S IF | 5B 3 |
| SUBTRACT DECIMAL | SP | SS C | P A D DF | FB 4 |
| SUBTRACT HALFWORD | SH | RX C | A S IF | 4B 3 |
| SUBTRACT LOGICAL | SLR | RR C | | 1F 3 |
| Do | SL | RX C | A S | 5F 3 |
| SUBTRACT NORMALIZED LONG | N SDR | RR C | S U E LS | 2B 5 |
| Do | N SD | RX C | A S U E LS | 6B 5 |
| SUBTRACT NORMALIZED SHORT | N SER | RR C | S U E LS | 3B 5 |
| Do | N SE | RX C | A S U E LS | 7B |

ALPHABETICAL LIST OF INSTRUCTIONS—Continued

| Name | Mnemonic | Format | Exceptions | Codes |
|---|---|---|---|---|
| SUBTRACT UNNORMALIZED LONG | SWR | RR C | S E LS | 2F 5 |
| Do | SW | RX C | A S E LS | 6F 5 |
| SUBTRACT UNNORMALIZED SHORT | SUR | RR C | S E LS | 3F 5 |
| Do | SU | RX C | A S E LS | 7F 5 |
| SUPERVISOR CALL | SVC | RR | | 0A 8 |
| TEST AND SET | TS | SI C | P A | 93 8 |
| TEST CHANNEL | TCH | SI C M | | 9F 1 |
| TEST I/O | TIO | SI C M | | 9D 1 |
| TEST UNDER MASK | TM | SI C | A | 91 6 |
| TRANSLATE | TR | SS | P A | DC 6 |
| TRANSLATE AND TEST | TRT | SS C | A | DD 6 |
| UNPACK | UNPK | SS | P A | F3 4 |
| WRITE DIRECT | WRD | SI M | A S | 84 8 |
| ZERO AND ADD | ZAP | SS C | P A D DF | F8 4 |

Legend.—A=Addressing exception; C=Condition code is set; D=Data exception; DF=Decimal-overflow exception; DK=Decimal-divide exception; E=Exponent-overflow exception; EX=Execute exception; FK=Floating-point divide exception; IF=Fixed-point overflow exception; IK=Fixed-point divide exception; L=New condition code loaded; LS=Significance exception; M=Provileged-operation exception; N=Normalized operation; P=Protection exception; S=Specification exception; U=Exponent-underflow exception.

9.2.4.3. IOP Format Decode, FIG. 86

In FIG. 86, a plurality of AND circuits 1–4 each respond to a different combination of 0 and 1 bits of the IOP register to generate a signal identifying the instruction format of the particular instruction which is being held in the IOP register. For instance, if there is neither a 0 or a 1 bit in the IOP register, then the AND circuit 1 will generate a signal on the ID RR line. If there is no 0 bit but there is a 1 bit, then the AND circuit 2 will generate a signal on an IDRX line. Similarly, the AND circuit 3 responds to a 0 bit but no 1 bit so as to generate a signal on the ID RS–SI line, and the AND circuit 4 responds to the presence of both bits so as to generate a signal on the ID SS line.

9.2.4.4. IOP Exemplary Instruction Decode, FIG. 87 Through FIG. 89

In FIG. 87, the branching and status switching type of instructions are identified by a signal generated by an AND circuit 1 in response to a signal on the ID RR line together with the absence of bits 2 and 3 in the IOP register as indicated by signals on the NOT 2, NOT 3 lines. The output of the AND circuit 1 is applied to two AND circuits 2, 3 each of which partially decode for a group of instructions, the output of each being used to energize a plurality of corresponding AND circuits 4, 5 respectively. By referring to the charts in the preceding section, it will be seen that the AND circuits 4, 5 are responding in toto, to the code combination for the instruction indicated by the name of the output line thereof, to wit: SPM, BALR, BCTR, BCR, SSK, ISK, and SVC. In a similar fashion, the other groups of instructions in the RR format might be decoded by similar circuits so that all of the RR instructions would be decoded as illustrated in FIG. 88 by a plurality of circuits 1–4 therein. In the same fashion, a plurality of circuits of the type shown in FIG. 88 might be combined as illustrated by the circuits 1–4 of FIG. 89 whereby the entire instruction set of the system would be decoded.

It should be recalled that this is illustrative merely of a conceptionally simple, straightforward approach to decoding all of the instructions.

9.2.4.5. IOP Invalid Operand Decode, FIG. 90 and FIG. 91

In a manner similar to the manner of decoding the instructions, invalid operand codes for each format may be sensed, and the presence of any invalid format utilized to generate an invalid operand signal. In FIG. 90, a signal is generated on an RR INV OP line by an OR circuit 1 in response to either one of two AND circuits 2, 3 each of which is operative only when there is a signal present on the ID RR line. The AND circuit 3 recognizes the voids (in the charts of the preceding section) which are in the floating point columns of the RR format. An OR circuit 4 preventing the AND circuit 3 from responding for the Halve instruction. Similarly, the AND circuit 2 senses the low and high voids in the branching and status switching column of the RR format chart. Presence of signals on the NOT 2 and NOT 3 lines recognize the branching and status switching column, an AND circuit 6 recognizes an instruction immediately below the Supervisor Call instruction, an AND circuit 7 recognizes the void which comprises the same columns as the Divide, Add Logical, Subtract Logical instructions, and an AND circuit 8 recognizes the void at the top of the column (in the rows adjacent to the various Load instructions.) Circuits similar to the circuit of FIG. 90 could be provided for each of the formats, as illustrated in FIG. 91. Thus, additional signals may be generated on an RX INV OP line, on an RS–SI INV OP line, and on an SS INV OP line. As illustrated in FIG. 91, all of these lines might be applied to an OR circuit 9 so as to generate an invalid operation signal for the system on an ID INV OP line. Other variations in the circuitry could of course be provided, to thereby best satisfy the needs of any particular embodiment of a system in accordance with the present invention.

9.2.4.6. IOP Line Decode, FIG. 98

Figure 98:
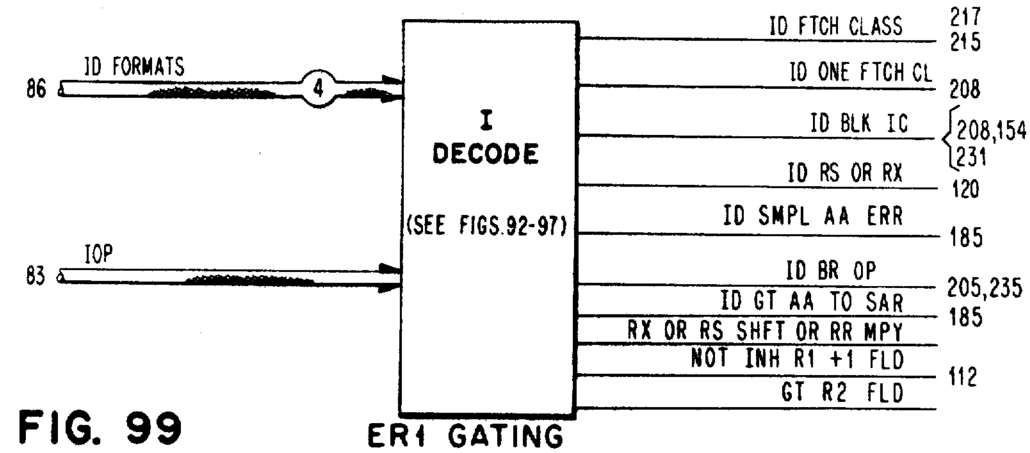

The I decode circuit of FIG. 98 is illustrative merely, the output lines therefrom being illustrated in the chart of FIG. 92 through FIG. 97. Any manner of encoding known in the prior art may be utilized so that the various output lines may be energized in response to the proper instructions or formats, in an obvious manner. Alternatively, circuitry similar to that which is shown in complete detail with respect to the BOP decode may be utilized.

9.2.5. BOP CIRCUITS, FIG. 76

The backup operation register is associated with an incrementer, a decoder, and (together with the IOP register) is involved in the general register out selection and the compare circuits, as described in section 9.2 with respect to FIG. 76.

9.2.5.1. BOP Setting and Release, FIG. 100 and FIG. 101

In FIG. 100, a signal is generated on a SET BOP line by an OR circuit 1 in response to any one of four AND circuits 2–5. The AND circuits 2–4 respond to a TON T2 line in dependence upon three different conditions which may obtain in the system. The AND circuit 2 must also sense a signal on a TSTS COMPLT & BR UNSUCC line so as to indicate that there will be no branching operation, therefor that the presently available instruction will be utilized. The AND circuit 3 will operate when the I unit finishes the I unit execution or branch handling of a presently involved instruction as indicated by a signal on the I DONE line. The AND circuit 4 responds to a signal which indicates that the last cycle of an IE (I unit type of execution, such as a channel communication operation) is about to be completed, due to a signal on the TON IEL line. The AND circuit 5 operates similarly to the AND circuit 4, but responds to the T2 latch being set as indicated by a signal on the T2 LCH line rather than the signal on the TON T2 line.

In FIG. 101, a signal is generated on a RELEASE BOP line by an OR circuit 6 in response to either one of two AND circuits 7, 8, or in response to a signal on a SCAN GT TO BOP line. The AND circuits 7 and 8 are both responsive to a controlled A clock signal on the AC line, the AND circuit 7 also requiring a signal on the SET BOP line, and the AND circuit 8 requiring a signal on the INCR BR1 FLD line. Thus, the OR circuit 6 will generate a signal on the RELEASE BOP line during a scanning operation, or at A time whenever the BOP register is to be set, or whenever the BR1 field is being incremented by the IE unit.

9.2.5.2. BOP Register, FIG. 102 and FIG. 103

As seen in FIG. 102, the 0 bit position of the BOP register comprises a latch 1 which is set by an OR circuit 2 in response to either one of two AND circuits 3, 4 in dependence upon whether a scan operation or normal operation is involved, respectively. The AND circuit 3 responds to a signal on the GT to BOP line concurrently with a scan in control signal on the SCAN BIT line. In normal operations, the AND circuit 4 responds to a signal on the SET BOP line whenever there is a bit in IOP register postion 0 as indicated by a signal on the IOP 0 line. The AND circuit 4 is also contingent upon an A running clock pulse on the AC line. The latch 1 is reset by an OR circuit 5 in response to either one of two AND circuits 7, 6 in dependence upon scan or normal operation respectively. In other words, the AND circuit 3 is associated with the AND circuit 7, and the AND circuit 6 is associated with the AND circuit 4. Thus, during a scan operation if there is no signal on the J REG 40 line, then there will be a signal on the J REG 40 line so that the AND circuit 7 will cause the latch to be reset, or to be left in the reset condition had it been previously reset, Similarly, if there is no signal on the IOP 0 line, then there will be a signal on the NOT IOP 0 line so that the AND circuit 6 will cause the latch either to be reset or to remain reset.

The remaining bits 1–7 of the high order portion of the BOP register are the same as that illustrated with respect to bit 0, as indicated by a block 8 which corresponds to bit 7.

The parity bit for the IOP register is simpler, comprising a latch 9 which is set by an OR circuit 10 in response to either one of two AND circuits 11, 12, the AND circuit 12 being operative by a signal on the SET BOP line concurrently with a signal on the RELEASE BOP line during normal operations, the AND circuit 11 in response to a signal on the REG 48 line concurrently with a signal on a SCAN GT TO BOP line.

Referring to FIG. 103, the R1 portion of the BOP register comprises a plurality of latches 1 each set by a corresponding OR circuit 2 in response to related AND circuits 3–5. The AND circuits 3 are operative during scan operations in response to signals on related scan in lines such as the lines J REG 49, SCAN IN BOP 11, concurrently with the presence of a signal on the SCAN GT TO BOP line. The AND circuits 4 are operative during normal operation of the type wherein the R1 field of the BOP register is to be incremented as indicated by a signal on the INCR BR1 FLD line concurrently with a signal on the RELEASE BOP line and a signal on a corresponding one of a plurality BOP incrementer lines such as the lines BR1 INCR 8, BR1 INCR 11. The AND circuits 5 are operative during other normal operations in response to a signal on the SET BOP line concurrently with a signal on the RELEASE BOP line together with a signal on a corresponding one of a plurality of lines from the IOP register such as the lines IOP 8, IOP 11. The output of the latches 1 comprise signals on the lines BOP 8 . . . BOP 11.

9.2.5.3. BOP R1 Incrementer, FIG. 105

The BOP R1 incrementer (BR1 INCR) comprises a plurality of latches 1–4 as shown in FIG. 105. Each of the latches is set by a corresponding AND circuit 5–8, each of which responds to a B controlled clock signal on a BC line. The BC line is also applied to reset each of the latches 1–4. The theory of operation behind the incrementer is that it is to be considered that a 4 bit field is to be incremented by 1; in other words, it is the same as if an absolute adder were being utilized, and a 1 were being supplied as one of the inputs to the adder. However, whatever the input is can be automatically converted to be an input which is one higher by logical means, as shown in FIG. 105. It should be borne in mind that the nomenclature of the present embodiment as such that bit 8 is the high order bit of the BR1 field, and bit 11 is the lower order bit thereof. Therefore, from the general rules of binary addition, the low order bit, bit 11, will be reversed each time that a 1 is added thereto. Thus, if there was no bit 11 there will be a signal on the NOT 11 line so that the AND circuit 5 will set the latch 1 thereby indicating a bit on the BR1 INCR 11 line. Similarly, if either the 10 or the 11 bit is present but not both, then there should be a 10 bit in the final result; this is because if there is an 11 bit but no 10 bit then there will be a carry from the 11 bit position into the 10 bit position, but if both are present, then the 10 bit becomes a 0 with a carry into the 9 bit; on the other hand, if there is no 11 bit then there is no carry into the 10 bit but if the 10 bit is present in the first place than it should be continued. This fact is sensed by an EXCLUSIVE OR circuit 9. In a similar fashion, and AND circuit 10 will recognize if both the 10 and 11 bits are present which will cause a carry into the 9 bit, and an EXCLUSIVE OR circuit 11 will recognize whether there is a 9 bit without the 10 and the 11, or vice versa, so as to generate a 9 bit in the appropriate circumstance. An AND circuit 12 in combination with an EXCLUSIVE OR circuit 13 perform a similar function for the bit 8, so that a carry all the way from bit 11 into bit 8 can take place if there is no bit 8, or bit 8 will cause itself to continue if there will be no carry rippled to it.

9.2.5.4. BOP Parity Error Circuit, FIG. 106

In FIG. 106, an EXCLUSIVE OR complex 1 (which is illustrated therein as a single circuit, but which is to be understood as being a circuit which senses the oddness or evenness of the total inputs thereto) will provide a signal whenever there is an odd number of bits present at the input thereto from the BOP register. This signal is applied to an inverter 2 which therefore will provide a signal to an AND circuit 3 whenever the bits are even, the AND circuit 3 responding at A time due to a signal on the AC line concurrently with a transfer of control from the I unit to the E unit due to a signal on the I to E XFER line. The AND circuit 3 will set a latch 4 which generated a signal on the BOP PAR ERROR line. The latch 4 is reset by a signal on the CHK RST line.

9.2.6. ER1 CIRCUITS

The ER1 circuits respond to the R1 field of the BOP register which comprises bits 8–11 thereof. The ER1 register is utilized for controlling the input selection of the general registers, and is provided with an incrementer and a parity checking circuit as described in the succeeding sections, and in sections 5.2.0.0 with respect to FIG. 76.

9.2.6.1. ER1 Gating, FIG. 99

Figure 99:
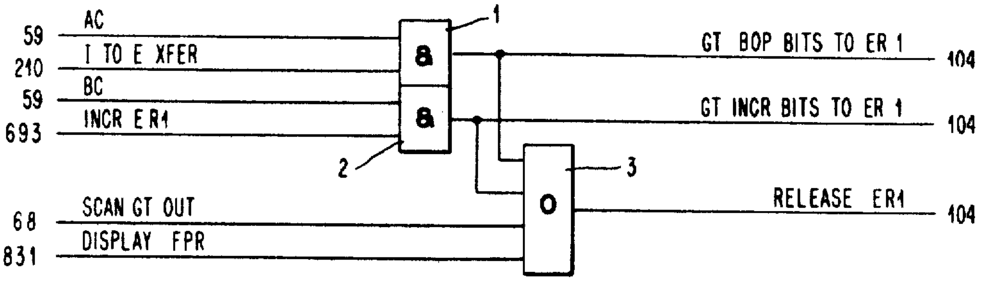

In FIG. 99, a pair of AND circuits 1, 2 generate signals on a GT BOP BITS TO ER1 line and on a GT INCR BITS TO ER1 line. The AND circuit 1 is operative at A time due to a signal on an AC line, concurrently with a signal on an I TO E XFER line. The AND circuit 2 is operative at B time due to a signal on a BC line concurrently with a signal on a INCR ER1 line. Thus, during the I to E transfer, the AND circuit 1 will cause the BOP register R1 field to be transferred to the ER1 register, and during the incrementing of the ER1 field, the ER1 incrementer will be gated back into the ER1 register. Either one of the AND circuits 1, 2 may operate an OR circuit 3 which is also operable by either one of two signal lines: SCAN GT TO ER1, or DISPLAY FR. The OR circuit 3 will generate a signal on a RELEASE ER1 line.

9.2.6.2. ER1 Register, FIG. 104

As shown in FIG. 104, the ER1 register comprises a plurality of latches 1, each of which may be set by a corresponding OR circuit 2 in response to any one of three related AND circuits 3–5. The AND circuits 3 are operated by a signal on a SCAN GT ER1 line concurrently with a corresponding one of a plurality of scan in lines such as the lines J REG 53 and J REG 56. The AND circuits 4 are operated by the concurrence of signals on a GT BOP BITS TO ER1 line and a RELEASE ER1 line. Each of the AND circuits 4 also requires a signal on a corresponding one of a plurality of BOP register output lines, as illustrated by lines BOP 8, BOP 11. The AND circuits 5 are operated by signals on the GT INCR BITS TO ER1 line concurrently with the signal on the RELEASE ER1 line. Each of the AND circuits 5 also requires a corresponding input from the ER1 incrementer on a related line such as the E INCR 8 and E INCR 11 lines.

9.2.6.3. ER1 Incrementer, FIG. 107

The bits of the ER1 register are applied to the ER1 incrementer shown in FIG. 107, which is gated by a signal on an AC line. In all other respects, the ER1 incrementer of FIG. 107 operates in a manner identical with the BR1 incrementer shown in FIG. 105, therefore no further description is given thereof.

9.2.7. GENERAL REGISTER CIRCUITS, FIG. 72

9.2.7.1. General Register Output Selection Circuits, FIG. 108 through FIG. 111

Selection of a particular general register, the output of which is to be applied to the general bus left or the generous bus right is under control of the general register output selection circuits shown in FIG. 108 through FIG. 111, which circuits are described in detail in the ensuing sections.

9.2.7.1.1. B *field selection of general registers* FIG. 108.—The selection of a particular general register under control of the B field of the IOP register, which comprises bits 16–19 thereof, is illustrated in FIG. 108 wherein a plurality of first AND circuits 1 predecode the high order bits (16, 17) of the B field, and a plurality of AND circuits 2 predecode the low order bits of the field (18, 19). The outputs of the AND circuits 1 and 2 are combined by a plurality of AND circuits 3 in an obvious manner so as to provide a straight binary decoding of the 4 input bits to thereby generate a signal on one out of the 16 possible B FLD SEL GR lines 0–15. As an example only, a NOT 16 together with a 17 will cause the second AND circuit 1 from the top of FIG. 108 to generate a signal indicating that a 01 combination is indicated for the high order half. Similarly, the second AND circuit 2 from the bottom of FIG. 108 will respond to the absence of both bit 18 and bit 19 so as to indicate that the low order half has a value of 00. These are combined in a second AND circuit 3 from the bottom of FIG. 108 so as to generate a combination 0100 which thereby designates general register 8 as the register which is to be selected.

9.2.7.1.2. R2–X *field selection of general registers*, FIG. 109.—The circuit of FIG. 109 is nearly identical to the circuit of FIG. 108, the difference being that bits 12–15 (and the complements thereof) of the IOP register are applied to the circuit of FIG. 108, whereas bits 16–19 (and the complements thereof) of the IOP register are applied to the circuit of FIG. 108. The output of the circuit of FIG. 109 will be a signal on any one of the 16 possible R2–X FLD SEL GR lines 0–15.

9.2.7.1.3. BR1 *field selection of registers*, FIG. 110.—The circuit of FIG. 110 is an alternative to the circuit shown in FIG. 108 and FIG. 109 in that, rather than a straightforward low order, high order, and combinational type of decoding, the low order bit and the high order bit are combined, and then these are in turn combined with the results of combinations of the two middle order bits (9, 10). In addition, the circuit of FIG. 110 may respond in the alternative to the output of the BOP register, or to the coded combination designated by the Maintainance switches. A first plurality of AND circuits 1 are gated by a signal on a BR1 INH line, or a second plurality of AND circuits 2 are gated by a signal from an OR circuit 4 which responds to signals on either the DISPLAY FPR line or the DISPLAY GR line.

Each pair of AND circuits 1, 2 operates a corresponding OR circuit 5 which generates a signal on a corresponding one of a plurality of lines A–H for application to selected ones of 16 different AND circuits 6 where the lines combine so as to generate signals on corresponding BR1 SEL GR lines 0–15. For instance, when the AND circuits 1 are operative, the B signal is generated in response to a 0 *xx*1 value and the F signal is generated in response to an X01X value, a combination of which is a BR1 SEL GR 3 as generated by the fourth AND circuit from the top in FIG. 110, a 3 having a binary representation of 0011. On the other hand, a conversion from one binary code to another is involved whenever the AND circuits 2 are operative inasmuch as the MS lines are not applied to the AND circuits 2 in such a manner as will create a straight binary conversion when the outputs therefrom are combined in the AND circuits 6. The conversion is illustrated in the following chart:

| Binary bits: | Decimal value |
|---|---|
| 0 0 0 0 | 0 |
| 1 0 0 0 | 1 |
| 0 0 1 0 | 2 |
| 1 0 1 0 | 3 |
| 0 0 0 1 | 4 |
| 1 0 0 0 | 5 |
| 0 0 1 1 | 6 |
| 1 0 1 1 | 7 |
| 0 1 0 0 | 8 |
| *x* | *x* |
| 1 1 1 1 | 15 |

From the table, it can be observed that the MS bits 8, 9, 10, and 11 have equivalent binary weight values of 1, 8, 2, and 4, respectively, when considered in the light of the manner in which the BR1 SEL TR signals are generated therefrom.

As described in section 9.2.7.1.6, hereinafter, the selection of a general register for output to the GBR or GBL under control of R1 plus 1 is generated logically in FIG. 113 in response to the BR1 SEL GR signals generated in FIG. 110 in combination with a GT GR R1 PLUS 1 OUT signal which is generated in FIG. 112. In other words, the BR1 SEL GR lines are used both for the R1 and for the R1 plus 1 outgating control.

9.2.7.1.4. *General register outgating control*, FIG. 111.—In FIG. 111, a signal which indicates that the general registers are to be gated out to the GBL and GBR is generated on a GROUT line by a latch 1 which is set by an OR circuit 2 in response to an AND circuit 3 or in response to a signal on a SCAN GROUT line which may be energized as a result of FLT operations. The AND circuit 3 is operative at A time due to a signal on the AC line at the time of I to E transfer as indicated by a signal on the I TO E XFER line during instructions which are of the GROUT type as indicated by a signal on the BD GROUT CL line. Additionally, there must be no interrupt reset as indicated by a signal on a NOT IRPT RST line. The latch 1 is reset by an OR circuit 4 in response to a signal on the CPU RST line or in response to an AND circuit 5 which in turn is operated by an OR circuit 6. The OR circuit 6 responds to an AND circuit 7 or to a signal on any one of the following lines: E TOF GROUT, IRPT RST, IE TOF BLK T1M. The AND circuit 7 responds during the last cycle of operations involving the Execute instruction as indicated by a signal on the XEQ SEQ LCH line concurrently with a signal on the IOP LOADED line. Thus, the latch 1 will be set as a result of a scan or during GROUT class instructions at I to E transfer provided there is no interrupt reset, and the latch 1 will be reset by a CPU reset or by the Execute, E unit, interrupt, and IE controls associated with the OR circuit 6.

Sections 9.2.8 through 22.0 are shown in the case relating to said environmental system, which is referred to in Section 2 herein.

While the invention has been shown and described with respect to a particular embodiment thereof, it should be understood by those skilled in the art that various changes and omissions in the form and detail thereof may be made therein without departing from the spirit and scope of the invention.

What is claimed is:

1. In a data processing system, a register apparatus, comprising:
- a plurality of register means;
- a plurality of data transmitting means;
- a plurality of control means, each of said control means operable to select one of said register means; and
- a plurality of interconnecting means, said interconnecting means being operated by said control means for interconnecting one of said registers with one of said transmitting means, the one of said transmitting means to be interconnected with the selected register means being determined by the control means which selects the register in question.

2. The device described in claim 1 wherein said plurality of control means comprises a number thereof, said number being in excess of the number of said transmission means included in said plurality of transmission means.

3. The device described in claim 2 wherein said number of control means include independent control means, and control means dependent upon another one of said control means so as to generate a variant of control conditions in the selection of one of said register means.

4. The device described in claim 1 wherein one or more of said control means may be simultaneously operable for selecting a single particular register.

5. The device described in claim 2 wherein one or more of said control means may be simultaneously operable for selecting a single particular register.

6. The device described in claim 3 wherein one or more of said control means may be simultaneously operable for selecting a single particular register.

7. The device described in claim 1 wherein a single one of said control means is operable to select a plurality of said register means for transmission over a plurality of transmission means to at least one destination.

8. The device described in claim 2 wherein a single one of said control means is operable to select a plurality of said register means for transmission over a plurality of transmission means to at least one destination.

9. The device described in claim 3 wherein a single one of said control means is operable to select a plurality of said register means for transmission over a plurality of transmission means to at least one destination.

10. In a data processing system, a register control apparatus comprising:
- a plurality of register means;
- a plurality of transfer means;
- a plurality of register output means, one for each register corresponding to each of said transfer means;
- a plurality of code responsive means for specifying a selected one of said registers;
- control means responsive to said code responsive means to operate said output means so as to select a particular one of said register means for connection to one of said transfer means; and
- instruction decode means for decoding an instruction, said instruction decode means providing register designating signals of a first and second kind to said control means, said control means selecting among said transfer means in dependence upon the first and second kind of said selecting signals.

11. The device described in claim 10 wherein one or more of said control means may be simultaneously operable for selecting a single particular register.

12. The device described in claim 10 wherein a single one of said control means is operable to select a plurality of said register means for transmission over a plurality of transmission means to at least one destination.

References Cited

UNITED STATES PATENTS

| | | | |
|---|---|---|---|
| 2,840,705 | 6/1958 | Scully | 340—172.5 |
| 3,197,738 | 7/1965 | Raser et al. | 340—172.5 |
| 3,210,732 | 10/1965 | Briggs et al. | 340—172.5 |
| 3,268,874 | 8/1966 | Bock | 340—172.5 |

PAUL J. HENON, *Primary Examiner.*

ROBERT C. BAILEY, *Examiner.*

G. D. SHAW, *Assistant Examiner.*